US011972204B2

(12) United States Patent
Dvorak

(10) Patent No.: US 11,972,204 B2
(45) Date of Patent: Apr. 30, 2024

(54) METHOD AND SYSTEM FOR IMPROVED ORDERING OF OUTPUT FROM SPREADSHEET ANALYTICAL FUNCTIONS

(71) Applicant: Adaptam Inc., Palo Alto, CA (US)

(72) Inventor: Robert E. Dvorak, Portola Valley, CA (US)

(73) Assignee: Adaptam Inc., Palo Alto, CA (US)

( * ) Notice: Subject to any disclaimer, the term of this patent is extended or adjusted under 35 U.S.C. 154(b) by 0 days.

(21) Appl. No.: 17/374,901

(22) Filed: Jul. 13, 2021

(65) Prior Publication Data

US 2022/0012417 A1 Jan. 13, 2022

Related U.S. Application Data

(60) Provisional application No. 63/051,283, filed on Jul. 13, 2020.

(51) Int. Cl.
*G06F 40/18* (2020.01)
*G06F 3/0482* (2013.01)
*G06F 3/04842* (2022.01)
*G06F 16/93* (2019.01)
*G06F 40/103* (2020.01)

(52) U.S. Cl.
CPC ............ *G06F 40/18* (2020.01); *G06F 3/0482* (2013.01); *G06F 3/04842* (2013.01); *G06F 40/103* (2020.01); *G06F 16/93* (2019.01)

(58) Field of Classification Search
CPC ......... G06F 40/18; G06F 40/103; G06F 16/93
See application file for complete search history.

(56) References Cited

U.S. PATENT DOCUMENTS 5,604,854 A 2/1997 Glassey
6,626,959 B1 9/2003 Moise et al.
7,747,939 B2 * 6/2010 Thanu .................... G06F 40/18 715/214
8,726,143 B2 5/2014 Simkhay et al.
9,037,959 B2 * 5/2015 Rapp ...................... G06F 40/18 715/212

(Continued)

OTHER PUBLICATIONS

Collie, R., & Singh, A. (2016). Power Pivot and Power BI: The Excel user's guide to DAX, Power Query, Power BI & Power Pivot in Excel 2010-2016. United States: Holy Macro! Books. ISBN: 978-1-61547-039-6 (Year: 2016).*

(Continued)

*Primary Examiner* — Benjamin Smith
(74) *Attorney, Agent, or Firm* — Haynes Beffel & Wolfeld LLP; Ernest J. Beffel, Jr.

(57) ABSTRACT

The disclosed technology creates a family of (predefined formula) spreadsheet functions which allows users to create programming loop equivalents in their regular spreadsheet cells employing familiar range functions (e.g., SUM, COUNT, MIN, MAX, etc.) with data filtering and output selection. The data can be sourced from multiple cells within the spreadsheet or a broad spectrum of numeric, date and text data not stored in a spreadsheet, including data not discretely defined. The technology disclosed can use as inputs either cell ranges or Non-Spreadsheet Cell (NSC) data formulas. The capability allows users to specify standardized or highly custom calculations capable of executing millions of loops through a (predefined formula) spreadsheet function.

24 Claims, 82 Drawing Sheets

EXAMPLES OF RANGE OR ARRAY SPREADSHEET FUNCTIONS

| FUNCTION | VARIANTS |
|---|---|
| AVEDEV | |
| AVERAGE | all variants (e.g., A, IF and IFS) |
| CONCAT | |
| COUNT | all variants (e.g., A, BLANK, IF and IFS) |
| GEOMEAN | |
| HARMEAN | |
| LARGE | |
| MAX | all variants including DMAX |
| MEDIAN | |
| MIN | all variants including DMIN |
| MODE | all variants |
| PERCENTILE | all variants |
| PERCENTRANK | all variants |
| QUARTILE | All variants |
| SMALL | |
| STDEV | all variants including DSTDEV and its variants |
| SUM | All variants including DSUM |
| UNIQUE | |
| VAR | all variants including DVAR and its variants |

(56) References Cited

U.S. PATENT DOCUMENTS

| | | | | |
|---|---|---|---|---|
| 9,430,469 | B2 * | 8/2016 | Lam | G06F 40/18 |
| 9,817,876 | B2 * | 11/2017 | Demonsant | G06F 16/283 |
| 10,114,812 | B1 * | 10/2018 | Ghaddar | G06F 40/166 |
| 10,466,867 | B2 * | 11/2019 | Boucher | G06F 40/177 |
| 10,515,145 | B2 * | 12/2019 | Canton | G06F 40/111 |
| 10,545,953 | B2 | 1/2020 | Becker et al. | |
| 10,628,634 | B1 * | 4/2020 | Ghaddar | G06F 17/11 |
| 10,699,068 | B2 * | 6/2020 | Gross | G06F 40/123 |
| 10,789,414 | B2 * | 9/2020 | Schoedl | G06F 40/18 |
| 10,877,633 | B2 * | 12/2020 | Boucher | G06F 40/106 |
| 10,983,670 | B2 * | 4/2021 | Boucher | G06F 3/04847 |
| 11,222,171 | B2 * | 1/2022 | Zhang | G06F 3/04847 |
| 2003/0056181 | A1 * | 3/2003 | Marathe | G06F 40/18 715/267 |
| 2006/0271841 | A1 * | 11/2006 | Thanu | G06F 40/18 715/205 |
| 2009/0319880 | A1 | 12/2009 | Collie et al. | |
| 2010/0269092 | A1 | 10/2010 | Dorman | |
| 2013/0145244 | A1 * | 6/2013 | Rothschiller | G06F 40/18 715/212 |
| 2013/0159832 | A1 | 6/2013 | Ingargiola et al. | |
| 2015/0370433 | A1 * | 12/2015 | Lam | G06F 16/24553 715/771 |
| 2016/0378842 | A1 * | 12/2016 | Demonsant | G06F 16/275 707/602 |
| 2017/0220543 | A1 * | 8/2017 | Canton | G06F 40/18 |
| 2017/0315683 | A1 * | 11/2017 | Boucher | G06F 40/205 |
| 2017/0315967 | A1 * | 11/2017 | Boucher | G06F 16/2228 |
| 2017/0315979 | A1 * | 11/2017 | Boucher | G06F 40/205 |
| 2018/0239748 | A1 * | 8/2018 | Zhang | G06F 40/177 |
| 2018/0260374 | A1 | 9/2018 | Sobhy Deraz et al. | |
| 2019/0340219 | A1 * | 11/2019 | Schoedl | G06F 3/0481 |
| 2020/0004799 | A1 * | 1/2020 | Gross | G06F 40/18 |
| 2020/0004811 | A1 * | 1/2020 | Gross | G06F 17/17 |
| 2020/0004812 | A1 * | 1/2020 | Gross | G06F 40/18 |
| 2020/0081586 | A1 * | 3/2020 | Boucher | G06F 40/106 |
| 2020/0257852 | A1 * | 8/2020 | Canton | G06F 40/151 |
| 2020/0285694 | A1 * | 9/2020 | Nield | G06F 9/45504 |
| 2020/0302013 | A1 | 9/2020 | Stegmaier et al. | |
| 2021/0081405 | A1 * | 3/2021 | Zarras | G06F 16/2457 |
| 2021/0286479 | A1 * | 9/2021 | Boucher | G06F 40/14 |
| 2021/0311595 | A1 * | 10/2021 | Boucher | G06F 3/04847 |

OTHER PUBLICATIONS

U.S. Appl. No. 17/374,898, filed Jul. 13, 2021, US2022/0012416A1, Jan. 13, 2022.

U.S. Appl. No. 17/903,934, filed Sep. 6, 2022.

Collie et al., Power Pivot and Power BI: The Excel user's guide to DAX, Power Query, Power BI & Power Pivot in Excel 2010-2016. United States: Holy Macro! Books. ISBN: 978-1-61547-039-6 (Year:2016) (Year: 2016).

Yundt, What's the difference between array and range in Excel?, Quora, dated Dec. 2, 2019, 4 pages.

Sroka et al, Translating Relational Queries into Spreadsheets, IEEE, Transactions on Knowledge and Data Engineering, vol. 27, No. 8, Aug. 2015, 13 pages.

U.S. Appl. No. 17/374,898, filed Jul. 13, 2021, now U.S. Pat. No. 11,694,023, Jul. 4, 2023.

U.S. Appl. No. 18/217,981, filed Jul. 3, 2023.

U.S. Appl. No. 17/903,934, filed Sep. 6, 2022, US2023/0075557A1, Mar. 9, 2023.

* cited by examiner

FIG. 1 - Prior Art
Excel steps
1. Talk with IT to get the desired data
2. Get the data download csv from IT
3. Import the csv into Excel
4. Locate in Excel the desired data
5. Sort the data by Date, Cancer and Country
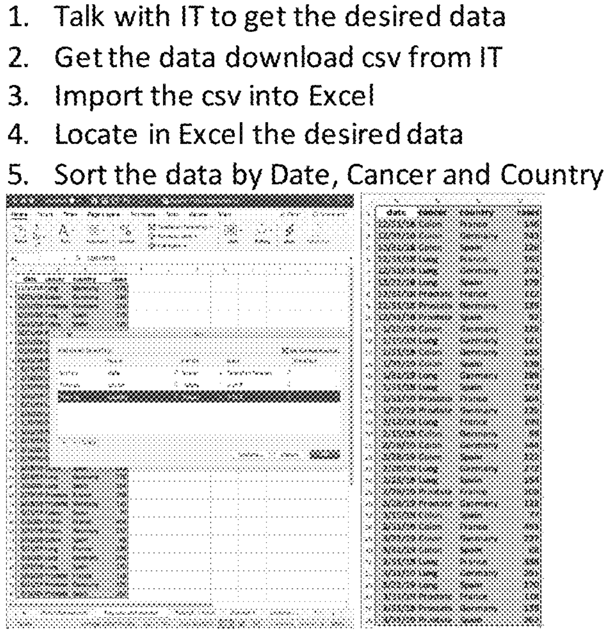
6. Delete rows not in the desired dates
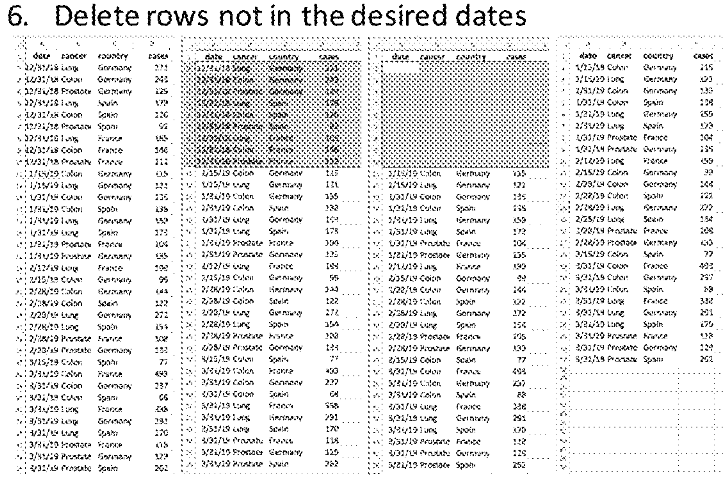
7. Resort the columns by cancer and country
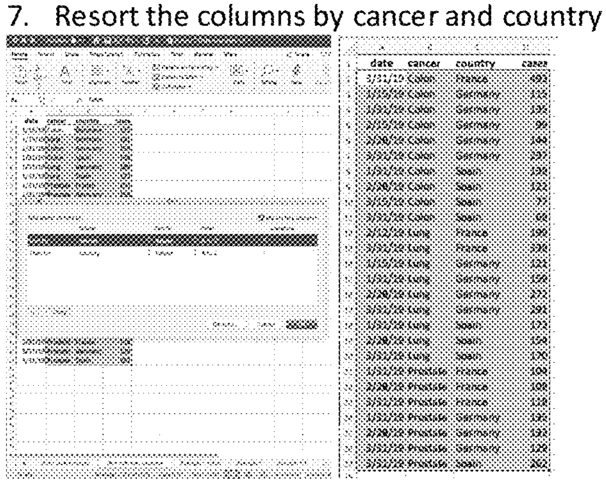

FIG. 2 - Prior Art

8. Label SUM column and do Colon France SUM
9. Do Colon Germany SUM (see below 15)
10. Do Colon Spain SUM (see below 15)
11. Do Lung France SUM (see below 15)
12. Do Lung Germany SUM (see below 15)
13. Do Lung Spain SUM (see below 15)
14. Do Prostate France SUM (see below 15)
15. Do Prostate Germany SUM (see below 15)

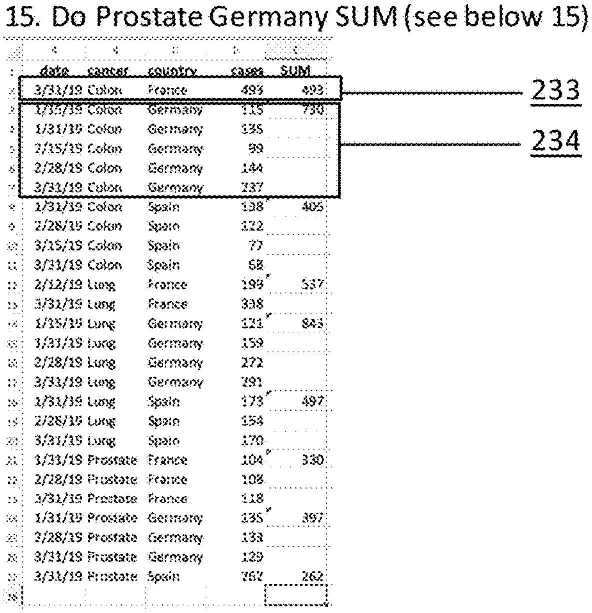

| date | cancer | country | cases | SUM |
|---|---|---|---|---|
| 3/31/19 | Colon | France | 493 | 493 |
| 1/15/19 | Colon | Germany | 115 | 730 |
| 1/31/19 | Colon | Germany | 135 | |
| 2/15/19 | Colon | Germany | 99 | |
| 2/28/19 | Colon | Germany | 144 | |
| 3/31/19 | Colon | Germany | 237 | |
| 1/31/19 | Colon | Spain | 138 | 405 |
| 2/28/19 | Colon | Spain | 122 | |
| 3/15/19 | Colon | Spain | 77 | |
| 3/31/19 | Colon | Spain | 68 | |
| 2/12/19 | Lung | France | 199 | 537 |
| 3/31/19 | Lung | France | 338 | |
| 1/15/19 | Lung | Germany | 121 | 843 |
| 1/31/19 | Lung | Germany | 159 | |
| 2/28/19 | Lung | Germany | 272 | |
| 3/31/19 | Lung | Germany | 291 | |
| 1/31/19 | Lung | Spain | 173 | 497 |
| 2/28/19 | Lung | Spain | 154 | |
| 3/31/19 | Lung | Spain | 170 | |
| 1/31/19 | Prostate | France | 104 | 330 |
| 2/28/19 | Prostate | France | 108 | |
| 3/31/19 | Prostate | France | 118 | |
| 1/31/19 | Prostate | Germany | 135 | 397 |
| 2/28/19 | Prostate | Germany | 133 | |
| 3/31/19 | Prostate | Germany | 129 | |
| 3/31/19 | Prostate | Spain | 262 | 262 |

16. Do Prostate Spain SUM (see above) – note this approach has as many steps here as it has iterations and so if there had been a 1000 combinations there would have been 991 additional steps
17. Copy the cancer, country and SUM columns and special paste the values in the shaded area below (so that you can sort them without the numbers changing)

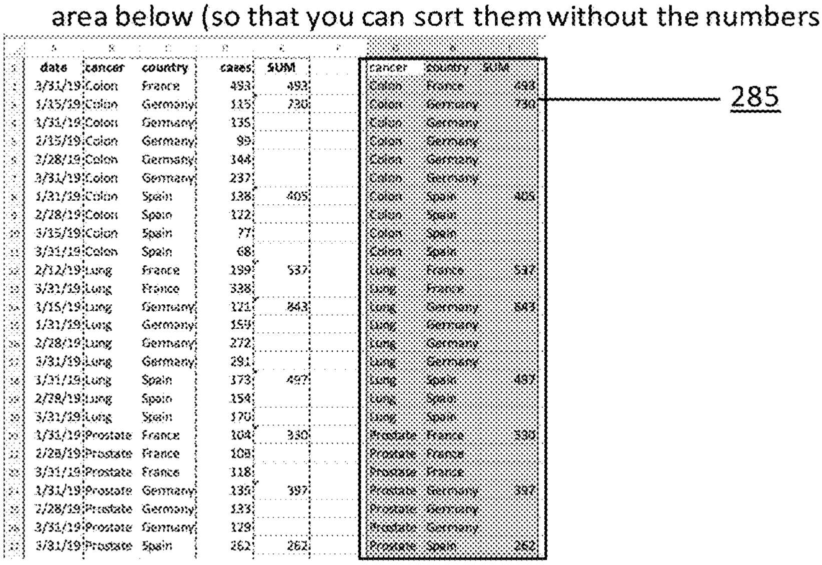

| date | cancer | country | cases | SUM | | cancer | country | SUM |
|---|---|---|---|---|---|---|---|---|
| 3/31/19 | Colon | France | 493 | 493 | | Colon | France | 493 |
| 1/15/19 | Colon | Germany | 115 | 730 | | Colon | Germany | 730 |
| 1/31/19 | Colon | Germany | 135 | | | Colon | Germany | |
| 2/15/19 | Colon | Germany | 99 | | | Colon | Germany | |
| 2/28/19 | Colon | Germany | 144 | | | Colon | Germany | |
| 3/31/19 | Colon | Germany | 237 | | | Colon | Germany | |
| 1/31/19 | Colon | Spain | 138 | 405 | | Colon | Spain | 405 |
| 2/28/19 | Colon | Spain | 122 | | | Colon | Spain | |
| 3/15/19 | Colon | Spain | 77 | | | Colon | Spain | |
| 3/31/19 | Colon | Spain | 68 | | | Colon | Spain | |
| 2/12/19 | Lung | France | 199 | 537 | | Lung | France | 537 |
| 3/31/19 | Lung | France | 338 | | | Lung | France | |
| 1/15/19 | Lung | Germany | 121 | 843 | | Lung | Germany | 843 |
| 1/31/19 | Lung | Germany | 159 | | | Lung | Germany | |
| 2/28/19 | Lung | Germany | 272 | | | Lung | Germany | |
| 3/31/19 | Lung | Germany | 291 | | | Lung | Germany | |
| 1/31/19 | Lung | Spain | 373 | 497 | | Lung | Spain | 497 |
| 2/28/19 | Lung | Spain | 154 | | | Lung | Spain | |
| 3/31/19 | Lung | Spain | 170 | | | Lung | Spain | |
| 1/31/19 | Prostate | France | 104 | 330 | | Prostate | France | 330 |
| 2/28/19 | Prostate | France | 108 | | | Prostate | France | |
| 3/31/19 | Prostate | France | 318 | | | Prostate | France | |
| 1/31/19 | Prostate | Germany | 135 | 397 | | Prostate | Germany | 397 |
| 2/28/19 | Prostate | Germany | 133 | | | Prostate | Germany | |
| 3/31/19 | Prostate | Germany | 129 | | | Prostate | Germany | |
| 3/31/19 | Prostate | Spain | 262 | 262 | | Prostate | Spain | 262 |

FIG. 3 - Prior Art
18. Sort the cancer, country and SUM values from smallest to largest SUM value
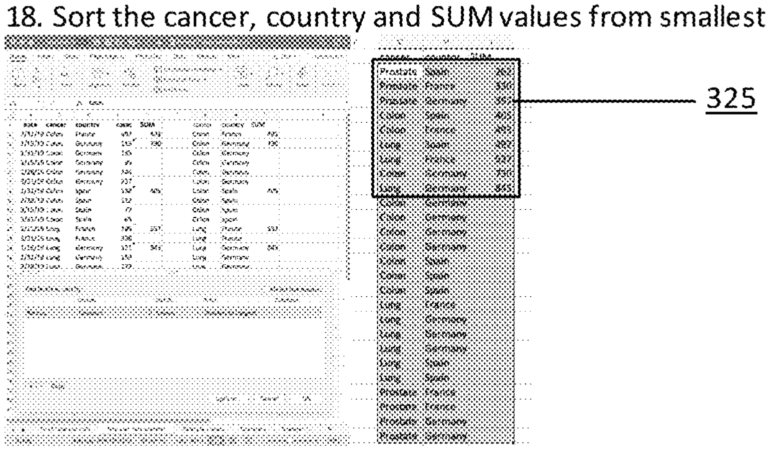
19. Copy the cells in G2 to I10 I2 to the worksheet and location desired.
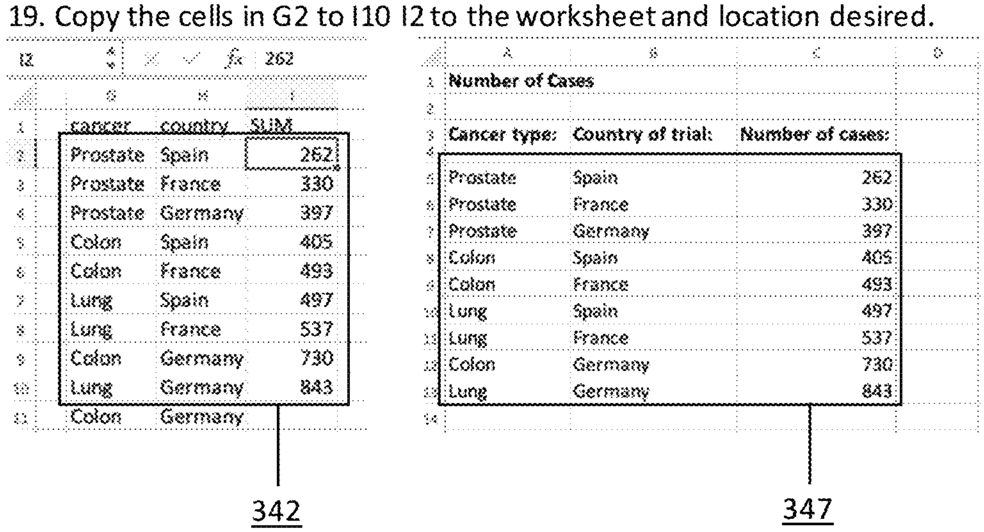

FIG. 4 - Prior Art

Excel steps using a Pivot Table

1. Talk with IT to get the desired data
2. Get the data download csv from IT
3. Import the csv into Excel
4. Locate in Excel the desired data
5. Click insert Pivot Table
6. Select range of data to use in the Pivot table (shown below)

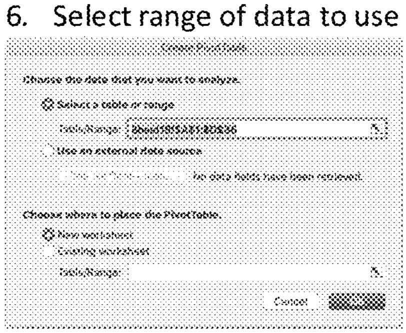

7. Choose where to put the Pivot table (shown below)

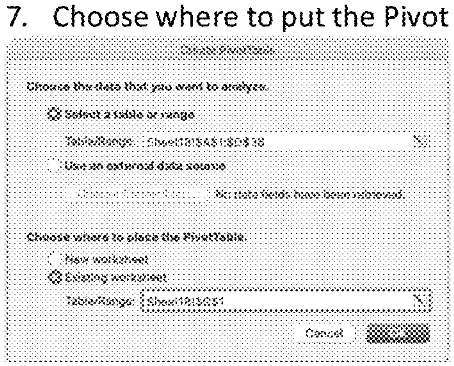

8. Put cases into the SUM Values (shown below 11.)
9. Put Cancer into Rows (shown below 11.)
10. Put country into Rows (shown below 11.)
11. Put date into Filter (shown below)

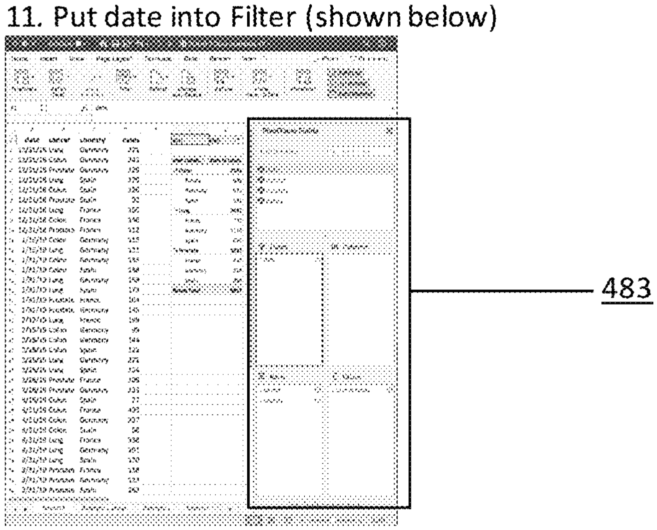

FIG. 5 - Prior Art

12. Deselect the unwanted dates to get the values for 2019

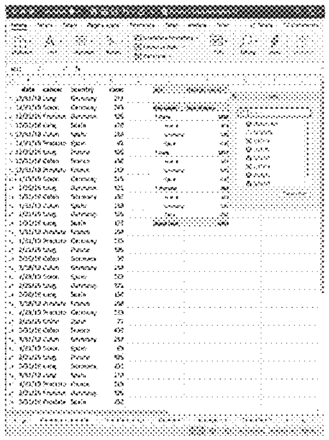

13. You would like to sort the Pivot Table Sum of cases values from Smallest to Largest (for situations where you can't easily see all the values or want to see the progression) but Excel only allows you to sort within each grouping (e.g., in the example the cancer types) so you are forced to copy the Pivot Table output and Special paste its values into new cells

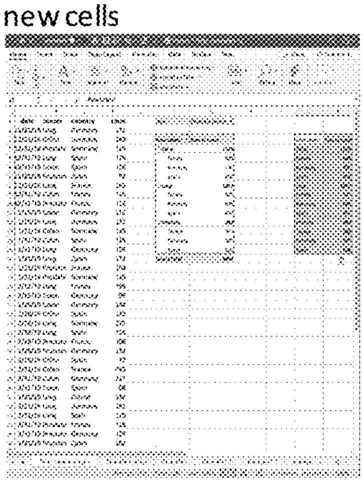

14. Delete the totals in the from the paste area (You could have gotten rid of them in Pivot table but that requires more operations and knowing to click in the table to make available additional ribbon tabs, clicking the Design tab and then opening the Subtotals dropdown and clicking off the correct selection)

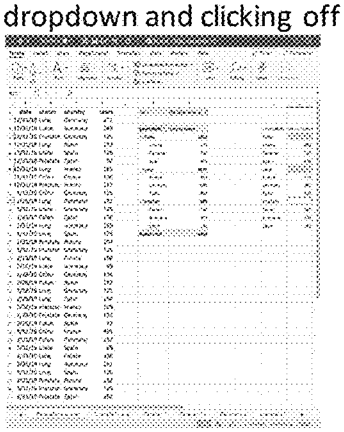

FIG. 6 - Prior Art

15. Copy the Colon heading down, copy the Lung heading down and copy the Prostate heading down

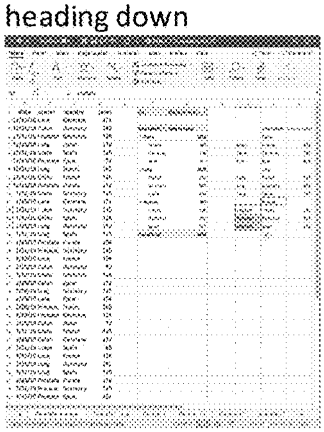

16. Data sort the resulting values in cells I5 through K13 from Smallest to Largest to get the order of the results desired

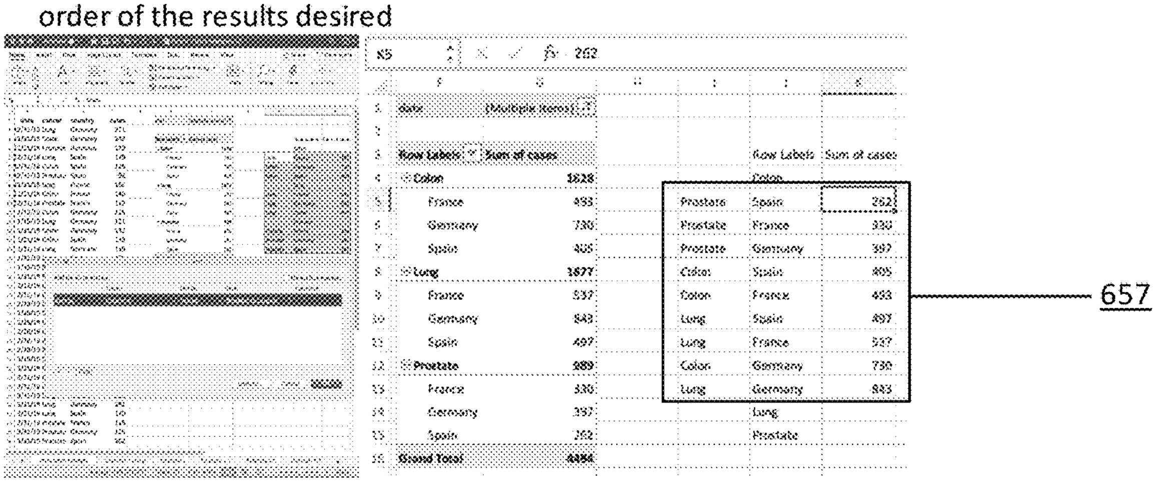

17. Copy the values in cells I5 through K13 to the worksheet and location desired.

| | A | B | C | D |
|---|---|---|---|---|
| 1 | **Number of Cases** | | | |
| 2 | | | | |
| 3 | **Cancer type:** | **Country of trial:** | **Number of cases:** | |
| 4 | | | | |
| 5 | Prostate | Spain | 262 | |
| 6 | Prostate | France | 330 | |
| 7 | Prostate | Germany | 397 | |
| 8 | Colon | Spain | 405 | |
| 9 | Colon | France | 493 | |
| 10 | Lung | Spain | 497 | |
| 11 | Lung | France | 537 | |
| 12 | Colon | Germany | 730 | |
| 13 | Lung | Germany | 843 | |
| 14 | | | | |

FIG. 10

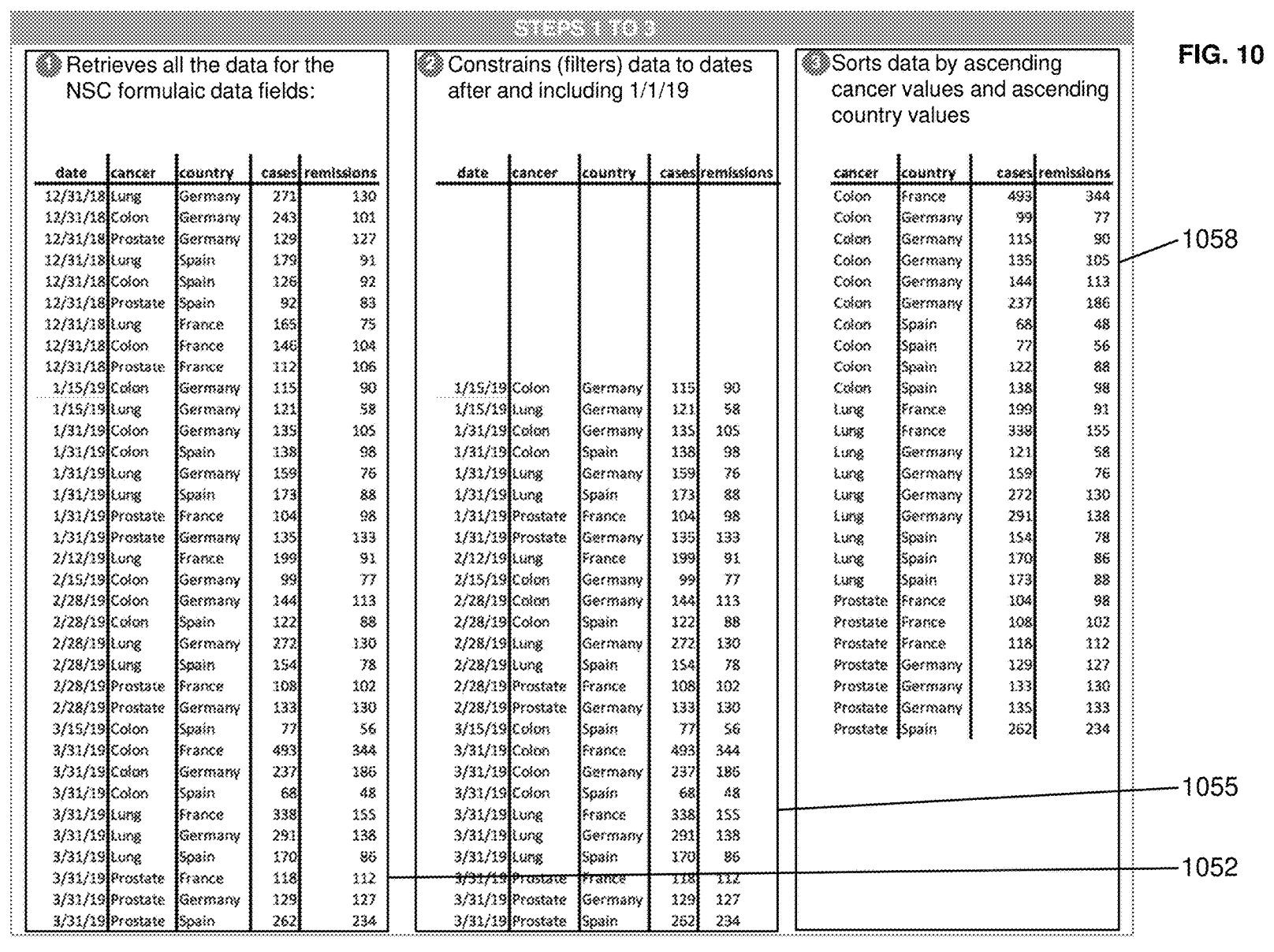

STEPS 1 TO 3

Retrieves all the data for the NSC formulaic data fields:

| date | cancer | country | cases | remissions |
|---|---|---|---|---|
| 12/31/18 | Lung | Germany | 271 | 130 |
| 12/31/18 | Colon | Germany | 243 | 101 |
| 12/31/18 | Prostate | Germany | 129 | 127 |
| 12/31/18 | Lung | Spain | 179 | 91 |
| 12/31/18 | Colon | Spain | 126 | 92 |
| 12/31/18 | Prostate | Spain | 92 | 83 |
| 12/31/18 | Lung | France | 165 | 75 |
| 12/31/18 | Colon | France | 146 | 104 |
| 12/31/18 | Prostate | France | 112 | 106 |
| 1/15/19 | Colon | Germany | 115 | 90 |
| 1/15/19 | Lung | Germany | 121 | 58 |
| 1/31/19 | Colon | Germany | 135 | 105 |
| 1/31/19 | Colon | Spain | 138 | 98 |
| 1/31/19 | Lung | Germany | 159 | 76 |
| 1/31/19 | Lung | Spain | 173 | 88 |
| 1/31/19 | Prostate | France | 104 | 98 |
| 1/31/19 | Prostate | Germany | 135 | 133 |
| 2/12/19 | Lung | France | 199 | 91 |
| 2/15/19 | Colon | Germany | 99 | 77 |
| 2/28/19 | Colon | Germany | 144 | 113 |
| 2/28/19 | Colon | Spain | 122 | 88 |
| 2/28/19 | Lung | Germany | 272 | 130 |
| 2/28/19 | Lung | Spain | 154 | 78 |
| 2/28/19 | Prostate | France | 108 | 102 |
| 2/28/19 | Prostate | Germany | 133 | 130 |
| 3/15/19 | Colon | Spain | 77 | 56 |
| 3/31/19 | Colon | France | 493 | 344 |
| 3/31/19 | Colon | Germany | 237 | 186 |
| 3/31/19 | Colon | Spain | 68 | 48 |
| 3/31/19 | Lung | France | 338 | 155 |
| 3/31/19 | Lung | Germany | 291 | 138 |
| 3/31/19 | Lung | Spain | 170 | 86 |
| 3/31/19 | Prostate | France | 118 | 112 |
| 3/31/19 | Prostate | Germany | 129 | 127 |
| 3/31/19 | Prostate | Spain | 262 | 234 |

Constrains (filters) data to dates after and including 1/1/19

| date | cancer | country | cases | remissions |
|---|---|---|---|---|
| 1/15/19 | Colon | Germany | 115 | 90 |
| 1/15/19 | Lung | Germany | 121 | 58 |
| 1/31/19 | Colon | Germany | 135 | 105 |
| 1/31/19 | Colon | Spain | 138 | 98 |
| 1/31/19 | Lung | Germany | 159 | 76 |
| 1/31/19 | Lung | Spain | 173 | 88 |
| 1/31/19 | Prostate | France | 104 | 98 |
| 1/31/19 | Prostate | Germany | 135 | 133 |
| 2/12/19 | Lung | France | 199 | 91 |
| 2/15/19 | Colon | Germany | 99 | 77 |
| 2/28/19 | Colon | Germany | 144 | 113 |
| 2/28/19 | Colon | Spain | 122 | 88 |
| 2/28/19 | Lung | Germany | 272 | 130 |
| 2/28/19 | Lung | Spain | 154 | 78 |
| 2/28/19 | Prostate | France | 108 | 102 |
| 2/28/19 | Prostate | Germany | 133 | 130 |
| 3/15/19 | Colon | Spain | 77 | 56 |
| 3/31/19 | Colon | France | 493 | 344 |
| 3/31/19 | Colon | Germany | 237 | 186 |
| 3/31/19 | Colon | Spain | 68 | 48 |
| 3/31/19 | Lung | France | 338 | 155 |
| 3/31/19 | Lung | Germany | 291 | 138 |
| 3/31/19 | Lung | Spain | 170 | 86 |
| 3/31/19 | Prostate | France | 118 | 112 |
| 3/31/19 | Prostate | Germany | 129 | 127 |
| 3/31/19 | Prostate | Spain | 262 | 234 |

Sorts data by ascending cancer values and ascending country values

| cancer | country | cases | remissions |
|---|---|---|---|
| Colon | France | 493 | 344 |
| Colon | Germany | 99 | 77 |
| Colon | Germany | 115 | 90 |
| Colon | Germany | 135 | 105 |
| Colon | Germany | 144 | 113 |
| Colon | Germany | 237 | 186 |
| Colon | Spain | 68 | 48 |
| Colon | Spain | 77 | 56 |
| Colon | Spain | 122 | 88 |
| Colon | Spain | 138 | 98 |
| Lung | France | 199 | 91 |
| Lung | France | 338 | 155 |
| Lung | Germany | 121 | 58 |
| Lung | Germany | 159 | 76 |
| Lung | Germany | 272 | 130 |
| Lung | Germany | 291 | 138 |
| Lung | Spain | 154 | 78 |
| Lung | Spain | 170 | 86 |
| Lung | Spain | 173 | 88 |
| Prostate | France | 104 | 98 |
| Prostate | France | 108 | 102 |
| Prostate | France | 118 | 112 |
| Prostate | Germany | 129 | 127 |
| Prostate | Germany | 133 | 130 |
| Prostate | Germany | 135 | 133 |
| Prostate | Spain | 262 | 234 |

STEPS 4 TO 6

④ Creates cancer and country combination LOOPs (deduped to make them more visible)

| cancer | country | cases | remissions |
|---|---|---|---|
| Colon | France | 493 | 344 |
| Colon | Germany | 99 | 77 |
| | | 115 | 90 |
| | | 135 | 105 |
| | | 144 | 113 |
| | | 237 | 186 |
| Colon | Spain | 68 | 48 |
| | | 77 | 56 |
| | | 122 | 88 |
| | | 138 | 98 |
| Lung | France | 199 | 91 |
| | | 338 | 155 |
| Lung | Germany | 121 | 58 |
| | | 159 | 76 |
| | | 272 | 130 |
| | | 291 | 138 |
| Lung | Spain | 154 | 78 |
| | | 170 | 86 |
| | | 173 | 88 |
| Prostate | France | 104 | 98 |
| | | 108 | 102 |
| | | 118 | 112 |
| Prostate | Germany | 129 | 127 |
| | | 133 | 130 |
| | | 135 | 133 |
| Prostate | Spain | 262 | 234 |

⑤ Does the LOOP calcs of SUM(cases) and SUM(remissions)/ SUM(cases) in the order set in step 3

| cancer | country | SUM (cases) | SUM (remissions)/ SUM (cases) |
|---|---|---|---|
| Colon | France | 493 | 69.8% |
| Colon | Germany | 730 | 78.2% |
| Colon | Spain | 405 | 71.6% |
| Lung | France | 537 | 45.8% |
| Lung | Germany | 843 | 47.7% |
| Lung | Spain | 497 | 50.7% |
| Prostate | France | 330 | 94.5% |
| Prostate | Germany | 397 | 98.2% |
| Prostate | Spain | 262 | 89.3% |

⑥ Return values to cells A2 to D5, limited to the first 4 rows

| | | | |
|---|---|---|---|
| Colon | France | 493 | 69.8% |
| Colon | Germany | 730 | 78.2% |
| Colon | Spain | 405 | 71.6% |
| Lung | France | 537 | 45.8% |

STEPS 1 TO 3

① Retrieves all the data from the respective cell ranges

| H2:H36 | I2:I36 | J2:J36 | K2:K36 | L2:L36 |
|---|---|---|---|---|
| 12/31/18 | Lung | Germany | 271 | 130 |
| 12/31/18 | Colon | Germany | 243 | 101 |
| 12/31/18 | Prostate | Germany | 129 | 127 |
| 12/31/18 | Lung | Spain | 179 | 91 |
| 12/31/18 | Colon | Spain | 126 | 92 |
| 12/31/18 | Prostate | Spain | 92 | 83 |
| 12/31/18 | Lung | France | 165 | 75 |
| 12/31/18 | Colon | France | 146 | 104 |
| 12/31/18 | Prostate | France | 112 | 106 |
| 1/15/19 | Colon | Germany | 115 | 90 |
| 1/15/19 | Lung | Germany | 121 | 58 |
| 1/31/19 | Colon | Germany | 135 | 105 |
| 1/31/19 | Colon | Spain | 138 | 98 |
| 1/31/19 | Lung | Germany | 159 | 76 |
| 1/31/19 | Lung | Spain | 173 | 88 |
| 1/31/19 | Prostate | France | 104 | 98 |
| 1/31/19 | Prostate | Germany | 135 | 133 |
| 2/12/19 | Lung | France | 199 | 91 |
| 2/15/19 | Colon | Germany | 99 | 77 |
| 2/28/19 | Colon | Germany | 144 | 113 |
| 2/28/19 | Colon | Spain | 122 | 88 |
| 2/28/19 | Lung | Germany | 272 | 130 |
| 2/28/19 | Lung | Spain | 154 | 78 |
| 2/28/19 | Prostate | France | 108 | 102 |
| 2/28/19 | Prostate | Germany | 133 | 130 |
| 3/15/19 | Colon | Spain | 77 | 56 |
| 3/31/19 | Colon | France | 493 | 344 |
| 3/31/19 | Colon | Germany | 237 | 186 |
| 3/31/19 | Colon | Spain | 68 | 48 |
| 3/31/19 | Lung | France | 338 | 155 |
| 3/31/19 | Lung | Germany | 291 | 138 |
| 3/31/19 | Lung | Spain | 170 | 86 |
| 3/31/19 | Prostate | France | 118 | 112 |
| 3/31/19 | Prostate | Germany | 129 | 127 |
| 3/31/19 | Prostate | Spain | 262 | 234 |

② Constrains (filters) data to dates between and including 1/1/19 and 3/31/19

| H2:H36 | I2:I36 | J2:J36 | K2:K36 | L2:L36 |
|---|---|---|---|---|
| 1/15/19 | Colon | Germany | 115 | 90 |
| 1/15/19 | Lung | Germany | 121 | 58 |
| 1/31/19 | Colon | Germany | 135 | 105 |
| 1/31/19 | Colon | Spain | 138 | 98 |
| 1/31/19 | Lung | Germany | 159 | 76 |
| 1/31/19 | Lung | Spain | 173 | 88 |
| 1/31/19 | Prostate | France | 104 | 98 |
| 1/31/19 | Prostate | Germany | 135 | 133 |
| 2/12/19 | Lung | France | 199 | 91 |
| 2/15/19 | Colon | Germany | 99 | 77 |
| 2/28/19 | Colon | Germany | 144 | 113 |
| 2/28/19 | Colon | Spain | 122 | 88 |
| 2/28/19 | Lung | Germany | 272 | 130 |
| 2/28/19 | Lung | Spain | 154 | 78 |
| 2/28/19 | Prostate | France | 108 | 102 |
| 2/28/19 | Prostate | Germany | 133 | 130 |
| 3/15/19 | Colon | Spain | 77 | 56 |
| 3/31/19 | Colon | France | 493 | 344 |
| 3/31/19 | Colon | Germany | 237 | 186 |
| 3/31/19 | Colon | Spain | 68 | 48 |
| 3/31/19 | Lung | France | 338 | 155 |
| 3/31/19 | Lung | Germany | 291 | 138 |
| 3/31/19 | Lung | Spain | 170 | 86 |
| 3/31/19 | Prostate | France | 118 | 112 |
| 3/31/19 | Prostate | Germany | 129 | 127 |
| 3/31/19 | Prostate | Spain | 262 | 234 |

③ Sorts data by ascending I2:I36 values and ascending J2:J36 values

| I2:I36 | J2:J36 | K2:K36 | L2:L36 |
|---|---|---|---|
| Colon | France | 493 | 344 |
| Colon | Germany | 99 | 77 |
| Colon | Germany | 115 | 90 |
| Colon | Germany | 135 | 105 |
| Colon | Germany | 144 | 113 |
| Colon | Germany | 237 | 186 |
| Colon | Spain | 68 | 48 |
| Colon | Spain | 77 | 56 |
| Colon | Spain | 122 | 88 |
| Colon | Spain | 138 | 98 |
| Lung | France | 199 | 91 |
| Lung | France | 338 | 155 |
| Lung | Germany | 121 | 58 |
| Lung | Germany | 159 | 76 |
| Lung | Germany | 272 | 130 |
| Lung | Germany | 291 | 138 |
| Lung | Spain | 154 | 78 |
| Lung | Spain | 170 | 86 |
| Lung | Spain | 173 | 88 |
| Prostate | France | 104 | 98 |
| Prostate | France | 108 | 102 |
| Prostate | France | 118 | 112 |
| Prostate | Germany | 129 | 127 |
| Prostate | Germany | 133 | 130 |
| Prostate | Germany | 135 | 133 |
| Prostate | Spain | 262 | 234 |

FIG. 16

STEPS 4 TO 6

4 Creates I2:I36 and J2:J36 combination LOOPs (deduped to be more visible)

| I2:I36 | J2:J36 | K2:K36 | L2:L36 |
|---|---|---|---|
| Colon | France | 493 | 344 |
| Colon | Germany | 99 | 77 |
| | | 115 | 90 |
| | | 135 | 105 |
| | | 144 | 113 |
| | | 237 | 186 |
| Colon | Spain | 68 | 48 |
| | | 77 | 56 |
| | | 122 | 88 |
| | | 138 | 98 |
| Lung | France | 199 | 91 |
| | | 338 | 155 |
| Lung | Germany | 121 | 58 |
| | | 159 | 76 |
| | | 272 | 130 |
| | | 291 | 138 |
| Lung | Spain | 154 | 78 |
| | | 170 | 86 |
| | | 173 | 88 |
| Prostate | France | 104 | 98 |
| | | 108 | 102 |
| | | 118 | 112 |
| Prostate | Germany | 129 | 127 |
| | | 133 | 130 |
| | | 135 | 133 |
| Prostate | Spain | 262 | 234 |

5 Does LOOP calcs of SUM(K2:K36) and SUM(L2:L36) / SUM(K2:K36)

| I2:I36 | J2:J36 | SUM (K2:K36) | SUM(L2:L36)/ SUM(K2:K36) |
|---|---|---|---|
| Colon | France | 493 | 69.8% |
| Colon | Germany | 730 | 78.2% |
| Colon | Spain | 405 | 71.6% |
| Lung | France | 537 | 45.8% |
| Lung | Germany | 843 | 47.7% |
| Lung | Spain | 497 | 50.7% |
| Prostate | France | 330 | 94.5% |
| Prostate | Germany | 397 | 98.2% |
| Prostate | Spain | 262 | 89.3% |

6 Returns values to cells C11 to F14 limited to 4 rows with the cell formatting

| | C | D | E | F |
|---|---|---|---|---|
| 11 | Colon | France | 493 | 69.8% |
| 12 | Colon | Germany | 730 | 78.2% |
| 13 | Colon | Spain | 405 | 71.6% |
| 14 | Lung | France | 537 | 45.8% |

FIG. 19

STEPS 1 TO 3

1952

1 Retrieves all the data for the NSC formulaic data fields:

| date | cancer | country | cases | remissions |
|---|---|---|---|---|
| 12/31/18 | Lung | Germany | 271 | 130 |
| 12/31/18 | Colon | Germany | 243 | 101 |
| 12/31/18 | Prostate | Germany | 129 | 127 |
| 12/31/18 | Lung | Spain | 179 | 91 |
| 12/31/18 | Colon | Spain | 126 | 92 |
| 12/31/18 | Prostate | Spain | 92 | 83 |
| 12/31/18 | Lung | France | 165 | 75 |
| 12/31/18 | Colon | France | 146 | 104 |
| 12/31/18 | Prostate | France | 112 | 106 |
| 1/15/19 | Colon | Germany | 115 | 90 |
| 1/15/19 | Lung | Germany | 121 | 58 |
| 1/31/19 | Colon | Germany | 135 | 105 |
| 1/31/19 | Colon | Spain | 138 | 98 |
| 1/31/19 | Lung | Germany | 159 | 76 |
| 1/31/19 | Lung | Spain | 173 | 88 |
| 1/31/19 | Prostate | France | 104 | 98 |
| 1/31/19 | Prostate | Germany | 135 | 133 |
| 2/12/19 | Lung | France | 199 | 91 |
| 2/15/19 | Colon | Germany | 99 | 77 |
| 2/28/19 | Colon | Germany | 144 | 113 |
| 2/28/19 | Colon | Spain | 122 | 88 |
| 2/28/19 | Lung | Germany | 272 | 130 |
| 2/28/19 | Lung | Spain | 154 | 78 |
| 2/28/19 | Prostate | France | 108 | 102 |
| 2/28/19 | Prostate | Germany | 133 | 130 |
| 3/15/19 | Colon | Spain | 77 | 56 |
| 3/31/19 | Colon | France | 493 | 344 |
| 3/31/19 | Colon | Germany | 237 | 186 |
| 3/31/19 | Colon | Spain | 68 | 48 |
| 3/31/19 | Lung | France | 338 | 155 |
| 3/31/19 | Lung | Germany | 291 | 138 |
| 3/31/19 | Lung | Spain | 170 | 86 |
| 3/31/19 | Prostate | France | 118 | 112 |
| 3/31/19 | Prostate | Germany | 129 | 127 |
| 3/31/19 | Prostate | Spain | 262 | 234 |

1955

2 Constrains (filters) data to dates after and including 1/1/19

| date | cancer | country | cases | remissions |
|---|---|---|---|---|
| 1/15/19 | Colon | Germany | 115 | 90 |
| 1/15/19 | Lung | Germany | 121 | 58 |
| 1/31/19 | Colon | Germany | 135 | 105 |
| 1/31/19 | Colon | Spain | 138 | 98 |
| 1/31/19 | Lung | Germany | 159 | 76 |
| 1/31/19 | Lung | Spain | 173 | 88 |
| 1/31/19 | Prostate | France | 104 | 98 |
| 1/31/19 | Prostate | Germany | 135 | 133 |
| 2/12/19 | Lung | France | 199 | 91 |
| 2/15/19 | Colon | Germany | 99 | 77 |
| 2/28/19 | Colon | Germany | 144 | 113 |
| 2/28/19 | Colon | Spain | 122 | 88 |
| 2/28/19 | Lung | Germany | 272 | 130 |
| 2/28/19 | Lung | Spain | 154 | 78 |
| 2/28/19 | Prostate | France | 108 | 102 |
| 2/28/19 | Prostate | Germany | 133 | 130 |
| 3/15/19 | Colon | Spain | 77 | 56 |
| 3/31/19 | Colon | France | 493 | 344 |
| 3/31/19 | Colon | Germany | 237 | 186 |
| 3/31/19 | Colon | Spain | 68 | 48 |
| 3/31/19 | Lung | France | 338 | 155 |
| 3/31/19 | Lung | Germany | 291 | 138 |
| 3/31/19 | Lung | Spain | 170 | 86 |
| 3/31/19 | Prostate | France | 118 | 112 |
| 3/31/19 | Prostate | Germany | 129 | 127 |
| 3/31/19 | Prostate | Spain | 262 | 234 |

1958

3 Sorts data by ascending cancer values and ascending country values

| cancer | country | cases | remissions |
|---|---|---|---|
| Colon | France | 493 | 344 |
| Colon | Germany | 99 | 77 |
| Colon | Germany | 115 | 90 |
| Colon | Germany | 135 | 105 |
| Colon | Germany | 144 | 113 |
| Colon | Germany | 237 | 186 |
| Colon | Spain | 68 | 48 |
| Colon | Spain | 77 | 56 |
| Colon | Spain | 122 | 88 |
| Colon | Spain | 138 | 98 |
| Lung | France | 199 | 91 |
| Lung | France | 338 | 155 |
| Lung | Germany | 121 | 58 |
| Lung | Germany | 159 | 76 |
| Lung | Germany | 272 | 130 |
| Lung | Germany | 291 | 138 |
| Lung | Spain | 154 | 78 |
| Lung | Spain | 170 | 86 |
| Lung | Spain | 173 | 88 |
| Prostate | France | 104 | 98 |
| Prostate | France | 108 | 102 |
| Prostate | France | 118 | 112 |
| Prostate | Germany | 129 | 127 |
| Prostate | Germany | 133 | 130 |
| Prostate | Germany | 135 | 133 |
| Prostate | Spain | 262 | 234 |

STEPS 4 TO 6

4 Creates cancer and country combination LOOPs with total and subtotals (deduped for visibility)

| cancer | country | cases | remissions |
|---|---|---|---|
| Colon | France | 493 | 344 |
| Colon | Germany | 99 | 77 |
| | | 115 | 90 |
| | | 135 | 105 |
| | | 144 | 113 |
| | | 237 | 186 |
| Colon | Spain | 68 | 48 |
| | | 77 | 56 |
| | | 122 | 88 |
| | | 138 | 98 |
| Colon | subtotal | | |
| Lung | France | 199 | 91 |
| | | 338 | 155 |
| Lung | Germany | 121 | 58 |
| | | 159 | 76 |
| | | 273 | 130 |
| | | 291 | 138 |
| Lung | Spain | 154 | 78 |
| | | 170 | 86 |
| | | 173 | 88 |
| Lung | subtotal | | |
| Prostate | France | 104 | 98 |
| | | 108 | 102 |
| | | 118 | 112 |
| Prostate | Germany | 129 | 127 |
| | | 133 | 130 |
| | | 135 | 133 |
| Prostate | Spain | 262 | 234 |
| Prostate | subtotal | | |
| Total | | | |

5 Does LOOP calcs of SUM(cases) and SUM(remissions)/ SUM(cases) for all LOOPs including total and subtotals

| cancer | country | SUM (cases) | SUM (remissions)/ SUM (cases) |
|---|---|---|---|
| Colon | France | 493 | 0.69776876 |
| Colon | Germany | 730 | 0.78219178 |
| Colon | Spain | 405 | 0.71604938 |
| Colon | subtotal | 1628 | 0.74017199 |
| Lung | France | 537 | 0.45810056 |
| Lung | Germany | 843 | 0.47686833 |
| Lung | Spain | 497 | 0.50704225 |
| Lung | subtotal | 1877 | 0.47948855 |
| Prostate | France | 330 | 0.94545455 |
| Prostate | Germany | 397 | 0.98236776 |
| Prostate | Spain | 262 | 0.89312977 |
| Prostate | subtotal | 989 | 0.94641052 |
| Total | | 4494 | 0.67668002 |

6 Return values to cells A2 to D14, with total and subtotal formatting

| | | | |
|---|---|---|---|
| Colon | France | 493 | 69.8% |
| | Germany | 730 | 78.2% |
| | Spain | 405 | 71.6% |
| | subtotal | 1628 | 74.0% |
| Lung | France | 537 | 45.8% |
| | Germany | 843 | 47.7% |
| | Spain | 497 | 50.7% |
| | subtotal | 1877 | 47.9% |
| Prostate | France | 330 | 94.5% |
| | Germany | 397 | 98.2% |
| | Spain | 262 | 89.3% |
| | subtotal | 989 | 94.6% |
| Total | | 4494 | 67.7% |

EXAMPLES OF RANGE OR ARRAY SPREADSHEET FUNCTIONS

| FUNCTION | VARIANTS |
|---|---|
| AVEDEV | |
| AVERAGE | all variants (e.g., A, IF and IFS) |
| CONCAT | |
| COUNT | all variants (e.g., A, BLANK, IF and IFS) |
| GEOMEAN | |
| HARMEAN | |
| LARGE | |
| MAX | all variants including DMAX |
| MEDIAN | |
| MIN | all variants including DMIN |
| MODE | all variants |
| PERCENTILE | all variants |
| PERCENTRANK | all variants |
| QUARTILE | All variants |
| SMALL | |
| STDEV | all variants including DSTDEV and its variants |
| SUM | All variants including DSUM |
| UNIQUE | |
| VAR | all variants including DVAR and its variants |

STEPS 1 TO 3

1 Retrieves all the data for the NSC formulaic data fields

| date | cancer | country | cases |
|---|---|---|---|
| 12/31/18 | Lung | Germany | 271 |
| 12/31/18 | Colon | Germany | 243 |
| 12/31/18 | Prostate | Germany | 129 |
| 12/31/18 | Lung | Spain | 179 |
| 12/31/18 | Colon | Spain | 126 |
| 12/31/18 | Prostate | Spain | 92 |
| 12/31/18 | Lung | France | 165 |
| 12/31/18 | Colon | France | 146 |
| 12/31/18 | Prostate | France | 112 |
| 1/15/19 | Colon | Germany | 115 |
| 1/15/19 | Lung | Germany | 121 |
| 1/31/19 | Colon | Germany | 135 |
| 1/31/19 | Colon | Spain | 138 |
| 1/31/19 | Lung | Germany | 159 |
| 1/31/19 | Lung | Spain | 173 |
| 1/31/19 | Prostate | France | 104 |
| 1/31/19 | Prostate | Germany | 135 |
| 2/12/19 | Lung | France | 199 |
| 2/15/19 | Colon | Germany | 99 |
| 2/28/19 | Colon | Germany | 144 |
| 2/28/19 | Colon | Spain | 122 |
| 2/28/19 | Lung | Germany | 272 |
| 2/28/19 | Lung | Spain | 154 |
| 2/28/19 | Prostate | France | 108 |
| 2/28/19 | Prostate | Germany | 133 |
| 3/15/19 | Colon | Spain | 77 |
| 3/31/19 | Colon | France | 493 |
| 3/31/19 | Colon | Germany | 237 |
| 3/31/19 | Colon | Spain | 68 |
| 3/31/19 | Lung | France | 338 |
| 3/31/19 | Lung | Germany | 291 |
| 3/31/19 | Lung | Spain | 170 |
| 3/31/19 | Prostate | France | 118 |
| 3/31/19 | Prostate | Germany | 129 |
| 3/31/19 | Prostate | Spain | 262 |

2 Constrains (filters) data to dates after and including 1/1/19

| date | cancer | country | cases |
|---|---|---|---|
| 1/15/19 | Colon | Germany | 115 |
| 1/15/19 | Lung | Germany | 121 |
| 1/31/19 | Colon | Germany | 135 |
| 1/31/19 | Colon | Spain | 138 |
| 1/31/19 | Lung | Germany | 159 |
| 1/31/19 | Lung | Spain | 173 |
| 1/31/19 | Prostate | France | 104 |
| 1/31/19 | Prostate | Germany | 135 |
| 2/12/19 | Lung | France | 199 |
| 2/15/19 | Colon | Germany | 99 |
| 2/28/19 | Colon | Germany | 144 |
| 2/28/19 | Colon | Spain | 122 |
| 2/28/19 | Lung | Germany | 272 |
| 2/28/19 | Lung | Spain | 154 |
| 2/28/19 | Prostate | France | 108 |
| 2/28/19 | Prostate | Germany | 133 |
| 3/15/19 | Colon | Spain | 77 |
| 3/31/19 | Colon | France | 493 |
| 3/31/19 | Colon | Germany | 237 |
| 3/31/19 | Colon | Spain | 68 |
| 3/31/19 | Lung | France | 338 |
| 3/31/19 | Lung | Germany | 291 |
| 3/31/19 | Lung | Spain | 170 |
| 3/31/19 | Prostate | France | 118 |
| 3/31/19 | Prostate | Germany | 129 |
| 3/31/19 | Prostate | Spain | 262 |

3 Sorts on cancer and country data values preparing for creating LOOPs

| cancer | country | cases |
|---|---|---|
| Colon | France | 493 |
| Colon | Germany | 115 |
| Colon | Germany | 135 |
| Colon | Germany | 99 |
| Colon | Germany | 144 |
| Colon | Germany | 237 |
| Colon | Spain | 138 |
| Colon | Spain | 122 |
| Colon | Spain | 77 |
| Colon | Spain | 68 |
| Lung | France | 199 |
| Lung | France | 338 |
| Lung | Germany | 121 |
| Lung | Germany | 159 |
| Lung | Germany | 272 |
| Lung | Germany | 291 |
| Lung | Spain | 173 |
| Lung | Spain | 154 |
| Lung | Spain | 170 |
| Prostate | France | 104 |
| Prostate | France | 108 |
| Prostate | France | 118 |
| Prostate | Germany | 135 |
| Prostate | Germany | 133 |
| Prostate | Germany | 129 |
| Prostate | Spain | 262 |

STEPS 4 TO 7

4 Create cancer and country combination LOOPs

| cancer | country | cases |
|---|---|---|
| Colon | France | 493 |
| Colon | Germany | 115 |
| | | 135 |
| | | 99 |
| | | 144 |
| | | 237 |
| Colon | Spain | 138 |
| | | 122 |
| | | 77 |
| | | 68 |
| Lung | France | 199 |
| | | 338 |
| Lung | Germany | 121 |
| | | 159 |
| | | 272 |
| | | 291 |
| Lung | Spain | 173 |
| | | 154 |
| | | 170 |
| Prostate | France | 104 |
| | | 108 |
| | | 118 |
| Prostate | Germany | 135 |
| | | 133 |
| | | 129 |
| Prostate | Spain | 262 |

5 Do LOOP SUM(cases{}) calcs

| cancer | country | SUM |
|---|---|---|
| Colon | France | 493 |
| Colon | Germany | 730 |
| Colon | Spain | 405 |
| Lung | France | 537 |
| Lung | Germany | 843 |
| Lung | Spain | 497 |
| Prostate | France | 330 |
| Prostate | Germany | 397 |
| Prostate | Spain | 262 |

6 Ascending order data on Formula1 results (default setting)

| cancer | country | SUM |
|---|---|---|
| Prostate | Spain | 262 |
| Prostate | France | 330 |
| Prostate | Germany | 397 |
| Colon | Spain | 405 |
| Colon | France | 493 |
| Lung | Spain | 497 |
| Lung | France | 537 |
| Colon | Germany | 730 |
| Lung | Germany | 843 |

2937

2938

7 LIMIT values to 5 rows returned to cells A4 to C8

| | | |
|---|---|---|
| Prostate | Spain | 262 |
| Prostate | France | 330 |
| Prostate | Germany | 397 |
| Colon | Spain | 405 |
| Colon | France | 493 |

STEPS 1 TO 3

① Retrieves all the data for the respective cell ranges

| H2:H36 | I2:I36 | J2:J36 | K2:K36 | L2:L36 |
|---|---|---|---|---|
| 12/31/18 | Lung | Germany | 271 | 130 |
| 12/31/18 | Colon | Germany | 243 | 101 |
| 12/31/18 | Prostate | Germany | 129 | 127 |
| 12/31/18 | Lung | Spain | 179 | 91 |
| 12/31/18 | Colon | Spain | 126 | 92 |
| 12/31/18 | Prostate | Spain | 92 | 83 |
| 12/31/18 | Lung | France | 165 | 75 |
| 12/31/18 | Colon | France | 146 | 104 |
| 12/31/18 | Prostate | France | 112 | 106 |
| 1/15/19 | Colon | Germany | 115 | 90 |
| 1/15/19 | Lung | Germany | 121 | 58 |
| 1/31/19 | Colon | Germany | 135 | 105 |
| 1/31/19 | Colon | Spain | 138 | 98 |
| 1/31/19 | Lung | Germany | 159 | 76 |
| 1/31/19 | Lung | Spain | 173 | 88 |
| 1/31/19 | Prostate | France | 104 | 98 |
| 1/31/19 | Prostate | Germany | 135 | 133 |
| 2/12/19 | Lung | France | 199 | 91 |
| 2/15/19 | Colon | Germany | 99 | 77 |
| 2/28/19 | Colon | Germany | 144 | 113 |
| 2/28/19 | Colon | Spain | 122 | 88 |
| 2/28/19 | Lung | Germany | 272 | 130 |
| 2/28/19 | Lung | Spain | 154 | 78 |
| 2/28/19 | Prostate | France | 108 | 102 |
| 2/28/19 | Prostate | Germany | 133 | 130 |
| 3/15/19 | Colon | Spain | 77 | 56 |
| 3/31/19 | Colon | France | 493 | 344 |
| 3/31/19 | Colon | Germany | 237 | 186 |
| 3/31/19 | Colon | Spain | 68 | 48 |
| 3/31/19 | Lung | France | 338 | 155 |
| 3/31/19 | Lung | Germany | 291 | 138 |
| 3/31/19 | Lung | Spain | 170 | 86 |
| 3/31/19 | Prostate | France | 118 | 112 |
| 3/31/19 | Prostate | Germany | 129 | 127 |
| 3/31/19 | Prostate | Spain | 262 | 234 |

② Constrains (filters) data to dates between and including 1/1/19 and 3/31/19

| H2:H36 | I2:I36 | J2:J36 | K2:K36 | L2:L36 |
|---|---|---|---|---|
| 1/15/19 | Colon | Germany | 115 | 90 |
| 1/15/19 | Lung | Germany | 121 | 58 |
| 1/31/19 | Colon | Germany | 135 | 105 |
| 1/31/19 | Colon | Spain | 138 | 98 |
| 1/31/19 | Lung | Germany | 159 | 76 |
| 1/31/19 | Lung | Spain | 173 | 88 |
| 1/31/19 | Prostate | France | 104 | 98 |
| 1/31/19 | Prostate | Germany | 135 | 133 |
| 2/12/19 | Lung | France | 199 | 91 |
| 2/15/19 | Colon | Germany | 99 | 77 |
| 2/28/19 | Colon | Germany | 144 | 113 |
| 2/28/19 | Colon | Spain | 122 | 88 |
| 2/28/19 | Lung | Germany | 272 | 130 |
| 2/28/19 | Lung | Spain | 154 | 78 |
| 2/28/19 | Prostate | France | 108 | 102 |
| 2/28/19 | Prostate | Germany | 133 | 130 |
| 3/15/19 | Colon | Spain | 77 | 56 |
| 3/31/19 | Colon | France | 493 | 344 |
| 3/31/19 | Colon | Germany | 237 | 186 |
| 3/31/19 | Colon | Spain | 68 | 48 |
| 3/31/19 | Lung | France | 338 | 155 |
| 3/31/19 | Lung | Germany | 291 | 138 |
| 3/31/19 | Lung | Spain | 170 | 86 |
| 3/31/19 | Prostate | France | 118 | 112 |
| 3/31/19 | Prostate | Germany | 129 | 127 |
| 3/31/19 | Prostate | Spain | 262 | 234 |

③ Sorts on I2:I36 and J2:J36 data values preparing for creating LOOPs

| I2:I36 | J2:J36 | K2:K36 | L2:L36 |
|---|---|---|---|
| Colon | France | 493 | 344 |
| Colon | Germany | 99 | 77 |
| Colon | Germany | 115 | 90 |
| Colon | Germany | 135 | 105 |
| Colon | Germany | 144 | 113 |
| Colon | Germany | 237 | 186 |
| Colon | Spain | 68 | 48 |
| Colon | Spain | 77 | 56 |
| Colon | Spain | 122 | 88 |
| Colon | Spain | 138 | 98 |
| Lung | France | 199 | 91 |
| Lung | France | 338 | 155 |
| Lung | Germany | 121 | 58 |
| Lung | Germany | 159 | 76 |
| Lung | Germany | 272 | 130 |
| Lung | Germany | 291 | 138 |
| Lung | Spain | 154 | 78 |
| Lung | Spain | 170 | 86 |
| Lung | Spain | 173 | 88 |
| Prostate | France | 104 | 98 |
| Prostate | France | 108 | 102 |
| Prostate | France | 118 | 112 |
| Prostate | Germany | 129 | 127 |
| Prostate | Germany | 133 | 130 |
| Prostate | Germany | 135 | 133 |
| Prostate | Spain | 262 | 234 |

STEPS 1 TO 3

① Retrieves all the data for the NSC formulaic data fields

| cancer | country | cases | remit |
|---|---|---|---|
| Lung | Germany | 271 | 161 |
| Colon | Germany | 243 | 205 |
| Prostate | Germany | 129 | 117 |
| Lung | Spain | 179 | 130 |
| Colon | Spain | 126 | 108 |
| Prostate | Spain | 92 | 84 |
| Lung | France | 165 | 99 |
| Colon | France | 146 | 123 |
| Prostate | France | 112 | 103 |
| Colon | Germany | 115 | 96 |
| Lung | Germany | 121 | 74 |
| Colon | Germany | 135 | 117 |
| Colon | Spain | 138 | 115 |
| Lung | Germany | 159 | 94 |
| Lung | Spain | 173 | 102 |
| Prostate | France | 104 | 97 |
| Prostate | Germany | 135 | 126 |

② Assembles the data for each Loop and Formula and sorts the all the Loops by the default sort of ascending

| country | cases | cancer | remit |
|---|---|---|---|
| France | 146 | Colon | 123 |
| France | 165 | Lung | 99 |
| France | 112 | Prostate | 103 |
| France | 104 | Prostate | 97 |
| Germany | 243 | Colon | 205 |
| Germany | 115 | Colon | 96 |
| Germany | 135 | Colon | 117 |
| Germany | 271 | Lung | 161 |
| Germany | 121 | Lung | 74 |
| Germany | 159 | Lung | 94 |
| Germany | 129 | Prostate | 117 |
| Germany | 135 | Prostate | 126 |
| Spain | 126 | Colon | 108 |
| Spain | 138 | Colon | 115 |
| Spain | 179 | Lung | 130 |
| Spain | 173 | Lung | 102 |
| Spain | 92 | Prostate | 84 |

③ Creates two levels of LOOPs (made easier to see by deduping)

| country | cases | cancer | remit |
|---|---|---|---|
| France | 146 | Colon | 123 |
| | 165 | Lung | 99 |
| | 112 | Prostate | 103 |
| | 104 | | 97 |
| Germany | 243 | Colon | 205 |
| | 115 | | 96 |
| | 135 | | 117 |
| | 271 | Lung | 161 |
| | 121 | | 74 |
| | 159 | | 94 |
| | 129 | Prostate | 117 |
| | 135 | | 126 |
| Spain | 126 | Colon | 108 |
| | 138 | | 115 |
| | 179 | Lung | 130 |
| | 173 | | 102 |
| | 92 | Prostate | 84 |

STEPS 1 TO 3

1. Retrieves all the data for the NSC formulaic data fields

| cancer | country | cases | remit |
|---|---|---|---|
| Lung | Germany | 271 | 161 |
| Colon | Germany | 243 | 205 |
| Prostate | Germany | 129 | 117 |
| Lung | Spain | 179 | 130 |
| Colon | Spain | 126 | 108 |
| Prostate | Spain | 92 | 84 |
| Lung | France | 165 | 99 |
| Colon | France | 146 | 123 |
| Prostate | France | 112 | 103 |
| Colon | Germany | 115 | 96 |
| Lung | Germany | 121 | 74 |
| Colon | Germany | 135 | 117 |
| Colon | Spain | 138 | 115 |
| Lung | Germany | 159 | 94 |
| Lung | Spain | 173 | 102 |
| Prostate | France | 104 | 97 |
| Prostate | Germany | 135 | 126 |

2. Assembles the data for each LOOP and Formula and sorts the the loops !ZA descending

4244 / 4246

| country | cases | cancer | remit | cases |
|---|---|---|---|---|
| Spain | 92 | Prostate | 84 | 92 |
| Spain | 179 | Lung | 130 | 179 |
| Spain | 173 | Lung | 102 | 173 |
| Spain | 126 | Colon | 108 | 126 |
| Spain | 138 | Colon | 115 | 138 |
| Germany | 129 | Prostate | 117 | 129 |
| Germany | 135 | Prostate | 126 | 135 |
| Germany | 271 | Lung | 161 | 271 |
| Germany | 121 | Lung | 74 | 121 |
| Germany | 159 | Lung | 94 | 159 |
| Germany | 243 | Colon | 205 | 243 |
| Germany | 115 | Colon | 96 | 115 |
| Germany | 135 | Colon | 117 | 135 |
| France | 112 | Prostate | 103 | 112 |
| France | 104 | Prostate | 97 | 104 |
| France | 165 | Lung | 99 | 165 |
| France | 146 | Colon | 123 | 146 |

3. Creates two levels of LOOPs (made easier to see by deduping)

4247 / 4248

| country | cases | cancer | remit | cases |
|---|---|---|---|---|
| Spain | 92 | Prostate | 84 | 92 |
| | 179 | Lung | 130 | 179 |
| | 173 | | 102 | 173 |
| | 126 | Colon | 108 | 126 |
| | 138 | | 115 | 138 |
| Germany | 129 | Prostate | 117 | 129 |
| | 135 | | 126 | 135 |
| | 271 | Lung | 161 | 271 |
| | 121 | | 74 | 121 |
| | 159 | | 94 | 159 |
| | 243 | Colon | 205 | 243 |
| | 115 | | 96 | 115 |
| | 135 | | 117 | 135 |
| France | 112 | Prostate | 103 | 112 |
| | 104 | | 97 | 104 |
| | 165 | Lung | 99 | 165 |
| | 146 | Colon | 123 | 146 |

FIG. 42

STEPS 4 TO 6

4 Does the Formula calculation(s) for each LOOP

| country | SUM(cases{!LOOP})/SUM(cases{!ALL}) |
|---|---|
| Spain | 0.2784113 |
| Germany | 0.5143531 |
| France | 0.2072355 |

4342

| cancer | SUM(remit{!LOOP})/SUM(cases{!LOOP}) |
|---|---|
| Prostate | 0.9130435 |
| Lung | 0.6590909 |
| Colon | 0.844697 |
| Prostate | 0.9204545 |
| Lung | 0.5970962 |
| Colon | 0.8478702 |
| Prostate | 0.9259259 |
| Lung | 0.6 |
| Colon | 0.8424658 |

4343

5 Organized the data for output

| country | SUM(cases{!LOOP})/SUM(cases{!ALL}) | cancer | SUM(cases{!LOOP})/SUM(cases{!ALL}) |
|---|---|---|---|
| Spain | 0.2784113 | Prostate | 0.9130435 |
| | | Lung | 0.6590909 |
| | | Colon | 0.844697 |
| Germany | 0.5143531 | Prostate | 0.9204545 |
| | | Lung | 0.5970962 |
| | | Colon | 0.8478702 |
| France | 0.2072355 | Prostate | 0.9259259 |
| | | Lung | 0.6 |
| | | Colon | 0.8424658 |

4346

6 Returns the values with a LIMIT of 6 rows to cells A2 to D7

| | | | |
|---|---|---|---|
| Spain | 27.8% | Prostate | 91.3% |
| | | Lung | 65.9% |
| | | Colon | 84.5% |
| Germany | 51.4% | Prostate | 92.0% |
| | | Lung | 59.7% |
| | | Colon | 84.8% |

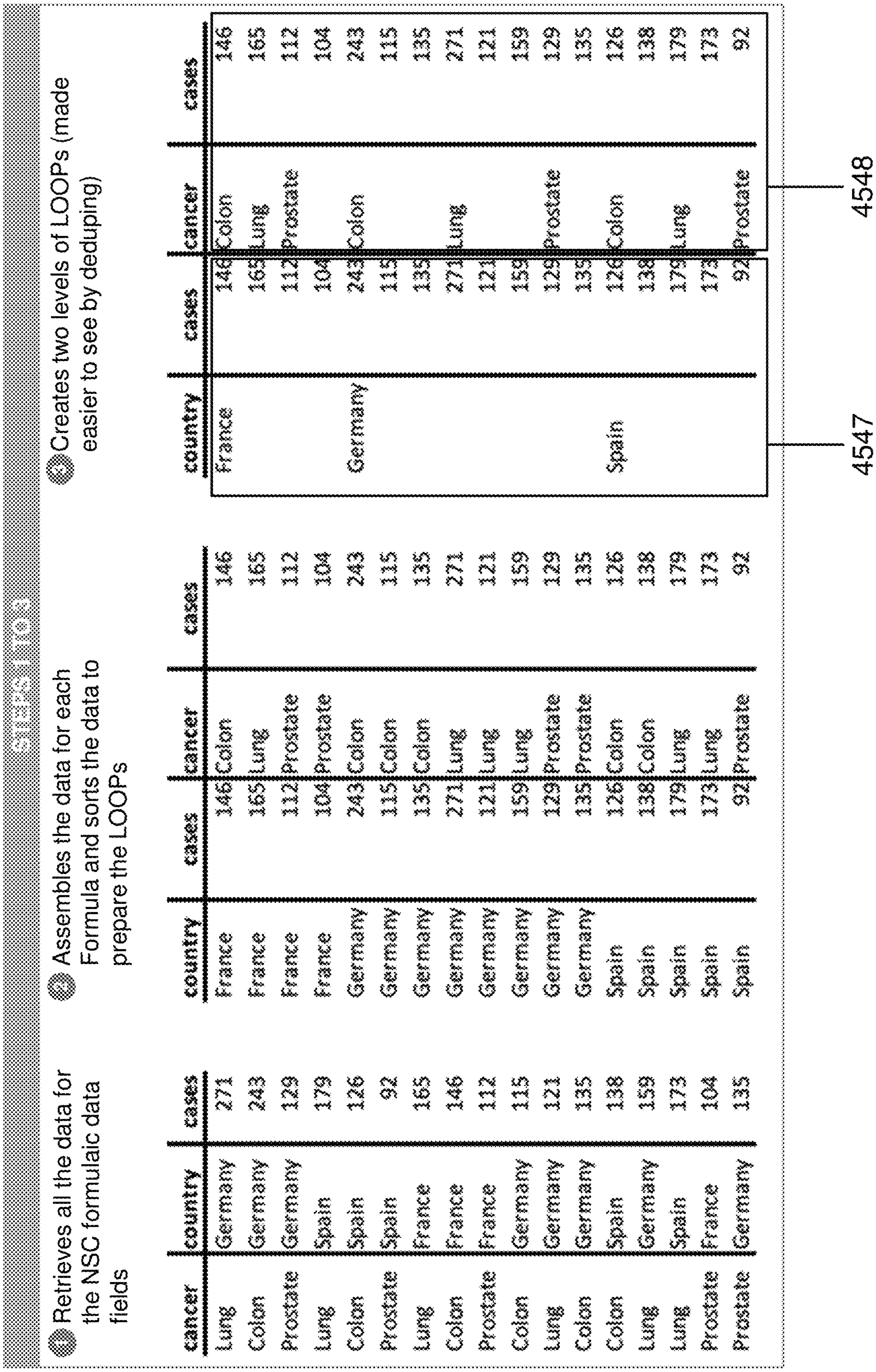

| cancer | country | cases |
|---|---|---|
| Lung | Germany | 271 |
| Colon | Germany | 243 |
| Prostate | Germany | 129 |
| Lung | Spain | 179 |
| Colon | Spain | 126 |
| Prostate | Spain | 92 |
| Lung | France | 165 |
| Colon | France | 146 |
| Prostate | France | 112 |
| Colon | Germany | 115 |
| Lung | Germany | 121 |
| Colon | Germany | 135 |
| Colon | Spain | 138 |
| Lung | Germany | 159 |
| Lung | Spain | 173 |
| Prostate | France | 104 |
| Prostate | Germany | 135 |

| country | cases | cancer | cases |
|---|---|---|---|
| France | 146 | Colon | 146 |
| France | 165 | Lung | 165 |
| France | 112 | Prostate | 112 |
| France | 104 | Prostate | 104 |
| Germany | 243 | Colon | 243 |
| Germany | 115 | Colon | 115 |
| Germany | 135 | Colon | 135 |
| Germany | 271 | Lung | 271 |
| Germany | 121 | Lung | 121 |
| Germany | 159 | Lung | 159 |
| Germany | 129 | Prostate | 129 |
| Germany | 135 | Prostate | 135 |
| Spain | 126 | Colon | 126 |
| Spain | 138 | Colon | 138 |
| Spain | 179 | Lung | 179 |
| Spain | 173 | Lung | 173 |
| Spain | 92 | Prostate | 92 |

| country | cases | cancer | cases |
|---|---|---|---|
| France | 146 | Colon | 146 |
| | 165 | Lung | 165 |
| | 112 | Prostate | 112 |
| | 104 | | 104 |
| Germany | 243 | Colon | 243 |
| | 115 | | 115 |
| | 135 | | 135 |
| | 271 | Lung | 271 |
| | 121 | | 121 |
| | 159 | | 159 |
| | 129 | Prostate | 129 |
| | 135 | | 135 |
| Spain | 126 | Colon | 126 |
| | 138 | | 138 |
| | 179 | Lung | 179 |
| | 173 | | 173 |
| | 92 | Prostate | 92 |

FIG. 45

STEPS 1 TO 3

1 Retrieves all the data for the NSC formulaic data fields

| cancer | country | cases |
|---|---|---|
| Lung | Germany | 271 |
| Colon | Germany | 243 |
| Prostate | Germany | 129 |
| Lung | Spain | 179 |
| Colon | Spain | 126 |
| Prostate | Spain | 92 |
| Lung | France | 165 |
| Colon | France | 146 |
| Prostate | France | 112 |
| Colon | Germany | 115 |
| Lung | Germany | 121 |
| Colon | Germany | 135 |
| Colon | Spain | 138 |
| Lung | Germany | 159 |
| Lung | Spain | 173 |
| Prostate | France | 104 |
| Prostate | Germany | 135 |

2 Assembles the data for each Formula and sorts the data to prepare the LOOPs

| country | cases | cancer | cases |
|---|---|---|---|
| France | 146 | Colon | 146 |
| France | 165 | Lung | 165 |
| France | 112 | Prostate | 112 |
| France | 104 | Prostate | 104 |
| Germany | 243 | Colon | 243 |
| Germany | 115 | Colon | 115 |
| Germany | 135 | Colon | 135 |
| Germany | 271 | Lung | 271 |
| Germany | 121 | Lung | 121 |
| Germany | 159 | Lung | 159 |
| Germany | 129 | Prostate | 129 |
| Germany | 135 | Prostate | 135 |
| Spain | 126 | Colon | 126 |
| Spain | 138 | Colon | 138 |
| Spain | 179 | Lung | 179 |
| Spain | 173 | Lung | 173 |
| Spain | 92 | Prostate | 92 |

3 Creates two levels of LOOPs (made easier to see by deduping)

| country | cases | cancer | cases |
|---|---|---|---|
| France | 146 | Colon | 146 |
| | 165 | Lung | 165 |
| | 112 | Prostate | 112 |
| | 104 | | 104 |
| Germany | 243 | Colon | 243 |
| | 115 | | 115 |
| | 135 | | 135 |
| | 271 | Lung | 271 |
| | 121 | | 121 |
| | 159 | | 159 |
| | 129 | Prostate | 129 |
| | 135 | | 135 |
| Spain | 126 | Colon | 126 |
| | 138 | | 138 |
| | 179 | Lung | 179 |
| | 173 | | 173 |
| | 92 | Prostate | 92 |

FIG. 48

STEPS 4 TO 6

4 Does the Formula calculation(s) for each LOOP including the non range function and cell value evaluation

| country | SUM(cases {!LOOP})/ (1-SQRT(G1) /100) | cancer | SUM(cases {!LOOP})/ (1-SQRT(G1) /100) |
|---|---|---|---|
| France | 500.65 | Colon | 138.7 |
| | | Lung | 156.75 |
| | | Prostate | 205.2 |
| Germany | 1242.6 | Colon | 468.35 |
| | | Lung | 523.45 |
| | | Prostate | 250.8 |
| Spain | 672.6 | Colon | 250.8 |
| | | Lung | 334.4 |
| | | Prostate | 87.4 |

5 Orders the outputs by Formula1 values 1st and Formula2 values 2nd (the default setting descending)

| country | SUM(cases {!LOOP})/ (1-SQRT(G1) /100) | cancer | SUM(cases {!LOOP})/ (1-SQRT(G1) /100) |
|---|---|---|---|
| Germany | 1242.6 | Lung | 523.45 |
| | | Colon | 468.35 |
| | | Prostate | 250.8 |
| Spain | 672.6 | Lung | 334.4 |
| | | Colon | 250.8 |
| | | Prostate | 87.4 |
| France | 500.65 | Prostate | 205.2 |
| | | Lung | 156.75 |
| | | Colon | 138.7 |

6 Returns the value to cells A2 to D10

| | | | |
|---|---|---|---|
| Germany | 1242.6 | Lung | 523.5 |
| | | Colon | 468.4 |
| | | Prostate | 250.8 |
| Spain | 672.6 | Lung | 334.4 |
| | | Colon | 250.8 |
| | | Prostate | 87.4 |
| France | 500.7 | Prostate | 205.2 |
| | | Lung | 156.8 |
| | | Colon | 138.7 |

FIG. 49

STEPS 1 AND 2

① Retrieves all the data for the NSC formulaic data fields

| cancer | country | age | cases | remission | benign | testgrp |
|---|---|---|---|---|---|---|
| Colon | France | 49down | 24 | 20 | 8 | 803 |
| Lung | France | 49down | 43 | 14 | 22 | 803 |
| Prostate | France | 49down | 20 | 20 | 4 | 803 |
| Colon | France | 50plus | 122 | 84 | 39 | 1624 |
| Lung | France | 50plus | 122 | 61 | 56 | 1624 |
| Prostate | France | 50plus | 92 | 86 | 8 | 1624 |
| Colon | Germany | 49down | 42 | 27 | 15 | 1476 |
| Lung | Germany | 49down | 66 | 25 | 30 | 1476 |
| Prostate | Germany | 49down | 19 | 25 | 2 | 1476 |
| Colon | Germany | 50plus | 201 | 82 | 64 | 3941 |
| Lung | Germany | 50plus | 205 | 105 | 95 | 3941 |
| Prostate | Germany | 50plus | 110 | 102 | 10 | 3941 |
| Colon | Spain | 49down | 19 | 17 | 6 | 623 |
| Lung | Spain | 49down | 39 | 17 | 19 | 623 |
| Prostate | Spain | 49down | 18 | 15 | 3 | 623 |
| Colon | Spain | 50plus | 107 | 75 | 33 | 2376 |
| Lung | Spain | 50plus | 140 | 74 | 65 | 2376 |
| Prostate | Spain | 50plus | 74 | 68 | 6 | 2376 |
| Colon | Germany | 49down | 19 | 17 | 7 | 1501 |
| Lung | Germany | 49down | 35 | 11 | 17 | 1501 |
| Colon | Germany | 50plus | 96 | 73 | 30 | 3932 |
| Lung | Germany | 50plus | 86 | 47 | 41 | 3932 |
| Prostate | France | 49down | 19 | 18 | 2 | 805 |
| Prostate | France | 50plus | 85 | 80 | 9 | 1635 |
| Colon | Germany | 49down | 24 | 19 | 8 | 1501 |
| Lung | Germany | 49down | 42 | 14 | 23 | 1501 |
| Prostate | Germany | 49down | 28 | 26 | 2 | 1501 |
| Colon | Germany | 50plus | 111 | 86 | 36 | 3932 |
| Lung | Germany | 50plus | 117 | 62 | 57 | 3932 |
| Prostate | Germany | 50plus | 115 | 107 | 10 | 3932 |
| Colon | Spain | 49down | 26 | 19 | 10 | 631 |
| Lung | Spain | 49down | 47 | 15 | 25 | 631 |
| Colon | Spain | 50plus | 112 | 79 | 39 | 2386 |
| Lung | Spain | 50plus | 126 | 73 | 62 | 2386 |

② Assembles the data for Loops and Formulas layout and calculations

| country | cases | benign | testgrp | age | cases | benign | cancer | cases | remission | benign |
|---|---|---|---|---|---|---|---|---|---|---|
| France | 24 | 8 | 803 | 49down | 24 | 8 | Colon | 24 | 20 | 8 |
| France | 43 | 22 | 803 | 49down | 43 | 22 | Lung | 43 | 14 | 22 |
| France | 20 | 4 | 803 | 49down | 20 | 4 | Prostate | 20 | 20 | 4 |
| France | 122 | 39 | 1624 | 50plus | 122 | 39 | Colon | 122 | 84 | 39 |
| France | 122 | 56 | 1624 | 50plus | 122 | 56 | Lung | 122 | 61 | 56 |
| France | 92 | 8 | 1624 | 50plus | 92 | 8 | Prostate | 92 | 86 | 8 |
| Germany | 42 | 15 | 1476 | 49down | 42 | 15 | Colon | 43 | 19 | 15 |
| Germany | 66 | 30 | 1476 | 49down | 66 | 30 | Lung | 66 | 25 | 30 |
| Germany | 19 | 2 | 1476 | 49down | 19 | 2 | Prostate | 27 | 25 | 2 |
| Germany | 201 | 64 | 3941 | 50plus | 201 | 64 | Colon | 201 | 82 | 64 |
| Germany | 205 | 95 | 3941 | 50plus | 205 | 95 | Lung | 205 | 105 | 95 |
| Germany | 110 | 10 | 3941 | 50plus | 110 | 10 | Prostate | 110 | 102 | 10 |
| Spain | 19 | 6 | 623 | 49down | 19 | 6 | Colon | 19 | 17 | 6 |
| Spain | 39 | 19 | 623 | 49down | 39 | 19 | Lung | 39 | 17 | 19 |
| Spain | 18 | 3 | 623 | 49down | 18 | 3 | Prostate | 18 | 15 | 3 |
| Spain | 107 | 33 | 2376 | 50plus | 107 | 33 | Colon | 107 | 75 | 33 |
| Spain | 140 | 65 | 2376 | 50plus | 140 | 65 | Lung | 140 | 74 | 65 |
| Spain | 74 | 6 | 2376 | 50plus | 74 | 6 | Prostate | 74 | 68 | 6 |
| Germany | 19 | 7 | 1501 | 49down | 19 | 7 | Colon | 19 | 17 | 7 |
| Germany | 35 | 17 | 1501 | 49down | 35 | 17 | Lung | 35 | 11 | 17 |
| Germany | 96 | 30 | 3932 | 50plus | 96 | 30 | Colon | 96 | 73 | 30 |
| Germany | 86 | 41 | 3932 | 50plus | 86 | 41 | Lung | 86 | 47 | 41 |
| France | 19 | 2 | 805 | 49down | 19 | 2 | Prostate | 19 | 18 | 2 |
| France | 85 | 9 | 1635 | 50plus | 85 | 9 | Prostate | 85 | 80 | 9 |
| Germany | 24 | 8 | 1501 | 49down | 24 | 8 | Colon | 24 | 19 | 8 |
| Germany | 42 | 23 | 1501 | 49down | 42 | 23 | Lung | 42 | 14 | 23 |
| Germany | 20 | 2 | 1501 | 49down | 20 | 2 | Prostate | 28 | 26 | 2 |
| Germany | 111 | 36 | 3932 | 50plus | 111 | 36 | Colon | 111 | 86 | 36 |
| Germany | 117 | 57 | 3932 | 50plus | 117 | 57 | Lung | 117 | 62 | 57 |
| Germany | 115 | 10 | 3932 | 50plus | 115 | 10 | Prostate | 115 | 107 | 10 |
| Spain | 26 | 10 | 631 | 49down | 26 | 10 | Colon | 26 | 19 | 10 |
| Spain | 47 | 25 | 631 | 49down | 47 | 25 | Lung | 47 | 15 | 25 |
| Spain | 112 | 39 | 2386 | 50plus | 112 | 39 | Colon | 112 | 79 | 39 |
| Spain | 126 | 62 | 2386 | 50plus | 126 | 62 | Lung | 126 | 73 | 62 |

FIG. 51

STEPS 3 AND 4

③ Creates three levels of Loops (made easier to see here by deduping)

| country | cases | benign | age | cases | benign | testgrp | cancer | cases | benign | testgrp |
|---|---|---|---|---|---|---|---|---|---|---|
| France | 24 | 8 | 49down | 24 | 8 | 803 | Colon | 24 | 8 | 803 |
| | 43 | 22 | | 43 | 22 | 803 | Lung | 43 | 22 | 803 |
| | 20 | 4 | | 20 | 4 | 803 | Prostate | 20 | 4 | 803 |
| | 19 | 2 | | 19 | 2 | 805 | | 19 | 2 | 805 |
| | 122 | 39 | 50plus | 122 | 39 | 1624 | Colon | 122 | 39 | 1624 |
| | 122 | 56 | | 122 | 56 | 1624 | Lung | 122 | 56 | 1624 |
| | 92 | 8 | | 92 | 8 | 1624 | Prostate | 92 | 8 | 1624 |
| | 85 | 9 | | 85 | 9 | 1635 | | 85 | 9 | 1635 |
| Germany | 42 | 15 | 49down | 42 | 15 | 1476 | Colon | 42 | 15 | 1476 |
| | 19 | 7 | | 19 | 7 | 1501 | | 19 | 7 | 1501 |
| | 24 | 8 | | 24 | 8 | 1501 | | 24 | 8 | 1501 |
| | 66 | 30 | | 66 | 30 | 1476 | Lung | 66 | 30 | 1476 |
| | 35 | 17 | | 35 | 17 | 1501 | | 35 | 17 | 1501 |
| | 42 | 23 | | 42 | 23 | 1501 | | 42 | 23 | 1501 |
| | 27 | 2 | | 27 | 2 | 1476 | Prostate | 27 | 2 | 1476 |
| | 28 | 2 | | 28 | 2 | 1501 | | 28 | 2 | 1501 |
| | 201 | 64 | 50plus | 201 | 64 | 3941 | Colon | 201 | 64 | 3941 |
| | 96 | 30 | | 96 | 30 | 3932 | | 96 | 30 | 3932 |
| | 111 | 36 | | 111 | 36 | 3932 | | 111 | 36 | 3932 |
| | 205 | 95 | | 205 | 95 | 3941 | Lung | 205 | 95 | 3941 |
| | 88 | 41 | | 88 | 41 | 3932 | | 88 | 41 | 3932 |
| | 117 | 57 | | 117 | 57 | 3932 | | 117 | 57 | 3932 |
| | 110 | 10 | | 110 | 10 | 3941 | Prostate | 110 | 10 | 3941 |
| | 115 | 10 | | 115 | 10 | 3932 | | 115 | 10 | 3932 |
| Spain | 19 | 6 | 49down | 19 | 6 | 623 | Colon | 19 | 6 | 623 |
| | 26 | 10 | | 26 | 10 | 631 | | 26 | 10 | 631 |
| | 39 | 19 | | 39 | 19 | 623 | Lung | 39 | 19 | 623 |
| | 47 | 25 | | 47 | 25 | 631 | | 47 | 25 | 631 |
| | 18 | 3 | | 18 | 3 | 623 | Prostate | 18 | 3 | 623 |
| | 107 | 33 | 50plus | 107 | 33 | 2376 | Colon | 107 | 33 | 2376 |
| | 112 | 39 | | 112 | 39 | 2386 | | 112 | 39 | 2386 |
| | 140 | 65 | | 140 | 65 | 2376 | Lung | 140 | 65 | 2376 |
| | 126 | 62 | | 126 | 62 | 2386 | | 126 | 62 | 2386 |
| | 74 | 6 | | 74 | 6 | 2376 | Prostate | 74 | 6 | 2376 |

5262 5263 5264

④ Does the Formula calculations for each level of LOOPs (three for 1st loop level and six sets of 6 for 3rd loop)

| country | SUM(cases {!LOOP})+ SUM(benign {!LOOP}) | age | (SUM(cases {!LOOP})+ SUM(benign {!LOOP}))/ Formula1 | (SUM(cases {!LOOP})+ SUM(benign {!LOOP}))/ MAX(testgrp {!LOOP}) | cancer | (SUM(cases {!LOOP})+ SUM(benign {!LOOP}))/ Formula1 | (SUM(cases {!LOOP})+ SUM(benign {!LOOP}))/ MAX(testgrp {!LOOP}) |
|---|---|---|---|---|---|---|---|
| France | 675 | 49down | 0.21037037 | 0.176397516 | Colon | 0.047407407 | 0.03985056 |
| | | | | | Lung | 0.096296296 | 0.080946451 |
| | | | | | Prostate | 0.066666667 | 0.055900621 |
| | | 50plus | 0.78962963 | 0.325893884 | Colon | 0.238518519 | 0.099137931 |
| | | | | | Lung | 0.263703704 | 0.109605911 |
| | | | | | Prostate | 0.287407407 | 0.118654434 |
| Germany | 1771 | 49down | 0.21853061 | 0.257828115 | Colon | 0.064935065 | 0.07661559 |
| | | | | | Lung | 0.120271033 | 0.141905396 |
| | | | | | Prostate | 0.033314512 | 0.039307129 |
| | | 50plus | 0.78147939 | 0.351179904 | Colon | 0.303783173 | 0.136513575 |
| | | | | | Lung | 0.339356296 | 0.152499366 |
| | | | | | Prostate | 0.138339921 | 0.062166963 |
| Spain | 976 | 49down | 0.217213115 | 0.335974643 | Colon | 0.0625 | 0.096671949 |
| | | | | | Lung | 0.133196721 | 0.206022187 |
| | | | | | Prostate | 0.021516393 | 0.033707865 |
| | | 50plus | 0.782786885 | 0.320201174 | Colon | 0.298155738 | 0.121961442 |
| | | | | | Lung | 0.402663934 | 0.164710813 |
| | | | | | Prostate | 0.081967213 | 0.033670034 |

STEPS 5 AND 6

5 Sorts the outputs by LIST specification – Formula1 1st DESCEND, Loop2 2nd ASCEND, Loop 3 3rd ASCEND

| country | SUM{cases{!LOOP}}+SUM{benign{!LOOP} | age | {SUM{cases{!LOOP}}+SUM{benign{!LOOP}}}/Formula1 | {SUM{cases{!LOOP}}+SUM{benign{!LOOP}}}/MAX{testgrp{!LOOP}} | cancer | {SUM{cases{!LOOP}}+SUM{benign{!LOOP}}}/Formula1 | {SUM{cases{!LOOP}}+SUM{benign{!LOOP}}}/MAX{testgrp{!LOOP}} |
|---|---|---|---|---|---|---|---|
| Germany | 1771 | 49down | 0.21852061 | 0.257828115 | Colon | 0.064935065 | 0.07661559 |
| | | | | | Lung | 0.120271033 | 0.141905396 |
| | | | | | Prostate | 0.033314512 | 0.039307129 |
| | | 50plus | 0.78147939 | 0.351179904 | Colon | 0.303783173 | 0.136513575 |
| | | | | | Lung | 0.339356296 | 0.152499366 |
| | | | | | Prostate | 0.138339921 | 0.062166963 |
| Spain | 976 | 49down | 0.21721311 | 0.335974643 | Colon | 0.0625 | 0.096671949 |
| | | | | | Lung | 0.133196721 | 0.206022187 |
| | | | | | Prostate | 0.021516393 | 0.033707865 |
| | | 50plus | 0.78278689 | 0.320201174 | Colon | 0.298155738 | 0.121961442 |
| | | | | | Lung | 0.402663934 | 0.164710813 |
| | | | | | Prostate | 0.081967213 | 0.033670034 |
| France | 675 | 49down | 0.21037037 | 0.176397516 | Colon | 0.047407407 | 0.03985056 |
| | | | | | Lung | 0.096296296 | 0.080946451 |
| | | | | | Prostate | 0.066666667 | 0.055900621 |
| | | 50plus | 0.78962963 | 0.325993884 | Colon | 0.238518519 | 0.099137931 |
| | | | | | Lung | 0.263703704 | 0.109605911 |
| | | | | | Prostate | 0.287407407 | 0.118654434 |

5353

6 Returns the value to cells A2 to H19

| | | | | | | | |
|---|---|---|---|---|---|---|---|
| Germany | 1771 | 49down | 21.9% | 25.8% | Colon | 6.5% | 7.7% |
| | | | | | Lung | 12.0% | 14.2% |
| | | | | | Prostate | 3.3% | 3.9% |
| | | 50plus | 78.1% | 35.1% | Colon | 30.4% | 13.7% |
| | | | | | Lung | 33.9% | 15.2% |
| | | | | | Prostate | 13.8% | 6.2% |
| Spain | 976 | 49down | 21.7% | 33.6% | Colon | 6.3% | 9.7% |
| | | | | | Lung | 13.3% | 20.6% |
| | | | | | Prostate | 2.2% | 3.4% |
| | | 50plus | 78.3% | 32.0% | Colon | 29.8% | 12.2% |
| | | | | | Lung | 40.3% | 16.5% |
| | | | | | Prostate | 8.2% | 3.4% |
| France | 675 | 49down | 21.0% | 17.6% | Colon | 4.7% | 4.0% |
| | | | | | Lung | 9.6% | 8.1% |
| | | | | | Prostate | 6.7% | 5.6% |
| | | 50plus | 79.0% | 32.6% | Colon | 23.9% | 9.9% |
| | | | | | Lung | 26.4% | 11.0% |
| | | | | | Prostate | 28.7% | 11.9% |

| | A | B | C |
|---|---|---|---|
| 1 | Top Ten Donors | | |
| 2 | | Start date: | 1/1/10 |
| 3 | | End date: | 12/31/19 |
| 4 | | | |
| 5 | Donor number: | Donor name: | Total donations: |
| 6 | 10039856 | John Baker trust | $ 14,750,000 |
| 7 | 13765439 | Emily Hawn | $ 12,500,500 |
| 8 | 14387521 | Hildago Family | $ 11,250,000 |
| 9 | 10396728 | Philip Hu | $ 10,987,000 |
| 10 | 10003482 | Lawrence Young | $ 10,581,250 |
| 11 | 10392246 | Sabina Morrison | $ 10,000,000 |
| 12 | 14101719 | James Lorenzo | $ 9,500,000 |
| 13 | 13647803 | Ernesto Fernandez | $ 9,450,500 |
| 14 | 12998341 | Kim Stevenson trust | $ 9,425,030 |
| 15 | 14982763 | Rodgers Family Trust | $ 9,420,113 |

| | A | B | C |
|---|---|---|---|
| 1 | Top Ten Donors | | |
| 2 | | Start date: | 1/1/15 |
| 3 | | End date: | 12/31/19 |
| 4 | | | |
| 5 | Donor number: | Donor name: | Total donations: |
| 6 | 10039856 | John Baker trust | $ 9,350,000 |
| 7 | 10075331 | Amy Brakeman | $ 8,987,000 |
| 8 | 13765439 | Emily Hawn | $ 7,500,500 |
| 9 | 10647900 | Susan McHenry | $ 7,450,820 |
| 10 | 10003482 | Lawrence Young | $ 6,581,250 |
| 11 | 14982763 | Rodgers Family Trust | $ 6,420,389 |
| 12 | 10769246 | Larson Estate | $ 6,000,000 |
| 13 | 14101719 | James Lorenzo | $ 5,500,000 |
| 14 | 12998341 | Kim Stevenson trust | $ 5,425,030 |
| 15 | 14387521 | Hildago Family | $ 5,250,000 |

STEPS 1 AND 2

5754

1 Retrieves all the data for the NSC formulaic data fields:

| cancer | country | age | cases |
|---|---|---|---|
| Colon | France | 49down | 24 |
| Lung | France | 49down | 43 |
| Prostate | France | 49down | 20 |
| Colon | France | 50plus | 122 |
| Lung | France | 50plus | 122 |
| Prostate | France | 50plus | 92 |
| Colon | Germany | 49down | 42 |
| Lung | Germany | 49down | 66 |
| Prostate | Germany | 49down | 19 |
| Colon | Germany | 50plus | 201 |
| Lung | Germany | 50plus | 205 |
| Prostate | Germany | 50plus | 110 |
| Colon | Spain | 49down | 19 |
| Lung | Spain | 49down | 39 |
| Prostate | Spain | 49down | 18 |
| Colon | Spain | 50plus | 107 |
| Lung | Spain | 50plus | 140 |
| Prostate | Spain | 50plus | 74 |
| Colon | Germany | 49down | 19 |
| Lung | Germany | 49down | 35 |
| Colon | Germany | 50plus | 96 |
| Lung | Germany | 50plus | 86 |
| Prostate | France | 49down | 19 |
| Prostate | France | 50plus | 85 |
| Colon | Germany | 49down | 24 |
| Lung | Germany | 49down | 42 |
| Prostate | Germany | 49down | 28 |
| Colon | Germany | 50plus | 111 |
| Lung | Germany | 50plus | 117 |
| Prostate | Germany | 50plus | 115 |
| Colon | Spain | 49down | 26 |
| Lung | Spain | 49down | 47 |
| Colon | Spain | 50plus | 112 |
| Lung | Spain | 50plus | 126 |

5757

2 Sets up the data using the default ascending sorts on the Loops and positions data for calculations

| country | age | cases | cancer | cases |
|---|---|---|---|---|
| France | 49down | 24 | Colon | 24 |
| France | 49down | 43 | Lung | 43 |
| France | 49down | 20 | Prostate | 20 |
| France | 49down | 19 | Prostate | 19 |
| France | 50plus | 122 | Colon | 122 |
| France | 50plus | 122 | Lung | 122 |
| France | 50plus | 92 | Prostate | 92 |
| France | 50plus | 85 | Prostate | 85 |
| Germany | 49down | 42 | Colon | 42 |
| Germany | 49down | 19 | Colon | 19 |
| Germany | 49down | 24 | Colon | 24 |
| Germany | 49down | 66 | Lung | 66 |
| Germany | 49down | 35 | Lung | 35 |
| Germany | 49down | 42 | Lung | 42 |
| Germany | 49down | 19 | Prostate | 19 |
| Germany | 49down | 28 | Prostate | 28 |
| Germany | 50plus | 201 | Colon | 201 |
| Germany | 50plus | 96 | Colon | 96 |
| Germany | 50plus | 111 | Colon | 111 |
| Germany | 50plus | 205 | Lung | 205 |
| Germany | 50plus | 86 | Lung | 86 |
| Germany | 50plus | 117 | Lung | 117 |
| Germany | 50plus | 110 | Prostate | 110 |
| Germany | 50plus | 115 | Prostate | 115 |
| Spain | 49down | 19 | Colon | 19 |
| Spain | 49down | 26 | Colon | 26 |
| Spain | 49down | 39 | Lung | 39 |
| Spain | 49down | 47 | Lung | 47 |
| Spain | 49down | 18 | Prostate | 18 |
| Spain | 50plus | 107 | Colon | 107 |
| Spain | 50plus | 112 | Colon | 112 |
| Spain | 50plus | 140 | Lung | 140 |
| Spain | 50plus | 126 | Lung | 126 |
| Spain | 50plus | 74 | Prostate | 74 |

STEPS 5 AND 6

5943

5 Organizes the loop and formula calculated values

| country | age | SUM(cases{!LOOP2}) | cancer | SUM(cases{!LOOP3})/SUM(cases{!LOOP1}) |
|---|---|---|---|---|
| France | 49down | 106 | Colon | 0.045541 |
| | | | Lung | 0.081594 |
| | | | Prostate | 0.074004 |
| France | 50plus | 421 | Colon | 0.231499 |
| | | | Lung | 0.231499 |
| | | | Prostate | 0.335863 |
| Germany | 49down | 275 | Colon | 0.06459 |
| | | | Lung | 0.108663 |
| | | | Prostate | 0.035714 |
| Germany | 50plus | 1041 | Colon | 0.31003 |
| | | | Lung | 0.31003 |
| | | | Prostate | 0.170973 |
| Spain | 49down | 149 | Colon | 0.063559 |
| | | | Lung | 0.121469 |
| | | | Prostate | 0.025424 |
| Spain | 50plus | 559 | Colon | 0.309322 |
| | | | Lung | 0.375706 |
| | | | Prostate | 0.10452 |

5947

6 Returns values to cells A2 to E19, with cell formatting

| | | | | |
|---|---|---|---|---|
| France | 49down | 106 | Colon | 4.6% |
| | | | Lung | 8.2% |
| | | | Prostate | 7.4% |
| France | 50plus | 421 | Colon | 23.1% |
| | | | Lung | 23.1% |
| | | | Prostate | 33.6% |
| Germany | 49down | 275 | Colon | 6.5% |
| | | | Lung | 10.9% |
| | | | Prostate | 3.6% |
| Germany | 50plus | 1041 | Colon | 31.0% |
| | | | Lung | 31.0% |
| | | | Prostate | 17.1% |
| Spain | 49down | 149 | Colon | 6.4% |
| | | | Lung | 12.1% |
| | | | Prostate | 2.5% |
| Spain | 50plus | 559 | Colon | 30.9% |
| | | | Lung | 37.6% |
| | | | Prostate | 10.5% |

FIG. 61

STEPS 1 AND 2

1 Retrieves all the data for the NSC formulaic data fields:

| cancer | country | age | cases |
|---|---|---|---|
| Colon | France | 49down | 24 |
| Lung | France | 49down | 43 |
| Prostate | France | 49down | 20 |
| Colon | France | 50plus | 122 |
| Lung | France | 50plus | 122 |
| Prostate | France | 50plus | 92 |
| Colon | Germany | 49down | 42 |
| Lung | Germany | 49down | 66 |
| Prostate | Germany | 49down | 19 |
| Colon | Germany | 50plus | 201 |
| Lung | Germany | 50plus | 205 |
| Prostate | Germany | 50plus | 110 |
| Colon | Spain | 49down | 19 |
| Lung | Spain | 49down | 39 |
| Prostate | Spain | 49down | 18 |
| Colon | Spain | 50plus | 107 |
| Lung | Spain | 50plus | 140 |
| Prostate | Spain | 50plus | 74 |
| Colon | Germany | 49down | 19 |
| Lung | Germany | 49down | 35 |
| Colon | Germany | 50plus | 96 |
| Lung | Germany | 50plus | 86 |
| Prostate | France | 49down | 19 |
| Prostate | France | 50plus | 85 |
| Colon | Germany | 49down | 24 |
| Lung | Germany | 49down | 42 |
| Prostate | Germany | 49down | 28 |
| Colon | Germany | 50plus | 111 |
| Lung | Germany | 50plus | 117 |
| Prostate | Germany | 50plus | 115 |
| Colon | Spain | 49down | 26 |
| Lung | Spain | 49down | 47 |
| Colon | Spain | 50plus | 112 |
| Lung | Spain | 50plus | 126 |

2 Sets up the data using the default ascending sorts on the Loops and positions data for calculations

| country | age | cases | cancer | cases |
|---|---|---|---|---|
| France | 49down | 24 | Colon | 24 |
| France | 49down | 43 | Lung | 43 |
| France | 49down | 20 | Prostate | 20 |
| France | 49down | 19 | Prostate | 19 |
| France | 50plus | 122 | Colon | 122 |
| France | 50plus | 122 | Lung | 122 |
| France | 50plus | 92 | Prostate | 92 |
| France | 50plus | 85 | Prostate | 85 |
| Germany | 49down | 42 | Colon | 42 |
| Germany | 49down | 19 | Colon | 19 |
| Germany | 49down | 24 | Colon | 24 |
| Germany | 49down | 66 | Lung | 66 |
| Germany | 49down | 35 | Lung | 35 |
| Germany | 49down | 42 | Lung | 42 |
| Germany | 49down | 19 | Prostate | 19 |
| Germany | 49down | 28 | Prostate | 28 |
| Germany | 50plus | 201 | Colon | 201 |
| Germany | 50plus | 96 | Colon | 96 |
| Germany | 50plus | 111 | Colon | 111 |
| Germany | 50plus | 205 | Lung | 205 |
| Germany | 50plus | 86 | Lung | 86 |
| Germany | 50plus | 117 | Lung | 117 |
| Germany | 50plus | 110 | Prostate | 110 |
| Germany | 50plus | 115 | Prostate | 115 |
| Spain | 49down | 19 | Colon | 19 |
| Spain | 49down | 26 | Colon | 26 |
| Spain | 49down | 39 | Lung | 39 |
| Spain | 49down | 47 | Lung | 47 |
| Spain | 49down | 18 | Prostate | 18 |
| Spain | 50plus | 107 | Colon | 107 |
| Spain | 50plus | 112 | Colon | 112 |
| Spain | 50plus | 140 | Lung | 140 |
| Spain | 50plus | 126 | Lung | 126 |
| Spain | 50plus | 74 | Prostate | 74 |

FIG. 62

STEPS 3 AND 4

③ Creates the loops including the subtotals and totals

| country | age | cases | cancer | cases |
|---|---|---|---|---|
| France | 49down | 24 | Colon | 24 |
| | | 43 | Lung | 43 |
| | | 20 | Prostate | 20 |
| | | 19 | | 19 |
| France 49 down subtotal | | | | |
| France | 50plus | 122 | Colon | 122 |
| | | 122 | Lung | 122 |
| | | 92 | Prostate | 92 |
| | | 85 | | 85 |
| France 50 plus subtotal | | | | |
| France subtotal | | | | |
| Germany | 49down | 42 | Colon | 42 |
| | | 19 | | 19 |
| | | 24 | | 24 |
| | | 66 | Lung | 66 |
| | | 35 | | 35 |
| | | 42 | | 42 |
| | | 19 | Prostate | 19 |
| | | 28 | | 28 |
| Germany 49 down subtotal | | | | |
| Germany | 50plus | 201 | Colon | 201 |
| | | 96 | | 96 |
| | | 111 | | 111 |
| | | 205 | Lung | 205 |
| | | 86 | | 86 |
| | | 117 | | 117 |
| | | 110 | Prostate | 110 |
| | | 115 | | 115 |
| Germany 50 plus subtotal | | | | |
| Germany subtotal | | | | |
| Spain | 49down | 19 | Colon | 19 |
| | | 26 | | 26 |
| | | 39 | Lung | 39 |
| | | 47 | | 47 |
| | | 18 | Prostate | 18 |
| Spain 49 down subtotal | | | | |
| Spain | 50plus | 107 | Colon | 107 |
| | | 112 | | 112 |
| | | 140 | Lung | 140 |
| | | 126 | | 126 |
| | | 74 | Prostate | 74 |
| Spain50 plus subtotal | | | | |
| Spain subtotal | | | | |
| Total | | | | |

④ Does the calculations applying the different !LOOP values for the 2nd, 3rd and 1st loops (as used by the formulas)

| country | age | SUM(cases {!LOOP2}) | cancer | SUM(cases {!LOOP3})/ SUM(cases {!LOOP1}) |
|---|---|---|---|---|
| France | 49down | 106 | Colon | 0.0455408 |
| | | | Lung | 0.0815939 |
| | | | Prostate | 0.0740038 |
| France 49 down subtotal | | | | 0.2011385 |
| France | 50plus | 421 | Colon | 0.2314991 |
| | | | Lung | 0.2314991 |
| | | | Prostate | 0.3358634 |
| France 50 plus subtotal | | | | 0.7988615 |
| France subtotal | | 527 | | 1 |
| Germany | 49down | 275 | Colon | 0.0645897 |
| | | | Lung | 0.1086626 |
| | | | Prostate | 0.0357143 |
| Germany 49 down subtotal | | | | 0.2089666 |
| Germany | 50plus | 1041 | Colon | 0.3100304 |
| | | | Lung | 0.3100304 |
| | | | Prostate | 0.1709726 |
| Germany 50 plus subtotal | | | | 0.7910334 |
| Germany subtotal | | 1316 | | 1 |
| Spain | 49down | 149 | Colon | 0.0635593 |
| | | | Lung | 0.1214689 |
| | | | Prostate | 0.0254237 |
| Spain 49 down subtotal | | | | 0.210452 |
| Spain | 50plus | 559 | Colon | 0.309322 |
| | | | Lung | 0.3757062 |
| | | | Prostate | 0.1045198 |
| Spain50 plus subtotal | | | | 0.789548 |
| Spain subtotal | | 708 | | 1 |
| Total | | 2551 | | 1 |

STEPS 3 AND 4 - top half repeated for easy visibility

③ Creates the loops including the subtotals and totals

| country | age | cases | cancer | cases |
|---|---|---|---|---|
| France | 49down | 24 | Colon | 24 |
| | | 43 | Lung | 43 |
| | | 20 | Prostate | 20 |
| | | 19 | | 19 |
| France 49 down subtotal | | | | |
| France | 50plus | 122 | Colon | 122 |
| | | 122 | Lung | 122 |
| | | 92 | Prostate | 92 |
| | | 85 | | 85 |
| France 50 plus subtotal | | | | |
| France subtotal | | | | |
| Germany | 49down | 42 | Colon | 42 |
| | | 19 | | 19 |
| | | 24 | | 24 |
| | | 66 | Lung | 66 |
| | | 35 | | 35 |
| | | 42 | | 42 |
| | | 19 | Prostate | 19 |
| | | 28 | | 28 |
| Germany 49 down subtotal | | | | |

④ Does the calculations applying the different !LOOP values for the 2nd, 3rd and 1st loops (as used by the formulas)

| country | age | SUM(cases {!LOOP2}) | cancer | SUM(cases {!LOOP3})/ SUM(cases {!LOOP1}) |
|---|---|---|---|---|
| France | 49down | 106 | Colon | 0.0455408 |
| | | | Lung | 0.0815939 |
| | | | Prostate | 0.0740038 |
| France 49 down subtotal | | | | 0.2011385 |
| France | 50plus | 421 | Colon | 0.2314991 |
| | | | Lung | 0.2314991 |
| | | | Prostate | 0.3358634 |
| France 50 plus subtotal | | | | 0.7988615 |
| France subtotal | | 527 | | 1 |
| Germany | 49down | 275 | Colon | 0.0645897 |
| | | | Lung | 0.1086626 |
| | | | Prostate | 0.0357143 |
| Germany 49 down subtotal | | | | 0.2089666 |

FIG. 62A

STEPS 3 AND 4 - top half repeated for easy visibility

3 Creates the loops including the subtotals and totals

| country | age | cases | cancer | cases |
|---|---|---|---|---|
| Germany | 50plus | 201 | Colon | 201 |
| | | 96 | | 96 |
| | | 111 | | 111 |
| | | 205 | Lung | 205 |
| | | 86 | | 86 |
| | | 117 | | 117 |
| | | 110 | Prostate | 110 |
| | | 115 | | 115 |
| Germany 50 plus subtotal | | | | |
| Germany subtotal | | | | |
| Spain | 49down | 19 | Colon | 19 |
| | | 26 | | 26 |
| | | 39 | Lung | 39 |
| | | 47 | | 47 |
| | | 18 | Prostate | 18 |
| Spain 49 down subtotal | | | | |
| Spain | 50plus | 107 | Colon | 107 |
| | | 112 | | 112 |
| | | 140 | Lung | 140 |
| | | 126 | | 126 |
| | | 74 | Prostate | 74 |
| Spain50 plus subtotal | | | | |
| Spain subtotal | | | | |
| Total | | | | |

4 Does the calculations applying the different !LOOP values for the 2nd, 3rd and 1st loops (as used by the formulas)

| country | age | SUM(cases {!LOOP2}) | cancer | SUM(cases {!LOOP3})/ SUM(cases {!LOOP1}) |
|---|---|---|---|---|
| Germany | 50plus | 1041 | Colon | 0.3100304 |
| | | | Lung | 0.3100304 |
| | | | Prostate | 0.1709726 |
| Germany 50 plus subtotal | | | | 0.7910334 |
| Germany subtotal | | 1316 | | 1 |
| Spain | 49down | 149 | Colon | 0.0635593 |
| | | | Lung | 0.1214689 |
| | | | Prostate | 0.0254237 |
| Spain 49 down subtotal | | | | 0.210452 |
| Spain | 50plus | 559 | Colon | 0.309322 |
| | | | Lung | 0.3757062 |
| | | | Prostate | 0.1045198 |
| Spain50 plus subtotal | | | | 0.789548 |
| Spain subtotal | | 708 | | 1 |
| Total | | 0 | | 1 |

STEPS 5 AND 6

5 Organizes the loop and formula calculated values including subtotals and totals

| country | age | SUM(cases {!LOOP2}) | cancer | SUM(cases {!LOOP3})/ SUM(cases {!LOOP1}) |
|---|---|---|---|---|
| France | 49down | 106 | Colon | 0.0455408 |
| | | | Lung | 0.0815939 |
| | | | Prostate | 0.0740038 |
| France 49 down subtotal | | | | 0.2011385 |
| France | 50plus | 421 | Colon | 0.2314991 |
| | | | Lung | 0.2314991 |
| | | | Prostate | 0.3358634 |
| France 50 plus subtotal | | | | 0.7988615 |
| France subtotal | | 527 | | 1 |
| Germany | 49down | 275 | Colon | 0.0645897 |
| | | | Lung | 0.1086626 |
| | | | Prostate | 0.0357143 |
| Germany 49 down subtotal | | | | 0.2089666 |
| Germany | 50plus | 1041 | Colon | 0.3100304 |
| | | | Lung | 0.3100304 |
| | | | Prostate | 0.1709726 |
| Germany 50 plus subtotal | | | | 0.7910334 |
| Germany subtotal | | 1316 | | 1 |
| Spain | 49down | 149 | Colon | 0.0635593 |
| | | | Lung | 0.1214689 |
| | | | Prostate | 0.0254237 |
| Spain 49 down subtotal | | | | 0.210452 |
| Spain | 50plus | 559 | Colon | 0.309322 |
| | | | Lung | 0.3757062 |
| | | | Prostate | 0.1045198 |
| Spain 50 plus subtotal | | | | 0.789548 |
| Spain subtotal | | 708 | | 1 |
| Total | | 2551 | | 1 |

6 Returns values to cells A2 to E33, with cell formatting

| | | | | |
|---|---|---|---|---|
| France | 49down | 106 | Colon | 4.6% |
| | | | Lung | 8.2% |
| | | | Prostate | 7.4% |
| | France 49 down subtotal | | | 20.1% |
| | 50plus | 421 | Colon | 23.1% |
| | | | Lung | 23.1% |
| | | | Prostate | 33.6% |
| | France 50 plus subtotal | | | 79.9% |
| France subtotal | | 527 | | 100.0% |
| Germany | 49down | 275 | Colon | 6.5% |
| | | | Lung | 10.9% |
| | | | Prostate | 3.6% |
| | Germany 49 down subtotal | | | 20.9% |
| | 50plus | 1041 | Colon | 31.0% |
| | | | Lung | 31.0% |
| | | | Prostate | 17.1% |
| | Germany 50 plus subtotal | | | 79.1% |
| Germany subtotal | | 1316 | | 100.0% |
| Spain | 49down | 149 | Colon | 6.4% |
| | | | Lung | 12.1% |
| | | | Prostate | 2.5% |
| | Spain 49 down subtotal | | | 21.0% |
| Spain | 50plus | 559 | Colon | 30.9% |
| | | | Lung | 37.6% |
| | | | Prostate | 10.5% |
| | Spain 50 plus subtotal | | | 79.0% |
| Spain subtotal | | 708 | | 100.0% |
| Total | | 2551 | | 100.0% |

STEPS 1 TO 3

1 Retrieves all the data for the NSC formulaic data fields

| cancer | country | cases |
|---|---|---|
| Lung | Germany | 271 |
| Colon | Germany | 243 |
| Prostate | Germany | 129 |
| Lung | Spain | 179 |
| Colon | Spain | 126 |
| Prostate | Spain | 92 |
| Lung | France | 165 |
| Colon | France | 146 |
| Prostate | France | 112 |
| Colon | Germany | 115 |
| Lung | Germany | 121 |
| Colon | Germany | 135 |
| Colon | Spain | 138 |
| Lung | Germany | 159 |
| Lung | Spain | 173 |
| Prostate | France | 104 |
| Prostate | Germany | 135 |

2 Assembles the data for each Formula and sorts the data to prepare the LOOPs

| country | cases | cancer | cases |
|---|---|---|---|
| France | 146 | Colon | 146 |
| France | 165 | Lung | 165 |
| France | 112 | Prostate | 112 |
| France | 104 | Prostate | 104 |
| Germany | 243 | Colon | 243 |
| Germany | 115 | Colon | 115 |
| Germany | 135 | Colon | 135 |
| Germany | 271 | Lung | 271 |
| Germany | 121 | Lung | 121 |
| Germany | 159 | Lung | 159 |
| Germany | 129 | Prostate | 129 |
| Germany | 135 | Prostate | 135 |
| Spain | 126 | Colon | 126 |
| Spain | 138 | Colon | 138 |
| Spain | 179 | Lung | 179 |
| Spain | 173 | Lung | 173 |
| Spain | 92 | Prostate | 92 |

3 Creates two levels of LOOPs (made easier to see by deduping)

| country | cases | cancer | cases |
|---|---|---|---|
| France | 146 | Colon | 146 |
| | 165 | Lung | 165 |
| | 112 | Prostate | 112 |
| | 104 | | 104 |
| Germany | 243 | Colon | 243 |
| | 115 | | 115 |
| | 135 | | 135 |
| | 271 | Lung | 271 |
| | 121 | | 121 |
| | 159 | | 159 |
| | 129 | Prostate | 129 |
| | 135 | | 135 |
| Spain | 126 | Colon | 126 |
| | 138 | | 138 |
| | 179 | Lung | 179 |
| | 173 | | 173 |
| | 92 | Prostate | 92 |

STEPS 1 TO 3

Retrieves all the data for the NSC formulaic data fields

| date | cancer | country | cases |
|---|---|---|---|
| 12/31/18 | Lung | Germany | 271 |
| 12/31/18 | Colon | Germany | 243 |
| 12/31/18 | Prostate | Germany | 129 |
| 12/31/18 | Lung | Spain | 179 |
| 12/31/18 | Colon | Spain | 126 |
| 12/31/18 | Prostate | Spain | 92 |
| 12/31/18 | Lung | France | 165 |
| 12/31/18 | Colon | France | 146 |
| 12/31/18 | Prostate | France | 112 |
| 1/15/19 | Colon | Germany | 115 |
| 1/15/19 | Lung | Germany | 121 |
| 1/31/19 | Colon | Germany | 135 |
| 1/31/19 | Colon | Spain | 138 |
| 1/31/19 | Lung | Germany | 159 |
| 1/31/19 | Lung | Spain | 173 |
| 1/31/19 | Prostate | France | 104 |
| 1/31/19 | Prostate | Germany | 135 |
| 2/12/19 | Lung | France | 199 |
| 2/15/19 | Colon | Germany | 99 |
| 2/28/19 | Colon | Germany | 144 |
| 2/28/19 | Colon | Spain | 122 |
| 2/28/19 | Lung | Germany | 272 |
| 2/28/19 | Lung | Spain | 154 |
| 2/28/19 | Prostate | France | 108 |
| 2/28/19 | Prostate | Germany | 133 |
| 3/15/19 | Colon | Spain | 77 |
| 3/31/19 | Colon | France | 493 |
| 3/31/19 | Colon | Germany | 237 |
| 3/31/19 | Colon | Spain | 68 |
| 3/31/19 | Lung | France | 338 |
| 3/31/19 | Lung | Germany | 291 |
| 3/31/19 | Lung | Spain | 170 |
| 3/31/19 | Prostate | France | 118 |
| 3/31/19 | Prostate | Germany | 129 |
| 3/31/19 | Prostate | Spain | 262 |

Constrains (filters) data to dates after and including 1/1/19

| date | cancer | country | cases |
|---|---|---|---|
| 1/15/19 | Colon | Germany | 115 |
| 1/15/19 | Lung | Germany | 121 |
| 1/31/19 | Colon | Germany | 135 |
| 1/31/19 | Colon | Spain | 138 |
| 1/31/19 | Lung | Germany | 159 |
| 1/31/19 | Lung | Spain | 173 |
| 1/31/19 | Prostate | France | 104 |
| 1/31/19 | Prostate | Germany | 135 |
| 2/12/19 | Lung | France | 199 |
| 2/15/19 | Colon | Germany | 99 |
| 2/28/19 | Colon | Germany | 144 |
| 2/28/19 | Colon | Spain | 122 |
| 2/28/19 | Lung | Germany | 272 |
| 2/28/19 | Lung | Spain | 154 |
| 2/28/19 | Prostate | France | 108 |
| 2/28/19 | Prostate | Germany | 133 |
| 3/15/19 | Colon | Spain | 77 |
| 3/31/19 | Colon | France | 493 |
| 3/31/19 | Colon | Germany | 237 |
| 3/31/19 | Colon | Spain | 68 |
| 3/31/19 | Lung | France | 338 |
| 3/31/19 | Lung | Germany | 291 |
| 3/31/19 | Lung | Spain | 170 |
| 3/31/19 | Prostate | France | 118 |
| 3/31/19 | Prostate | Germany | 129 |
| 3/31/19 | Prostate | Spain | 262 |

7855

Sorts on cancer and country data values preparing for creating LOOPs

| cancer | country | cases |
|---|---|---|
| Colon | France | 493 |
| Colon | Germany | 115 |
| Colon | Germany | 135 |
| Colon | Germany | 99 |
| Colon | Germany | 144 |
| Colon | Germany | 237 |
| Colon | Spain | 138 |
| Colon | Spain | 122 |
| Colon | Spain | 77 |
| Colon | Spain | 68 |
| Lung | France | 199 |
| Lung | France | 338 |
| Lung | Germany | 121 |
| Lung | Germany | 159 |
| Lung | Germany | 272 |
| Lung | Germany | 291 |
| Lung | Spain | 173 |
| Lung | Spain | 154 |
| Lung | Spain | 170 |
| Prostate | France | 104 |
| Prostate | France | 108 |
| Prostate | France | 118 |
| Prostate | Germany | 135 |
| Prostate | Germany | 133 |
| Prostate | Germany | 129 |
| Prostate | Spain | 262 |

8000
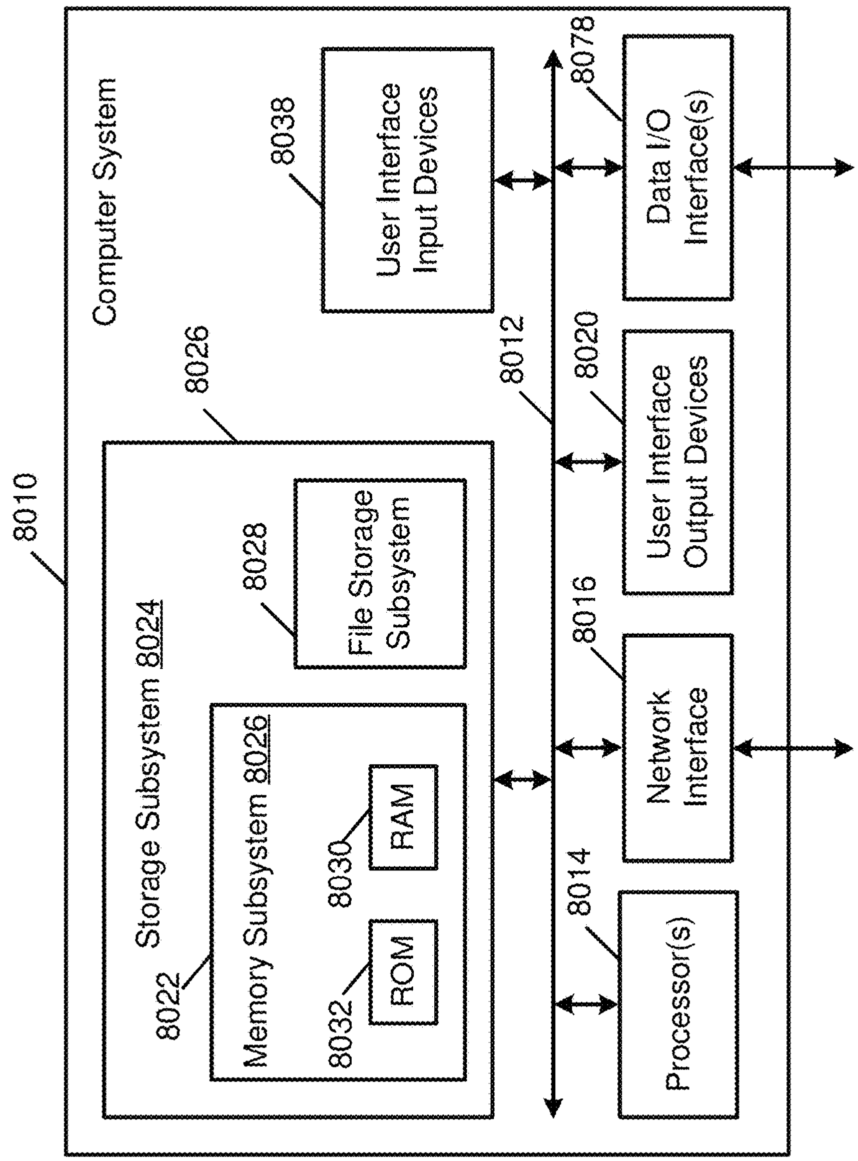
Fig. 80 Computer System

METHOD AND SYSTEM FOR IMPROVED ORDERING OF OUTPUT FROM SPREADSHEET ANALYTICAL FUNCTIONS

CROSS-REFERENCE

This application claims priority to and the benefit of U.S. Application No. 63/051,283, titled "Method and System for Improved Ordering of Output from Spreadsheet Analytical Functions" filed 13 Jul. 2020.

RELATED APPLICATIONS

This application is related to and incorporates by reference the following applications:

Contemporaneously filed U.S. application Ser. No. 17/374,898, titled, "Method and System for Improved Spreadsheet Analytical Functioning" which claims priority to U.S. Application No. 63/051,280, filed 13 Jul. 2020.

U.S. application Ser. No. 16/031,339, titled "Methods and Systems for Providing Selective Multi-Way Replication and Atomization of Cell Blocks and Other Elements in Spreadsheets and Presentations", filed 10 Jul. 2018, now U.S. Pat. No. 11,182,548, issued 23 Nov. 2021, which claims the benefit of U.S. Provisional Application No. 62/530,835, filed Jul. 10, 2017, U.S. application Ser. No. 16/031,379, titled "Methods and Systems for Connecting a Spreadsheet to External Data Sources with Formulaic Specification of Data Retrieval", filed 10 Jul. 2018, now U.S. Pat. No. 11,354,494, issued 7 Jun. 2022, which claims the benefit of U.S. Provisional Application No. 62/530,786, filed Jul. 10, 2017, U.S. application Ser. No. 16/031,759, titled, "Methods and Systems for Connecting A Spreadsheet to External Data Sources with Temporal Replication of Cell Blocks", filed 10 Jul. 2018, now U.S. Pat. No. 11,017,165, issued 25 May 2021, which claims the benefit of U.S. Provisional Patent Application No. 62/530,794, filed on Jul. 10, 2017, and U.S. application Ser. No. 16/191,402, titled, "Methods and Systems for Connecting A Spreadsheet to External Data Sources with Ordered Formulaic Specification of Data Retrieved" filed Nov. 14, 2018, now U.S. Pat. No. 11,036, 929, issued 15 Jun. 2021, which claims the benefit of U.S. Provisional Patent Application No. 62/586,719," filed on Nov. 15, 2017.

U.S. Application No. 63/044,990, titled, "Methods and Systems for Constructing a Complex Formula in a Spreadsheet Cell", filed 26 Jun. 2020.

U.S. Application No. 63/044,989, titled, "Methods and Systems for Presenting Drop-Down, Pop-Up or Other Presentation of a Multi-Value Data Set in a Spreadsheet Cell", filed 26 Jun. 2020.

BACKGROUND

Today's spreadsheets have a very broad range of functions (predefined formulas), e.g., SUM, COUNT, MIN, and STDEV, designed to simplify analytics for users. However, a fundamental capability of most programming languages, the loop, which allows users to execute one or more calculations repeatedly is missing from spreadsheet functions. A specialized capability called the Pivot table does a very limited set of user defined repetitive calculations. However, while virtually all spreadsheet users employ functions in their analytics, a much smaller subset know how to use a Pivot Table. Also, Pivot Tables are very limited in the types of calculations they can perform, e.g., the number of functions they can use, the combination of functions, the involvement of algebraic operators and the ordering and ranking of outcomes.

Accordingly, an opportunity arises to allow all spreadsheet users to solve repetitive calculation problems by writing a functional formula that heretofore would have required the many steps of setting up a Pivot Table, doing that and additional operations, or programming in the spreadsheets' embedded programming language. It brings an important capability to the large number of spreadsheet users who know how to set up a function (e.g., SUM) but do not know how to set up Pivot Tables or program in the embedded programming language. It also is a huge aid for the Pivot table and embedded programming capable users as the time and effort to solve repetitive calculation problems can be dramatically reduced. Our technology makes it incredibly easy to solve problems requiring repetitive evaluations (i.e., programming loops) and tailored presentation of the outcomes, and is outstanding for problems with results involving ordering of outcomes (e.g., largest to smallest, first to last) as part of answering user questions or requires the broad range of functions or algebraic formulas not supported by Pivot Tables.

SUMMARY

The disclosed technology creates a family of (predefined formula) spreadsheet functions which allows users to create programming loop equivalents in their regular spreadsheet cells employing familiar range functions (e.g., SUM, COUNT, MIN, MAX, etc.) and/or algebraic operations with data filtering and output ordering and selection. Functions in this family are sometimes referred to as table generator functions. They are written in a spreadsheet cell as a formula, rather than in a side panel as in prior art pivot tables. The data can be sourced from multiple cells within the spreadsheet or a broad spectrum of numeric, date and text data not stored in a spreadsheet, including data not discretely defined. The technology disclosed can use as inputs either cell ranges or Non-Spreadsheet Cell (NSC) data formulas. The capability allows users to specify standardized or highly custom calculations capable of executing millions of loops through a (predefined formula) spreadsheet function.

One embodiment of our disclosed technology replicates the functionality of a one-dimensional Pivot Table created through a spreadsheet function (predefined formula). Usage is made much more straightforward and familiar using inputs and outputs in regular cells not requiring Pivot Table learnings, ribbons, menus, dropdowns, selections and more selections and Cube Function conversions of the Pivot Table results (for additional use). The disclosed technology supports single and multivariable compound or nested loops by themselves and in loops within loops (i.e., reproducing capabilities of a Pivot Table within a Pivot Table). Those loops can have one or many calculations and employ data that is limited to the values of the loop or not limited to those values, depending upon user selections and desires. The disclosed functions allow users to easily add constraints (filters) that alter the data presented and the calculations done to meet their needs. It allows many alternatives on ordering the output including calculation result rankings which override the loop order. The disclosed technology allows users to highly customize what gets displayed in the cells from the loops and their calculations.

Another embodiment of our disclosed technology creates a predefined formula spreadsheet function that supports single and multivariable compound or nested loops doing one or more calculations for each progression of the loop and outputting one or more of those calculation results to one or more spreadsheet cells. Those calculations use one or more loop progression data values but are not limited to only those values. The disclosed functions allow users to easily add constraints (filters) that alter the data presented and the calculations done to meet their needs. The constraints can be implemented as data selection parameters of the user specified formulaic data description terms. Examples of data selection parameters used in the examples that vary the data selected at input are !JOIN and !ALL. It allows many alternatives on ordering the output including calculation result rankings which override the loop progression order. The disclosed technology allows users to highly customize what gets displayed in the cells from the loops and their calculations.

Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 through FIG. 3 examples a low skilled user solving a problem in Microsoft Excel.

FIG. 4 through FIG. 6 examples a higher skilled Pivot Table knowledgeable user solving the same problem in Microsoft Excel.

FIG. 9 through FIG. 11 examples more of our REPEAT function capabilities, a combination loop, multiple formulas, a data constraint (filter) and a row limit for the output.

FIG. 12 through FIG. 16 shows our REPEAT function working with in-cell data, replicating the capabilities shown for Non-Spreadsheet Cell (NSC) formulaic data in FIG. 7B and FIG. 9 through FIG. 11.

FIG. 18 through FIG. 20 examples the automatic inclusion of both a total and subtotals (ITERATE)

FIG. 25 examples a set of the range or array spreadsheet functions which work in our technology.

FIG. 27 through FIG. 29 examples our ORDER function technology using our NSC formula data to solve in one step the problem that took nineteen or seventeen steps in Microsoft Excel (FIG. 1 through FIG. 6).

FIG. 30 through FIG. 32 examples more of our ORDER function capabilities, a combination loop, multiple formulas and a data constraint (filter).

FIG. 38 through FIG. 40 example a two-level loop using our NSC formulaic data (ITERATEx—Multilevel loops, a Pivot Table within a Pivot Table).

FIG. 41 through FIG. 43 examples a two-level loop using our NSC formulaic data doing very different calculations in the two different loops and limiting the output to six rows (ITERATEx—Multilevel loops, a Pivot Table within a Pivot Table).

FIG. 44 through FIG. 46 example a two-level loop ordered function where the material difference relative to the previous Ordering embodiments is a syntax and technology that allows comingling of loops and formulas (MULTI—Multilevel ordering).

FIG. 47 through FIG. 49 examples multilevel ordering supporting any function and all algebraic operations.

FIG. 50 through FIG. 53 example a three-level loop ordered function where two of the loop levels do two different calculations and the order of what is outputted to cells is determined by a sequence of both formula and loop values.

FIG. 54 through FIG. 55B example the large scale of calculations easily achievable in our technology and the ease with which users can change calculations.

FIG. 56 through FIG. 59 examples our technology supporting formulas using any preceding loop value (ITERATExx—Selectable loop calculations).

FIG. 60 through FIG. 63 examples our technology supporting formulas using any preceding loop value including Total and subtotal calculations.

FIG. 64 through FIG. 66 examples our technology automatically visually replicating Loop and Formula values of loops when the sorting (ordering) breaks the loop integrity or users elect that presentational style.

FIG. 77 through FIG. 79 examples use of both a constraint (filter) on the data used in loop spreadsheet range or array function evaluations and a constraint (filter) on the calculated values outputted.

FIG. 80 depicts an example computer system that can be used to implement aspects of the technology disclosed.

DETAILED DESCRIPTION

Figures 7A, 7B:
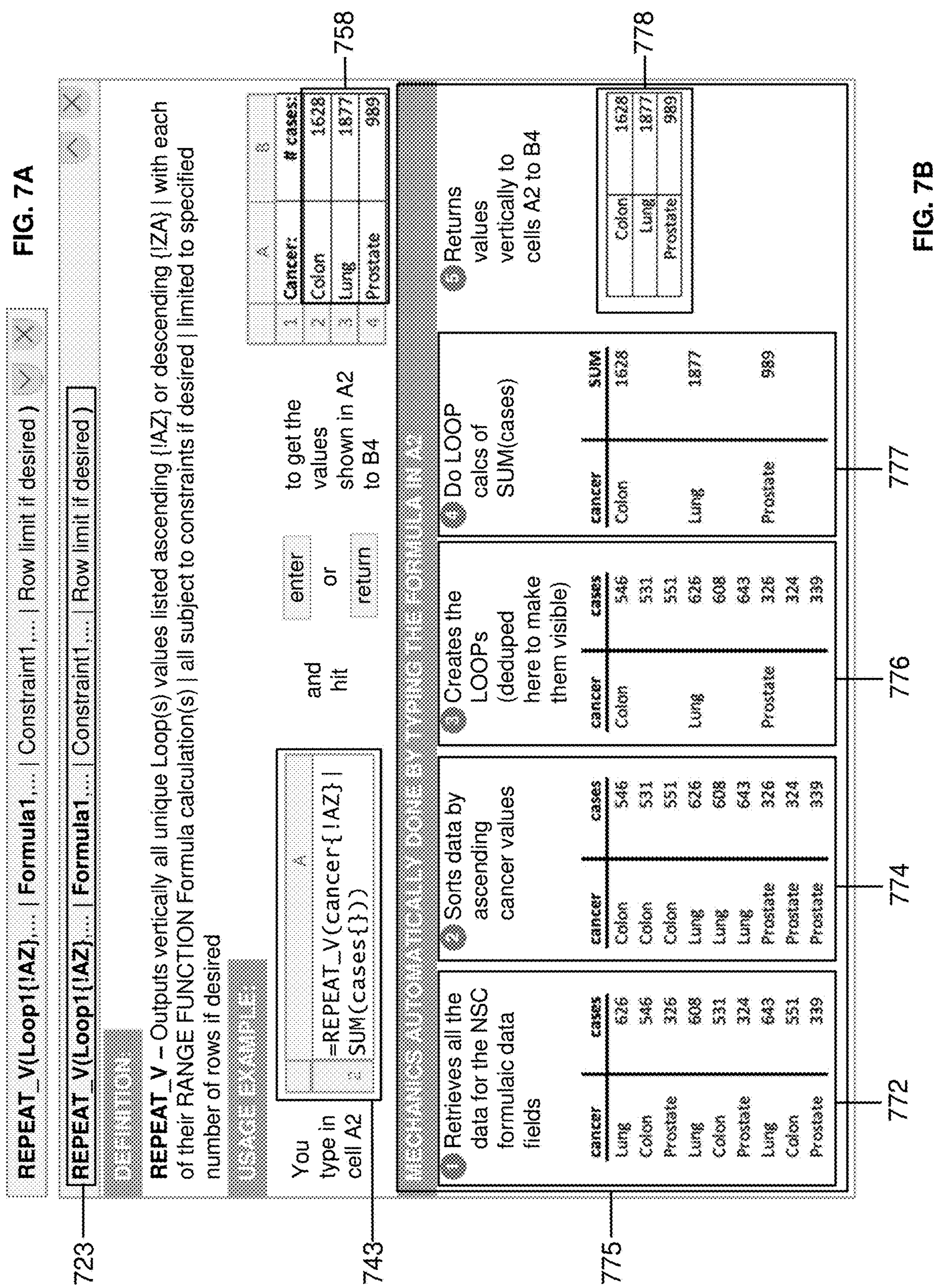
FIG. 7A and FIG. 7B example the replacement of a one-dimensional Pivot Table with our spreadsheet function technology (REPEAT_V).

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers and others have dramatically increased the breadth of capabilities and usefulness of spreadsheets. Spreadsheet applications now access data across a wide variety of sources including relational, structured and semi-structured, open data protocol (OData), Web and Hadoop among others; and these applications manipulate data—such as in pivot tables and via Microsoft PowerPivot. Additionally, spreadsheets have extensive functionality for creating charts with SmartArt and for building forms, and they even have programming languages embedded within them, such as Visual Basic (VBA in Excel), Apps Script (in Google Sheets) and Apple Script (in Numbers).

With all the added capabilities, spreadsheet applications have become substantially more complicated. The data manipulation and embedded programming language capabilities can be very powerful but are complicated to learn and therefore they are used by a very small fraction of the spreadsheet application user base. There are other advanced capabilities including Pivot Tables, Power Pivot and Power Query that allow users to manipulate data in spreadsheet overlays and processes from which formulas and cells can be extracted by further capabilities such as Cube Functions (e.g., for Pivot Tables). These capabilities require users to learn very different interfaces, and operations that operate very separately from their regular cell activities. As such only a fraction of users knows these capabilities which require learning and remembering very different operations. All this complexity has led to over a hundred books and thousands of online videos that have been published to help users understand the capabilities of Excel alone.

Spreadsheet providers like Microsoft Excel and Google Sheets cater to the specialized needs of users through many capabilities including vast numbers of spreadsheet functions (e.g., built in predefined formulas including SUM, COUNT and MIN). Microsoft Excel includes more than four hundred and fifty built-in functions and Google Sheets over four hundred. These built-in functions make operations desired by users dramatically simpler and are used by virtually every user.

The formulaically defined Non-Spreadsheet Cell (NSC) data variables and related technologies disclosed in "Methods and Systems for Connecting a Spreadsheet to External Data Sources with Formulaic Specification of Data Retrieval" filed previously, allow users to work with all types of numeric and text external data sets much larger and more complex than can currently fit in traditional spreadsheets. This external data connection creates the foundation for users to automate spreadsheet work without the use of embedded programming languages or special prebuilt data feeds, taking spreadsheets from a tool users employ to conduct one off or routine analytics to a real-time competitor of systems that automate repetitive activities.

The disclosed technology allows users to create the equivalent of one or more Pivot Tables including additional steps of filters, Pivot Table sorting, Pivot Table calculated fields or items and Cube Function conversion via one formula using one of our new functions. More customizable versions of our disclosed technology allow users to go beyond what is possible in the limited formulas and functions available in Pivot Tables and set up more elaborate sortation (e.g., ordering or ranking) and evaluation of the looped calculations for distinct or unique values of a data field constructed by the user. Our technology allows users to do things not possible in Pivot Tables requiring further work with Pivot Table outcomes or programming in the embedded spreadsheet programming language. And as will be exampled our technology takes numerous activities in the current spreadsheet technologies and simplifies them into single formulas. To illustrate that we will take a simple repetitive calculation and example it for users who do not know how to do Pivot Tables and those that do.

Existing Spreadsheet Limitations

Because Microsoft Excel has the broadest capabilities of the available spreadsheets, we will example user activities with it. Google Sheets and many of the other available spreadsheets have subsets of the Functions and Pivot Table capabilities available within Microsoft Excel and while there are differences, generally operate in similar manner.

We will example a very simple situation of a cancer researcher who wants to know in their studies of three different cancer types in three different countries, what was the number of cases reported in 2019 year to date for each country and cancer combination—ordered from least to most cases. We will first example how a user who does not know Pivot Tables and does not know how to program in the embedded programming language would solve the problem. Their challenge is they have access to no capability within their spreadsheet to do repetitive (looped) calculations and therefore must use a more manual approach. We will then example how a user who knows Pivot Tables but not the embedded programming language would solve the problem. The Pivot Table is their one way to create looped calculations however they then need to work around its limitation on ordering the calculation results. This user example will also illustrate some of what you need to know about using a Pivot Table and show some of the Ribbon menus, dropdowns, selections etc. you need to understand to accomplish the task.

FIG. 1 through FIG. 3 examples how a lower skilled user, who like many users does not know how to create a Pivot Table, might do that set of operations in their Excel spreadsheet. FIG. 1 steps one to three are about getting the data from their Information Technology (IT) organization and importing it into their Excel spreadsheet. That data received includes data from December 2018 onward, in steps four through six the user imports the data into their spreadsheet and puts it where they want it, date sorting it and then filtering out (eliminating) data before 2019. In step seven the user sorts the data by cancer type and country to begin the analysis they really want.

FIG. 2 shows steps eight through sixteen where the user SUMs the number of cases for each of the cancer and country combinations. This requires a step per repetitive combination (loop) because, like many data sets, there are varying number of data points per each distinct combination (e.g., 'Colon France' has one data point 233, while 'Colon Germany' has five 234). Therefore, the user cannot apply one standard SUM and copy it down the list of combinations but instead must match the length of the sum to the number of data points for each cancer and country combination. In step seventeen, having completed all the SUMs, the user then copies all their calculations and special pastes the values to an adjacent set of cells 285. They did that because they then need to sort the cases by SUM values and cannot do that on the SUM formulas that will then change post sort. Instead, they need to copy those formulas as values which they can then sort without the values changing.

In FIG. 3 step eighteen the user then does that sort from Smallest to Largest and then sees the values they want in cells G2 to I10 325, which they then can put anywhere or copy anywhere in the spreadsheet they might like. So, in step nineteen the user copies the values in G2 to I10 342 (blown up version of 325) to cells A5 to C13 347 completing the work. Nineteen steps and a lot of work later they are done. However, had their data set been larger it becomes fairly undoable (as the steps scale with the number of repetitive calculations). Also, should the date range or anything else change in what they want, they have to partially or completely redo the work. Consider instead the user is a charity manager who has over ten years of data with over fifty million rows of donations from over four million donors and wants to know how much was given by the ten biggest donors over the last ten years. That would involve over four million loops each requiring a step, which clearly is not doable and would force the user to either ask someone else to do it or learn to use Pivot Tables, as we will example next.

FIG. 4 through FIG. 6 examples how a Pivot table knowledgeable user could do the cancer researcher's calculation. FIG. 4 starts with the same three steps as the previous example of acquiring the data. Steps four through eleven are setting up that data in the Pivot Table and positioning the data within the Pivot table setup UI 483. Step twelve, shown in FIG. 5, then eliminates (filters) the unwanted data from 2018. The user has now executed the desired sets of cancer and country calculation loops. Unfortunately, there is no way to then sort within the Pivot Table across those different loops and therefore to sort the total set of combinations requires a set of steps removing the data from the Pivot Table to regular spreadsheet cells and then doing a sort on the SUM of cases values. This is done in steps thirteen through sixteen continuing in FIG. 6. The final step seventeen then is copying and pasting the desired cell values 657 to where the user wants them within the spreadsheet.

The advantage for this calculation of using the Pivot Table approach is there are two less steps, although the user must have learned and remember many operations and UI elements that are specific to Pivot tables. The larger advantage of this approach, relative to the non-Pivot Table approach, is the number of operations does not scale with the number of repetitive calculation loops. However as in the previous approach, the larger problem remains—changes to the data or changes to the dates the user wants to use for the calculation requires redoing many of the steps. Contrast the previous examples with our function approach to get the same outcome, where the only step required by the user is to write the following formula using one of our new functions:

=ORDER_*V*(cancer{ },country{ }|sum (cases{ })|date{>='1/1/19'})

And our ORDER_V function will have typical spreadsheet prompts to help the user find the function and fill it in (examples to follow). Users will also understand and be very familiar with our Non-Spreadsheet Cell (NSC) formulaic data fields and their designation in this embodiment by the curly braces { }, as well as the specific data fields they are using. So, this one formula replaces the previously exampled nineteen or seventeen complicated operations previously exampled (in FIG. 1 through FIG. 3 and in FIG. 4 through FIG. 6, respectively), and should the date range change the user simply changes the date component of the formula and it automatically recalculates with no additional steps.

With this background and set up, we will now example how our technology works and then solves the problem above and the options that allow it to solve a much broader set of repetitive (loop) calculations for users. We will start with how our technology replaces one-dimensional Pivot Tables and then show how it goes beyond the capabilities of Pivot Tables answering questions, like the example above, overriding the loop ordering (a Pivot Table limitation). We will then go well beyond that to example how our technology can do the equivalent of Pivot Tables within Pivot Tables with highly customized ordering and outputs for the more sophisticated users. And we will example how our technology can do loop progression repetitive calculations that no existing cell formula or Pivot table can do.

One-Dimensional Pivot Table Replacement

FIG. 7A and FIG. 7B example the simplest replacement of a one-dimensional Pivot Table doing a looped display of distinct or unique values of a data field and calculations for the cancer researcher. This first example will be presented like a typical hint or help prompt for spreadsheet functions that show up after a user has typed the function name, complete to the starting parenthesis or selected the Function from the help drop-down list that typically shows up while typing a function name. FIG. 7A is in the minimalistic style of Microsoft Excel giving the user only the syntax for the filling out the function. Our technology, as shown in FIG. 7B, also gives the user a more robust description of what the function does and examples its use more like what can be seen in Google Sheets. In this embodiment, the syntax 723 of the function is laid out and visible in both the FIG. 7A and FIG. 7B with the required inputs bolded. In this embodiment the user is therefore required to have one Loop and one Formula containing a RANGE FUNCTION (i.e., function that evaluates a range or array of inputs like SUM, MIN, STDEV or PERCENTILE) and anything more is optional. The function is named REPEAT_V where the V stands for the Vertical direction the output will be written to cells. The example formula 743 has only those bolded requirements and when the user completes their one step process of writing the formula and hits ENTER (PC) or RETURN (Mac), they get the output shown in cells A2 to B4 758. This function has automatically done five steps of mechanics 775 (with many sub steps), which are shown here so the user understands what is done by the Function. Note, our formulaic data has automatically made the data available to the user and some variant of the other steps manually done in the Microsoft Excel examples in FIG. 1 through FIG. 6 are collapsed into these five automated steps 775 or unnecessary.

In the example in FIG. 7B, the user has written the formula with our Non-Spreadsheet Cell (NSC) formulaic data. The automatically done steps start with step one 772 retrieving the data from outside the spreadsheet cells and in step two 774 sorts the data by ascending cancer value—using ascending because the user wrote '!AZ' in 'cancer{!AZ} ' in formula 743. Step three 776 prepares the three cancer value LOOPs and step four 777 does each of the loop calculations for distinct or unique values of a data field, in this example summing the 'cases' values for each value of cancer. Step five 778 then returns those calculated values vertically starting in cell A2 and going down to cell B4 758. With one simple formula using our REPEAT_V function the user has created a one-dimensional Pivot Table equivalent replacing the seventeen or nineteen steps done by the Excel users (in FIG. 1 through FIG. 3 and in FIG. 4 through FIG. 6, respectively).

Figure 8:
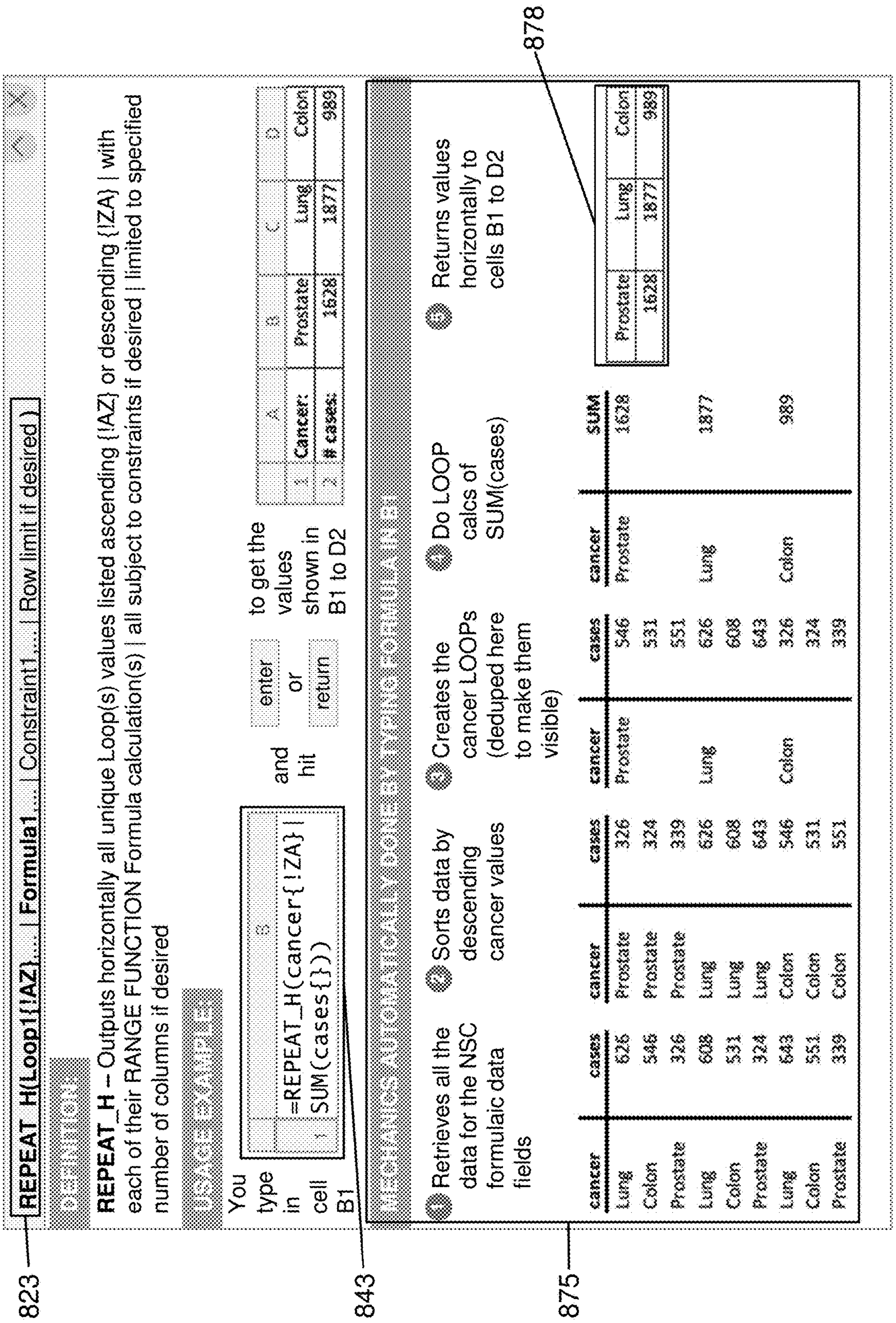
FIG. 8 examples the horizontal version of our REPEAT function (REPEAT_H).

FIG. 8 examples the horizontal version of the REPEAT function. Essentially writing the same formula 843 except 'REPEAT_V' in FIG. 7B 743 is replaced by 'REPEAT_H'. All the automatic activities 875 are effectively the same until step five 878 which formats the results horizontally rather than vertically, allowing users to easily present the values in the manner they prefer.

Figure 9:
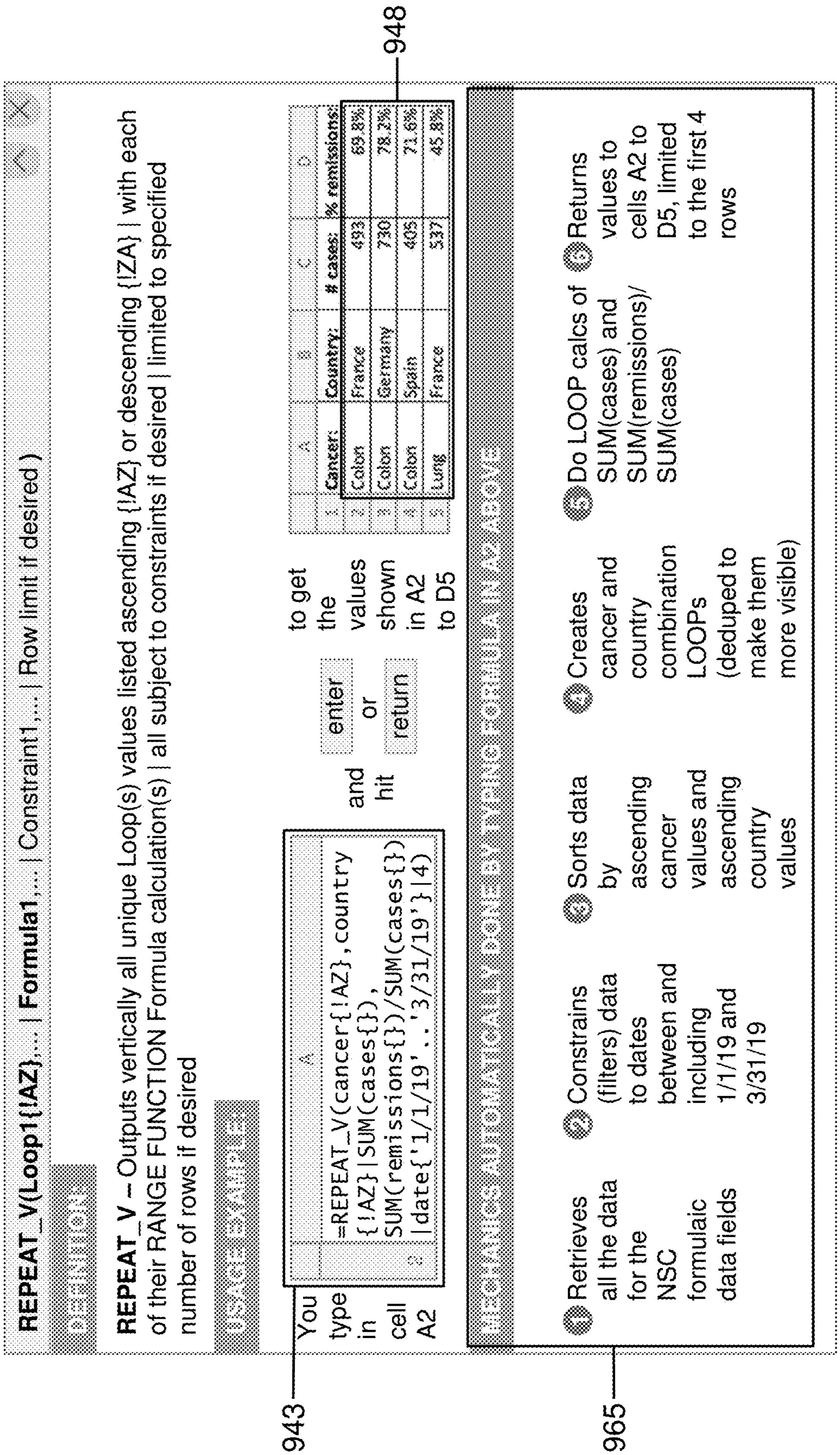

FIG. 9 through FIG. 11 examples employing one of each of the optional inputs—namely a combination loop (e.g., Loop2 input), multiple formulas (e.g., Formula2 input), a data constraint (filter) and a row limit for the output. The formula 943 sets up combination 'cancer{!AZ} ' and 'country{!AZ}' ascending NSC formulaic data loops, each evaluating two different formulas, all constrained (filtered) to dates between and including 1/1/19 and 3/31/19 (from the argument '|date{'1/1/19' . . . '3/31/19'}') to arrive at an output listing limited to the first four rows (from argument'|4'). This limitation of outputs is not something available in Pivot tables and can be of great utility as later shown on large sets of results where the user only wants to look at different parts of the result. For example, in this embodiment, if the user wanted to only see only the last five rows of the results they would input the limitation as '−1:−5' to get the last output which is the '−1' to the fifth last which is the '−5'. The mechanics automatically done by the Function 965 are outlined in FIG. 9 and shown in detail in FIG. 10 and FIG. 11. Please note the illustration of the mechanics is done to more visually show what is occurring and not a representation of how those calculations are actually done by our application.

FIG. 10 shows the retrieval of the NSC formulaic data in step one 1052, then the constraining (filtering) of that data to dates between and including 1/1/19 and 3/31/19 is shown in step two 1055. In this embodiment of our technology dates are designated in formulas by single quotes (' ') and formulaic data ranges by double periods ( . . . ). Step three 1058 then sorts the constrained (filtered) data by ascending values of 'cancer{!AZ}' followed by ascending values of 'country{!AZ}', as both have '!AZ' (the ascending command in this embodiment) in the formula 943. FIG. 11 continues with step four 1152 where the cancer and country combination loops are created for all the data used in the calculations. Step five 1155 then does the two different loop calculations for each of the combination loops. Step six 1158 completes the mechanics vertically configuring the values, limiting the values in the order set up in step three to four (4) rows and populating the results 1138 to cells A2 to D5 948 (in FIG. 9).

FIG. 12 through FIG. 16 example the capabilities shown in FIG. 7B and FIG. 9 through FIG. 11 using formulaic data usage of in-cell data rather than our NSC formulaic data. In this embodiment of our technology the syntax of our new functions is unchanged by the data source thereby keeping usage simple for users.

Figure 12:
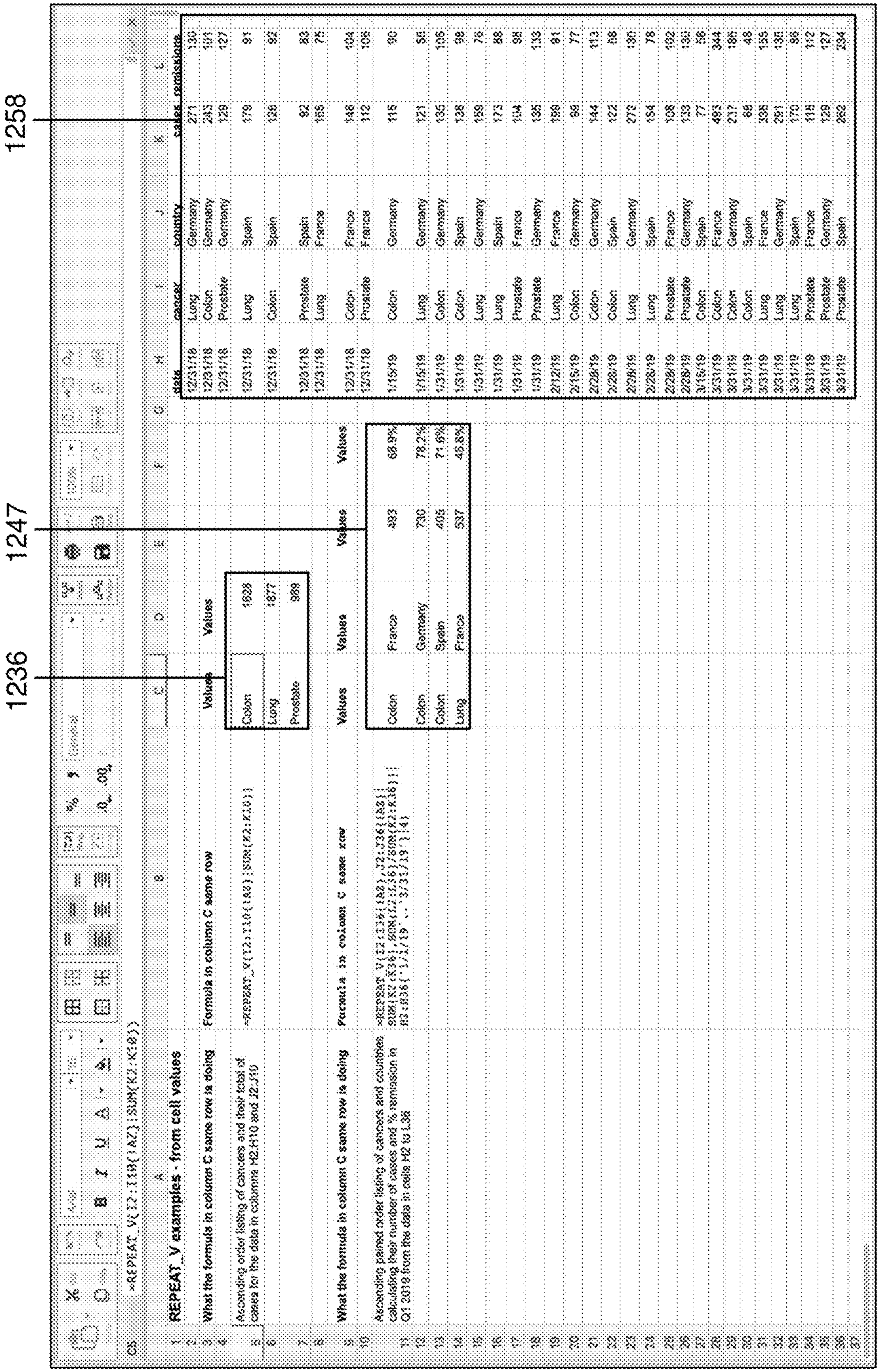

FIG. 12 shows the data used for the following examples in cells H2 to L36 1258. That data could have been in a different worksheet but was placed here for example purposes. The data could have been in rows rather than columns, although most users tend to put the data in columns. FIG. 12 also shows the results of the example in FIG. 13 in cells C5 to D7 1236 and the results of the example shown in FIG. 14 through FIG. 16 in cells C11 to F14 1247.

Figure 13:
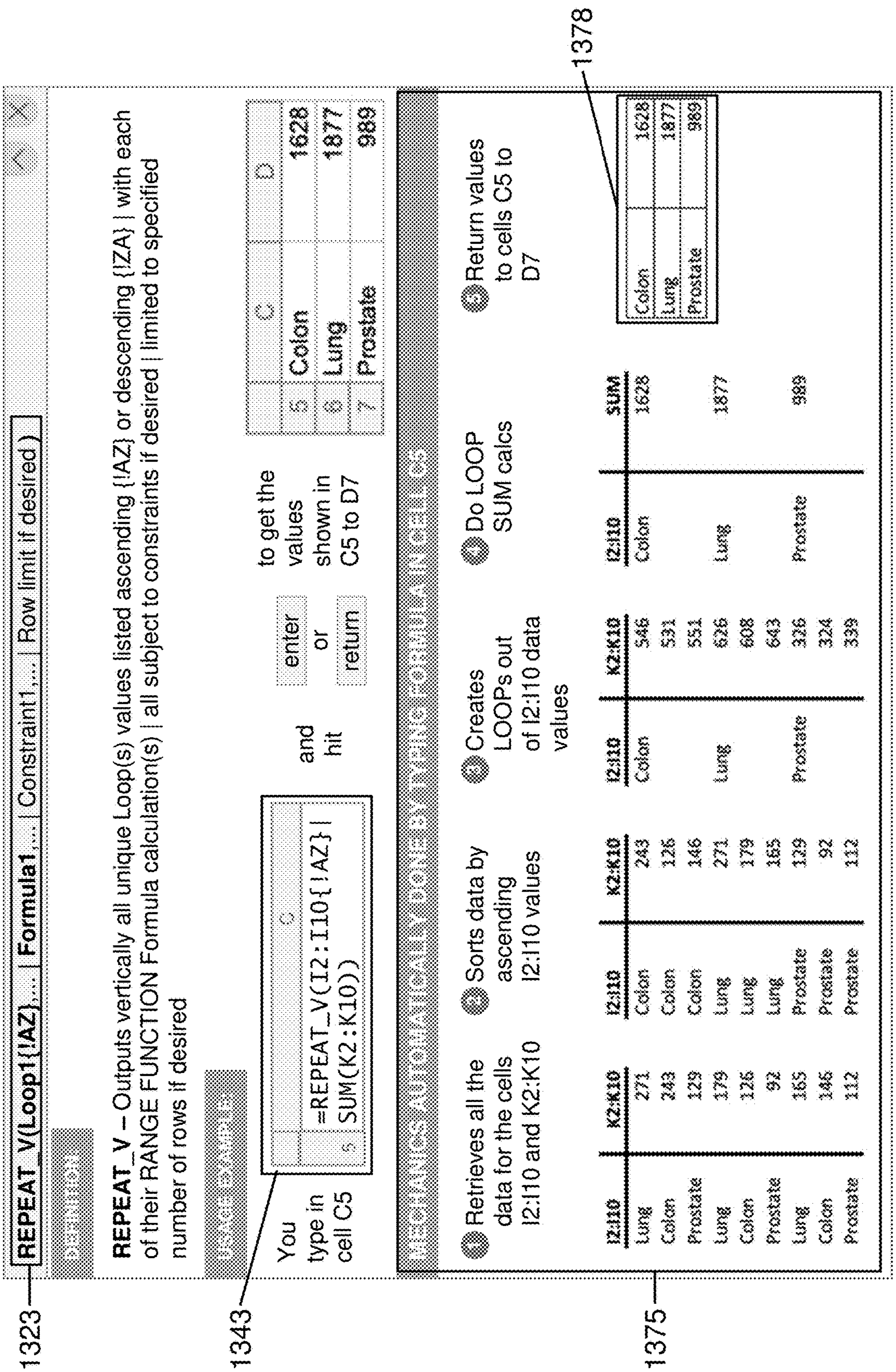

FIG. 13 examples, in formula 1343, the in-cell data sourced equivalent of formula 743 in FIG. 7B. In this embodiment the difference is that each of the NSC formulaic data fields is replaced with the cell data ranges that holds the comparable data. The syntax of the REPEAT_V formula 1323 is identical in both examples and as such the usage of data types is solely at the discretion of the user. The automatically executed activities 1375, are identical to those in FIG. 7B 775 other than the data descriptors and where the data is retrieved from. The results 1378 are identical to the results 778 in FIG. 7B.

Figure 14:
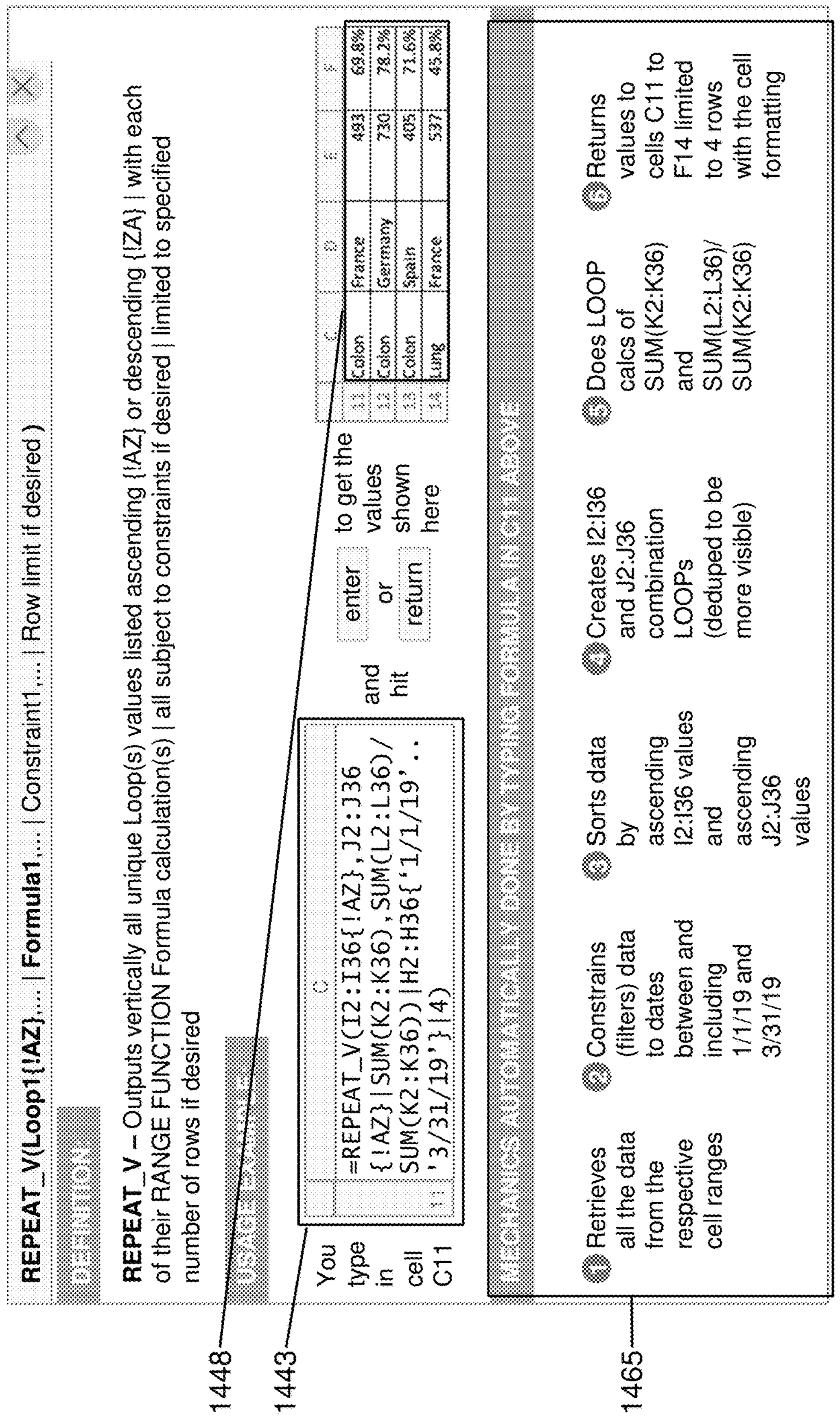

FIG. 14 through FIG. 16 examples the set of capabilities exampled in FIG. 9 through FIG. 11 using an in-cell data source. FIG. 14 examples the equivalent formula 1443 as in FIG. 9 943, again where the only differences are each of the NSC formulaic data fields is replaced with the cell data ranges that holds the comparable data. The automatically executed activities outlined in FIG. 14 1465, are identical to those in FIG. 9 965, other than the data descriptors and where the data is retrieved from. The detailed steps in FIG. 15 and FIG. 16 are identical to those in FIG. 10 and FIG. 11 other than the data identifiers. The results 1448 are identical to those in FIG. 9 948. This further examples how our technology seamlessly works across the different data sources using a syntax that is indifferent to the data source, therefore adding no unnecessary complexity for the users.

There are embodiments where the syntax and the implementation of the syntax would be different for accomplishing the same or related capabilities. For example, in the prior embodiment, '!AZ' means ascending sort and '!ZA' means descending sort when the words 'ASCEND' or 'DESCEND' could have been used or different argument types and structures could be used to set the sort order. Date ranges have been put in single quotes and inclusive ranges are denoted by the connector of ( . . . ) when they could have described in other ways like date{~1/1/19~:~3/31/19~} and the cell equivalent of H2:H36{~1/1/19~:~3/31/19~}. In our technology the syntax is selected to make usage simple and understandable for the users.

Figure 17:
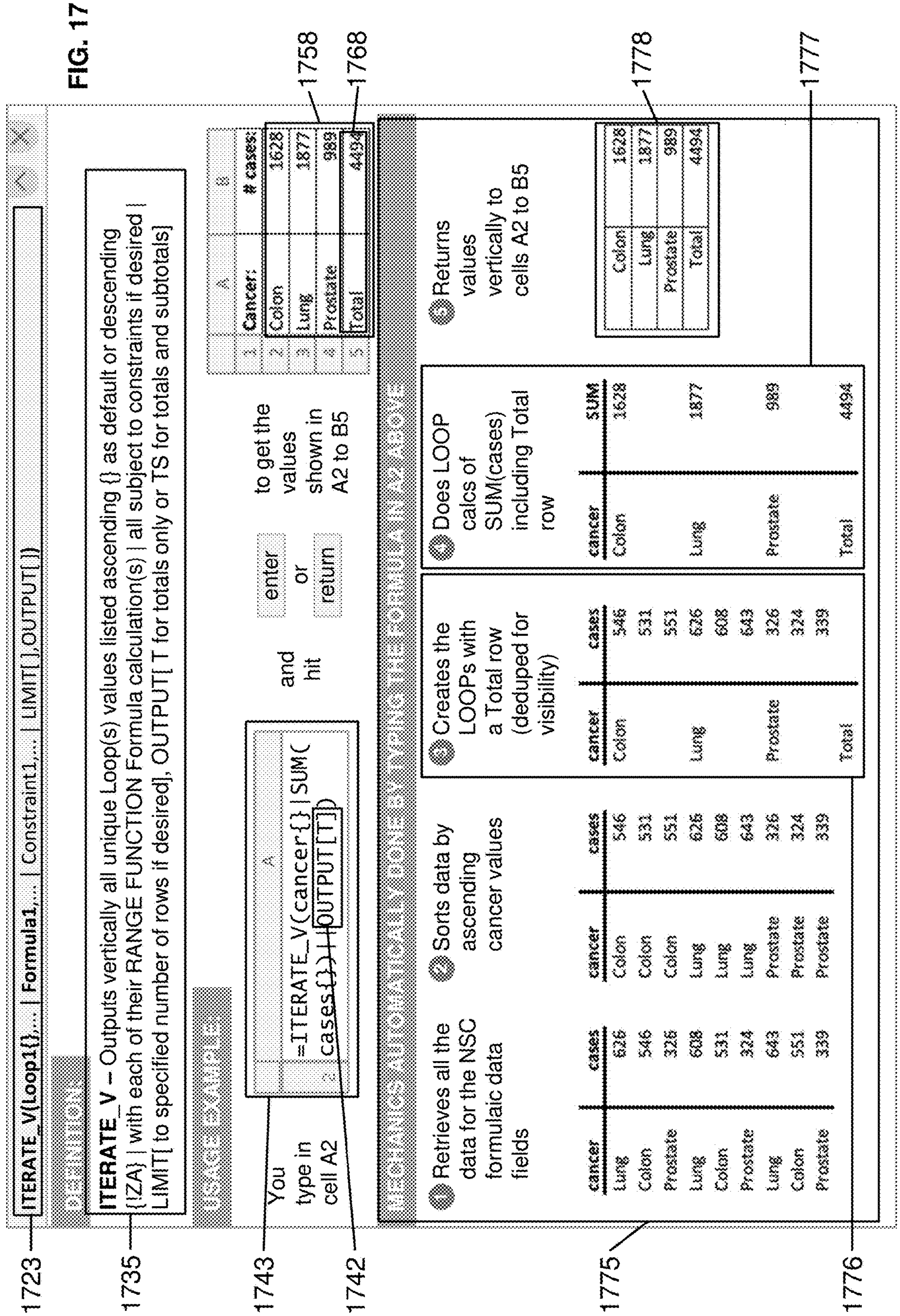
FIG. 17 examples our technology automatically adding a total (ITERATE).

Our technology also accommodates the easily adding the totals and subtotals via a simple term addition. FIG. 17 examples an embodiment of our technology with an altered syntax 1723 for a function called 'ITERATE_V' (or ITERATE_H) that accommodates via a term here called 'OUTPUT' adding totals and subtotals. The description 1735 explains in this embodiment that adding the term 'OUTPUT [T]' 1742 as done in the formula in 'A2' 1743 adds a Total row to the output as exampled in the output 1758 including the totals in cells 'A5' and 'B5' 1768. This is shown in the five automatically executed steps starting in step three 1776 where the LOOPs created include at a Total row at the bottom. Then in step four 1777 a LOOP calculation is done for the Total row which is also returned with the values in step five 1778 to the cells 'A2' to 'B5' in the output 1758. Note, as stated before, these mechanics done automatically illustrate what is done so it is understood while not necessarily showing how our application actually does it.

Figure 18:
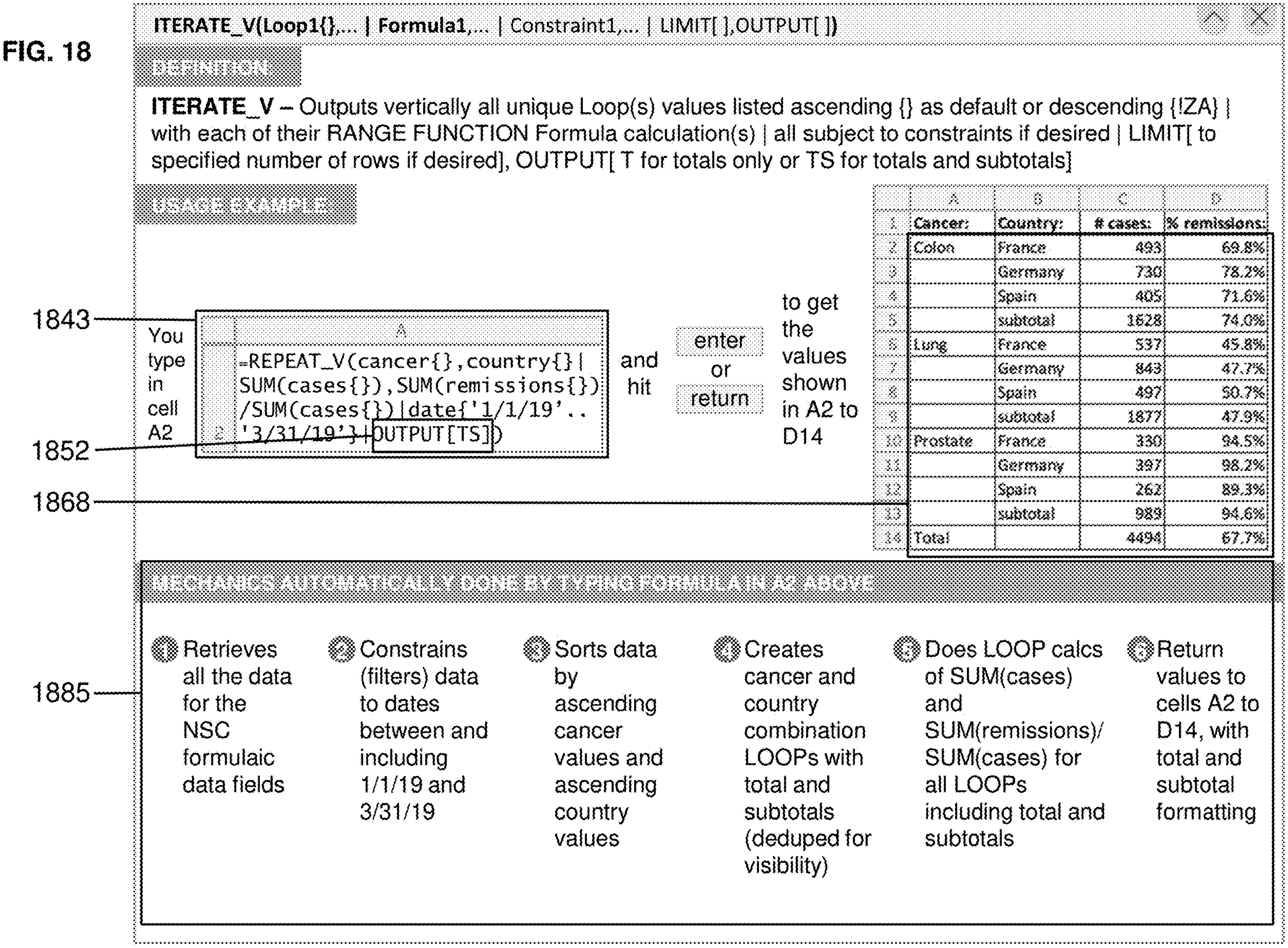

FIG. 18 through FIG. 20 examples the inclusion of both a Total row and subtotal rows again added in this embodiment of our technology by the addition of a simple term 'OUTPUT[TS]' 1852 in the formula in cell 'A2' 1843. This formula automatically executes the six steps 1885 that deliver the values in cells A2 to D14 1868 including three rows of subtotals and one row of totals. The detailed exampling in FIG. 19 of the data retrieval 1952, constraints (filters) application 1955 and sorting 1958 steps are like the previous examples. However, the difference is seen in FIG. 20 step four 2052 where the setting up of the LOOPs includes setting up three subtotal and one total rows. Then in step five 2055 the LOOP calculations are also done for those rows so that the values that are calculated are returned in the set of values 2048 that step six 2038 populates in spreadsheet cells A2 to D14 1868 (in FIG. 18). Thus, giving users many options within a single formula in our technology to calculate and present looped analyses without having to do many steps and having to learn and remember new UIs (e.g., Pivot tables).

Capabilities Well Beyond Pivot Table Replacement

Figure 21:
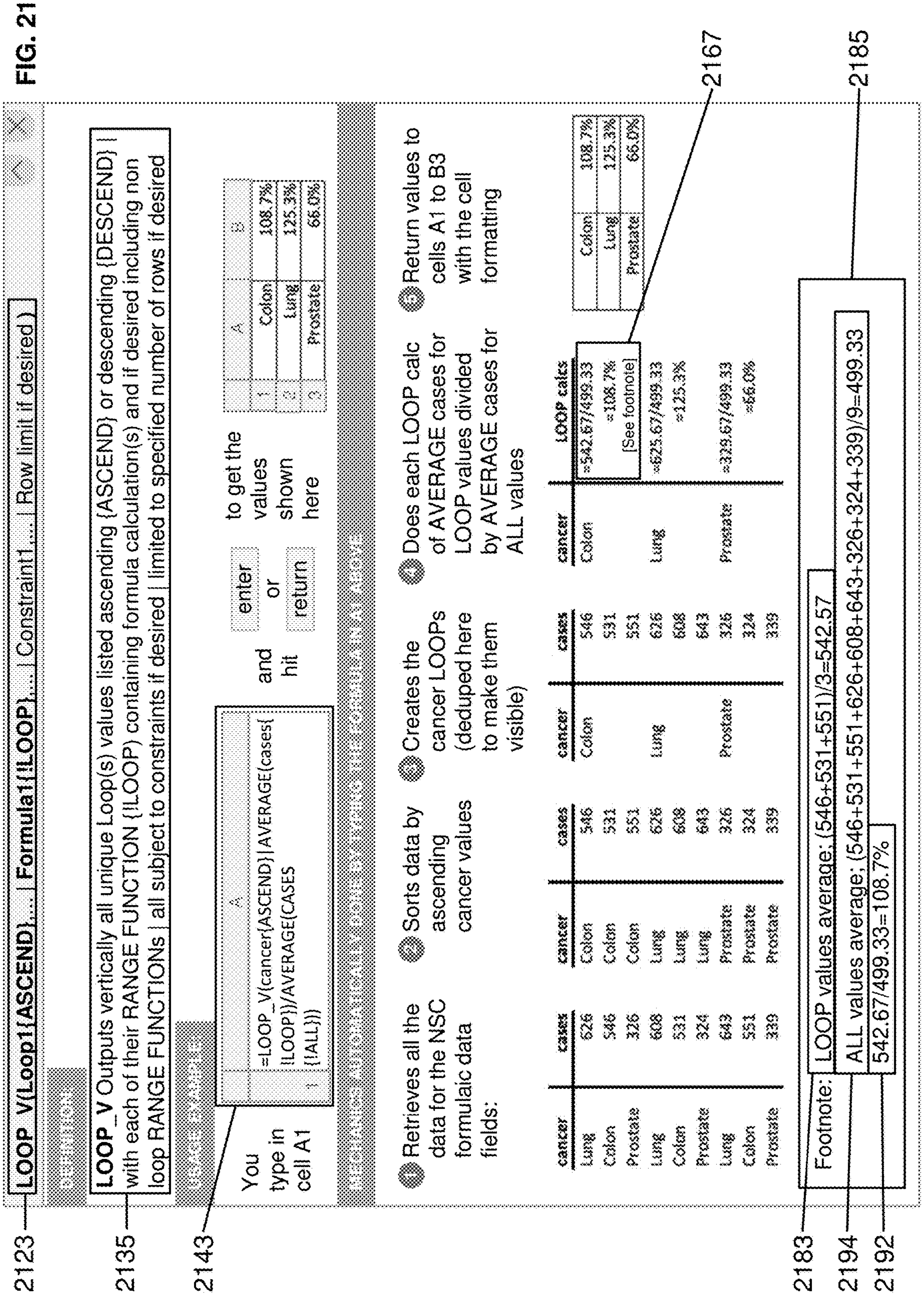
FIG. 21 examples our LOOP function which supports loop and non-loop range function calculations.

FIG. 21 examples an embodiment where the Range function calculations can use the range of the loop or a different specified range. This allows users a much greater breadth of calculations not easily possible, or impossible, in a Pivot Table. In this embodiment the function is named LOOP with the syntax in 2123 and a description 2135 that explains that Range functions can be included in a formula without using the loop values or non-loop values. In this embodiment the Range function or functions using the distinct loop values contain '!LOOP' as exampled in the formula shown in cell 'A1' 2143 for the function 'AVERAGE(cases{!LOOP})' This calculation shown in detail in the footnote 2185 for the first LOOP 2167, calculates the LOOP values average 2183 using only the loop values of 'cases'. While the 'AVERAGE (cases{!ALL})' in the cell 'A1' 2143 uses all the values of cases, as shown in the 'ALL values average' 2194 calculation exampled in the footnote 2185. This allowed the user to easily calculate the average number of cases for each cancer type relative to the average for all the cancer types 2192. This capability allows users to do a much broader spectrum of calculations not be bound by the loops.

Not only can users do calculations in our technology using values outside the loop, but they can do calculations using any cells values or NSC formulaic data fields. There is no limitation, as is present in a Pivot Table, to data fields in the Pivot. Our technology handles data from different external data sets and can join data from different external data sets in the function formula. Similarly, with in-cell data, our technology can use data that is not in the same worksheet and definitely not aligned in a block as you need for a conventional spreadsheet Pivot Table.

Figure 22:
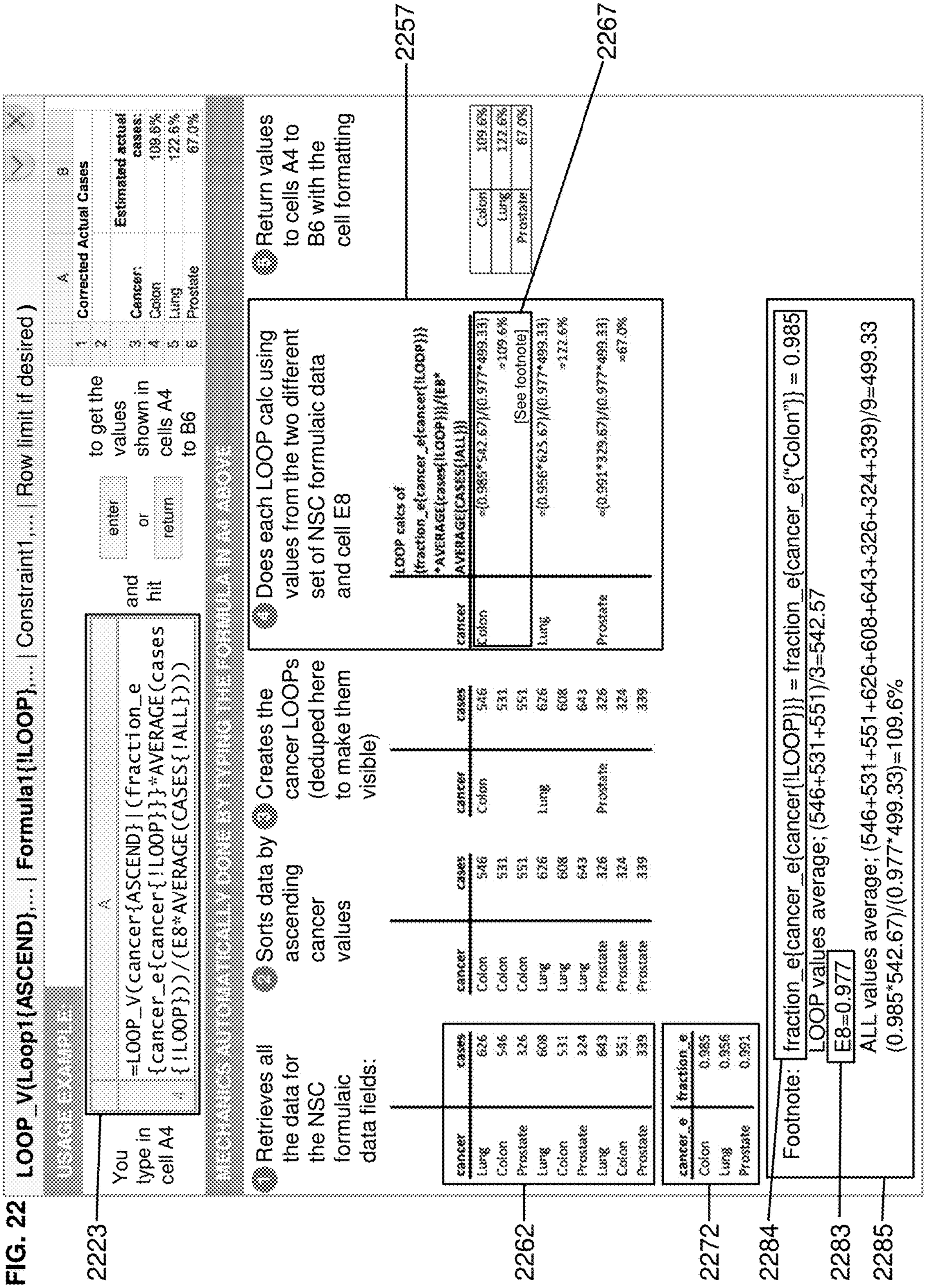
FIG. 22 examples our LOOP function supporting loop calculations using two different NSC data sets automatically joined across external data tables via a formula input.

In FIG. 22 the cancer researcher is using data from two different NSC data sets, 2262 and 2272, as well as from a cell 'E8' that is not within the looped inputs used in the formula 2223. The data sets, 2262 and 2272, share cancer values in the two NSC formulaic data fields 'cancer' 2262 and 'cancer_e' 2272 so those values can be used to join data across the tables and in this example that will be done within the loop (equivalent) formula calculations for distinct or unique values of a data field. That is exampled for the first Loop calculation 2267 in step four 2257:

fraction_*e*{cancer_*e*{cancer{!LOOP}}} where the loop value of cancer from data in table 2262 is used to retrieve the NSC formulaic data field fraction_e (i.e., fraction of reported cancer cases for each type of cancer that are actual cases) which resides in a different table of data 2272. How that works is exampled in the footnote 2285 first line 2284 where the 'Colon' from the loop is used via the formulaic data variable 'cancer_e' in the other table to look-up and get (join) the desired value of 'fraction_e' of '0.985'. The rest of the calculations for the first loop of FORMULA1 are shown in that footnote 2285, including the use of cell value 'E8' 2283.

These additional capabilities have allowed the cancer researcher to make their Estimated Actual Cancer cases much more accurate by correcting them for the misreporting fraction using the second data set 2272 and using the cell value 'E8=0.977' 2283. This is just one example of the many applications where having the ability to use and join data from other external tables and data from anywhere within the spreadsheet will be valuable in spreadsheet loop calculations. To otherwise replicate these capabilities in a traditional spreadsheet would require the ability to program in the spreadsheet embedded programming language, write fairly complicated programs and have direct external data access including automatically running Power Query or an equivalent tool to access and join the data during the analytics, capabilities that conventional spreadsheets do not have. Doing this all-in-one formula is something conventional spreadsheet technologies cannot even come close to do even using their embedded programming languages.

Figure 23:
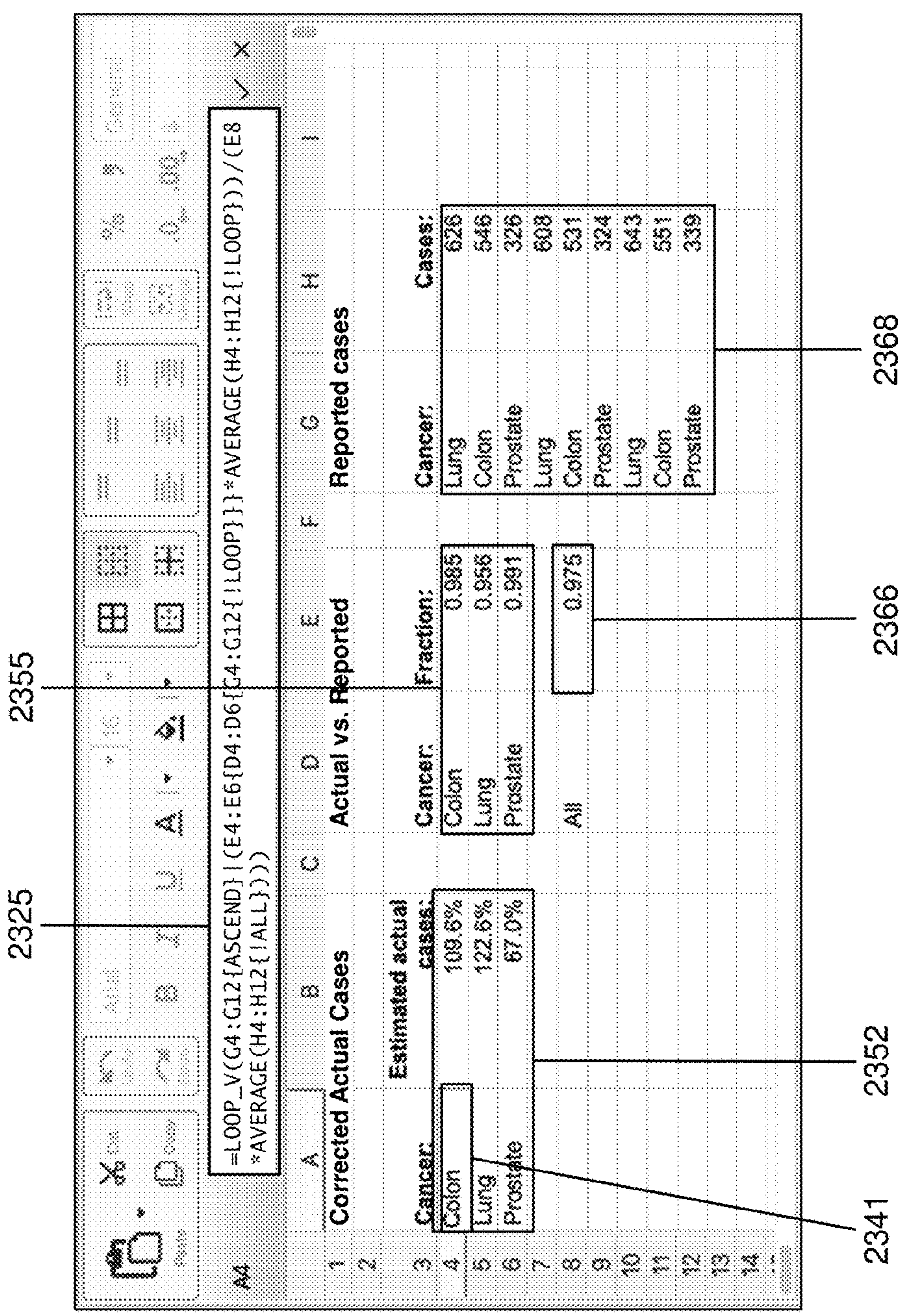
FIG. 23 and FIG. 24 shows our LOOP function working with in-cell data, replicating the capabilities shown for Non-Spreadsheet Cell (NSC) formulaic data in FIG. 22
Figure 24:
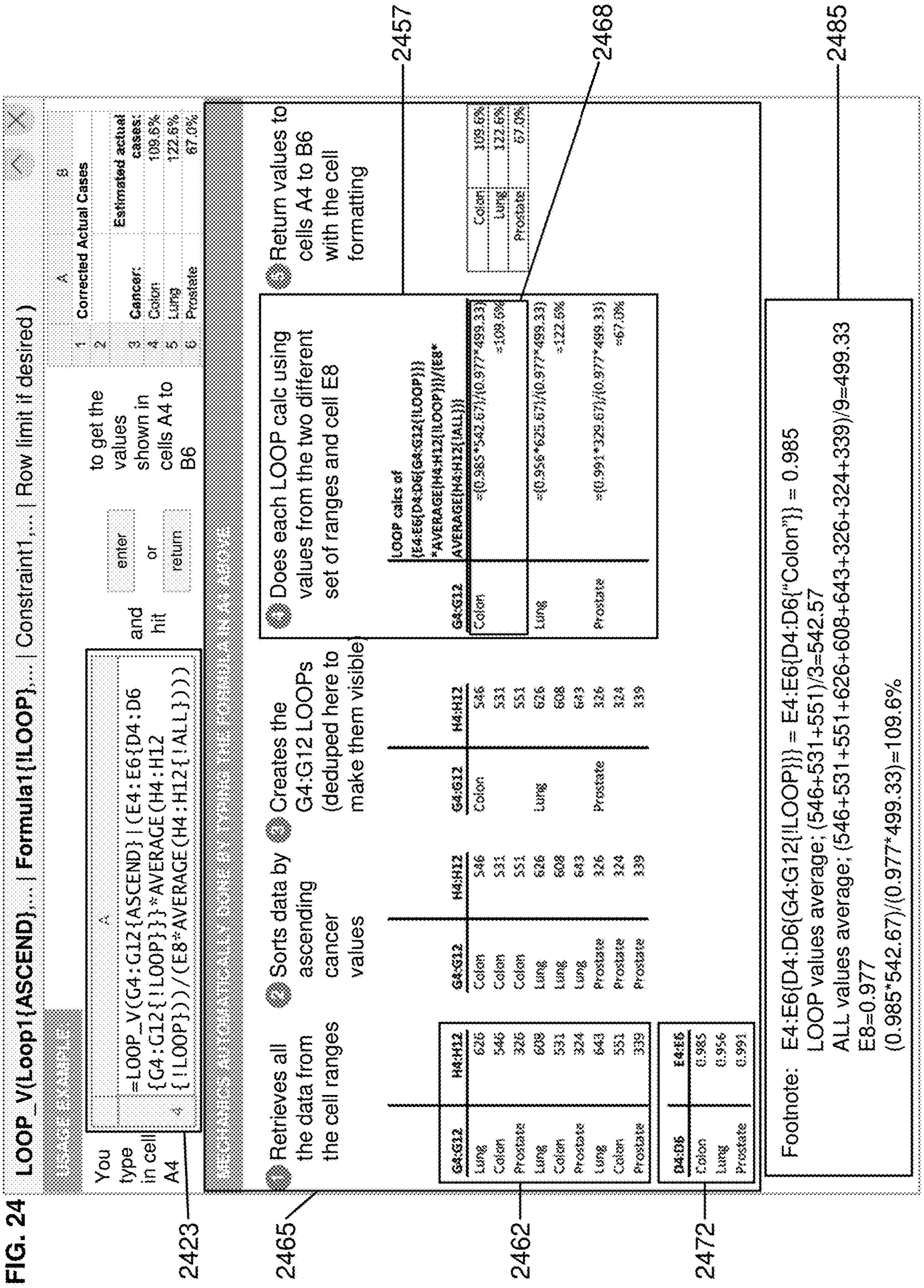

FIG. 23 and FIG. 24 example using formulaic data usage of in-cell data to replicate the calculations done using our NSC formulaic data fields in FIG. 22. These calculations use the same data, but in this case, source that data from two different in-cell data sets 2355 and 2368, which are only shown close together here for example purposes but could be in separate worksheets or elsewhere in the spreadsheet. It also shows the outcome in cells A4 to B6 2352 and the function formula used in formula bar 2325 for the cell 'A4' 2341. FIG. 24 then shows the formula used 2423 (also shown in FIG. 23 2325) and the mechanics 2465, automatically done by the formula. There is no difference relative to FIG. 22 other than the source of the data (the cells in FIG. 23 rather than NSC formulaic data fields) and all the accompanying data labelling. The calculations in step four 2457 are the same as exampled for the first loop 2468 in detail in the footnote 2485. Again, this examples how our technology transcends its data sources and allows users not skilled in Pivot Tables to use functions to solve problems that cannot be done by today's spreadsheet Pivot Tables and require embedded programming skills and data accessing skills very few spreadsheet users have. While these examples have been done with very small data sets, for ease of illustration, they scale to data sets having tens of millions of rows if not more with data joined across more tables, as desired by the user.

As later shown, our technology allows users to construct loop equivalent calculations for distinct or unique values of a data field incorporating virtually any function and algebraic operation, something not available in existing spreadsheet Pivot Tables. Our embodiments also allow users to employ a substantially larger spectrum of the range or array evaluating functions exampled in FIG. 25 for the loop calculations. Versus Microsoft Excel where the function choices are only Sum, Count, Average, Max, Min, Product, Count Number, StdDev, StdDevp, Var and Varp and no other variants of these functions. Thus, giving users one-dimensional pivot table in a simple one step function format that has many capabilities that are not available in conventional spreadsheet pivot tables, and as we example next, opening an entirely different set of capabilities by altering the ordering of the results.

Ordering

In many situations users want to do repetitive calculations and see the outcome ordered by the calculated results rather than sorted by the inputs that created the loops. We saw that in FIG. 1 through FIG. 6 where the cancer researcher wanted the summed list of treatment cases by cancer and country ordered from least to most treatment cases. Spreadsheet Pivot Tables do not allow users to order the outcomes across loops causing the user to have to exit the Pivot Table and do a separate manual sorting operation (which requires many steps as exampled in FIG. 5 and FIG. 6). What is worse, is that any subsequent change means the user has to revert back to the Pivot Table to make the changes, then replicate the exit and sorting steps making this a very unattractive process. As we will now example, our ordering embodiments of our technology solve those problems with a single function formula which is then readily set up to automatically accommodate changes.

Figure 26:
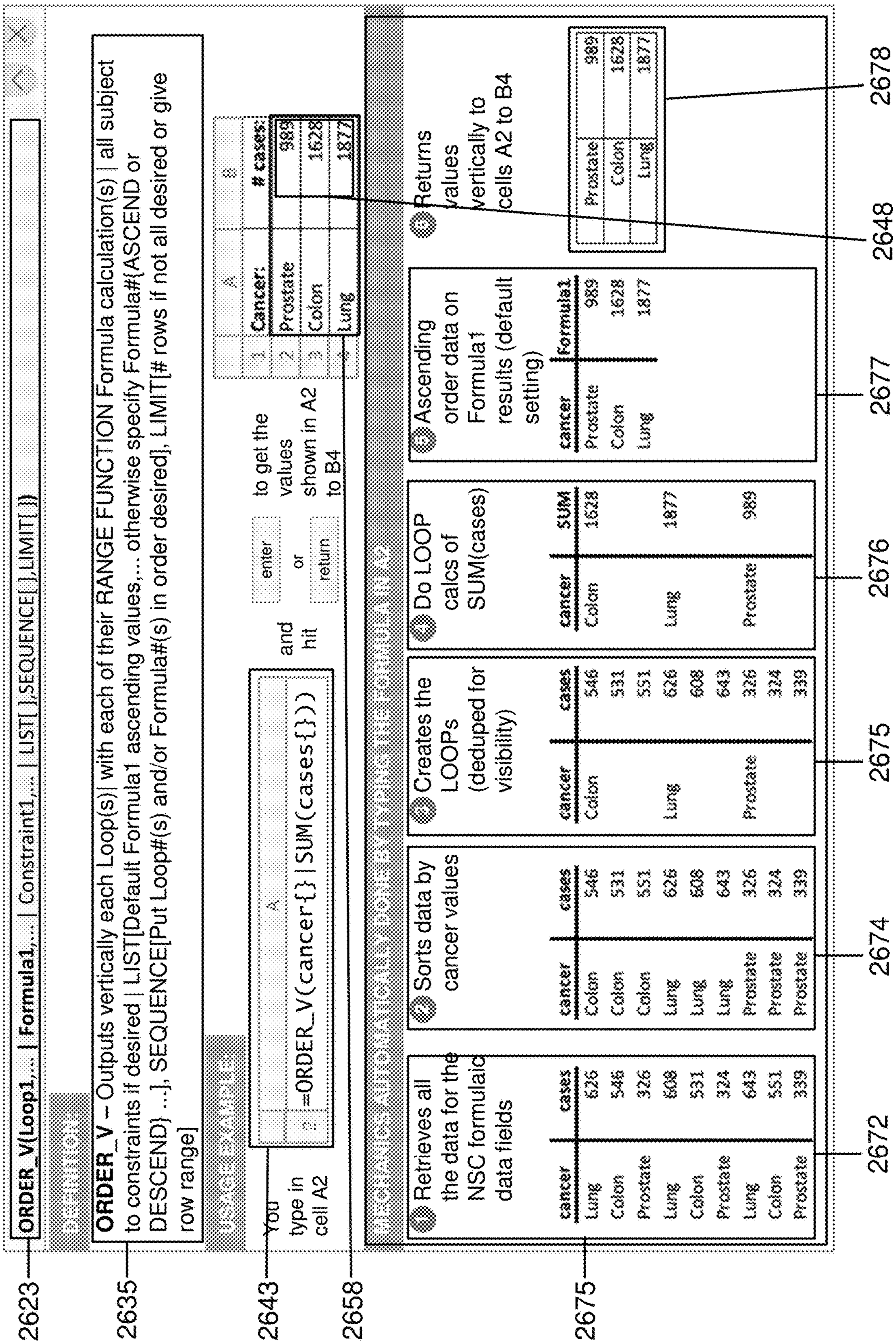
FIG. 26 examples the simplest set up of our technology where the outcome is ordered by the calculated results rather than sorted by the inputs that created the loops (ORDER).

FIG. 26 examples the simplest set up of our technology where the outcome is ordered by the calculated results rather than sorted by the inputs that created the loops. The new function, in this embodiment named 'ORDER_V', has syntax 2623 where the required inputs are bolded. The definition 2635 helps explain to the user how to fill in the function syntax. In this example the user has written the formula in cell 'A2' 2643 with our Non-Spreadsheet Cell (NSC) formulaic data. They have inputted the minimum requirement of one loop input and one formula input otherwise using the default settings (for LIST, SEQUENCE and LIMIT) which require no input. Upon hitting enter (or return on a Mac) our technology automatically executes the six steps 2675 to deliver the values to cells A2 to B4 2658 where the outputs have been listed in order of ascending values of Formula1 results 2648.

The automatically done steps 2675 start with step one 2672 retrieving the data with our NSC formulaic data and in step two 2674 sorting the data by cancer value (Loop1). Step three 2675 prepares the three cancer value LOOPs and step four 2676 does each of the loop calculations, in this example summing the 'cases' values for each value of cancer. Step five 2677 then sorts the data by ascending value of the SUM values (Formula1) which is the listing default. Step six 2678 returns all the values vertically oriented sequenced by ascending SUM value (the default) with no limit on rows (the default) to cells A2 to B4 2658. Thus, allowing a user to create with a single formula a repetitive calculation with outputs ordered by calculated values.

Figure 27:
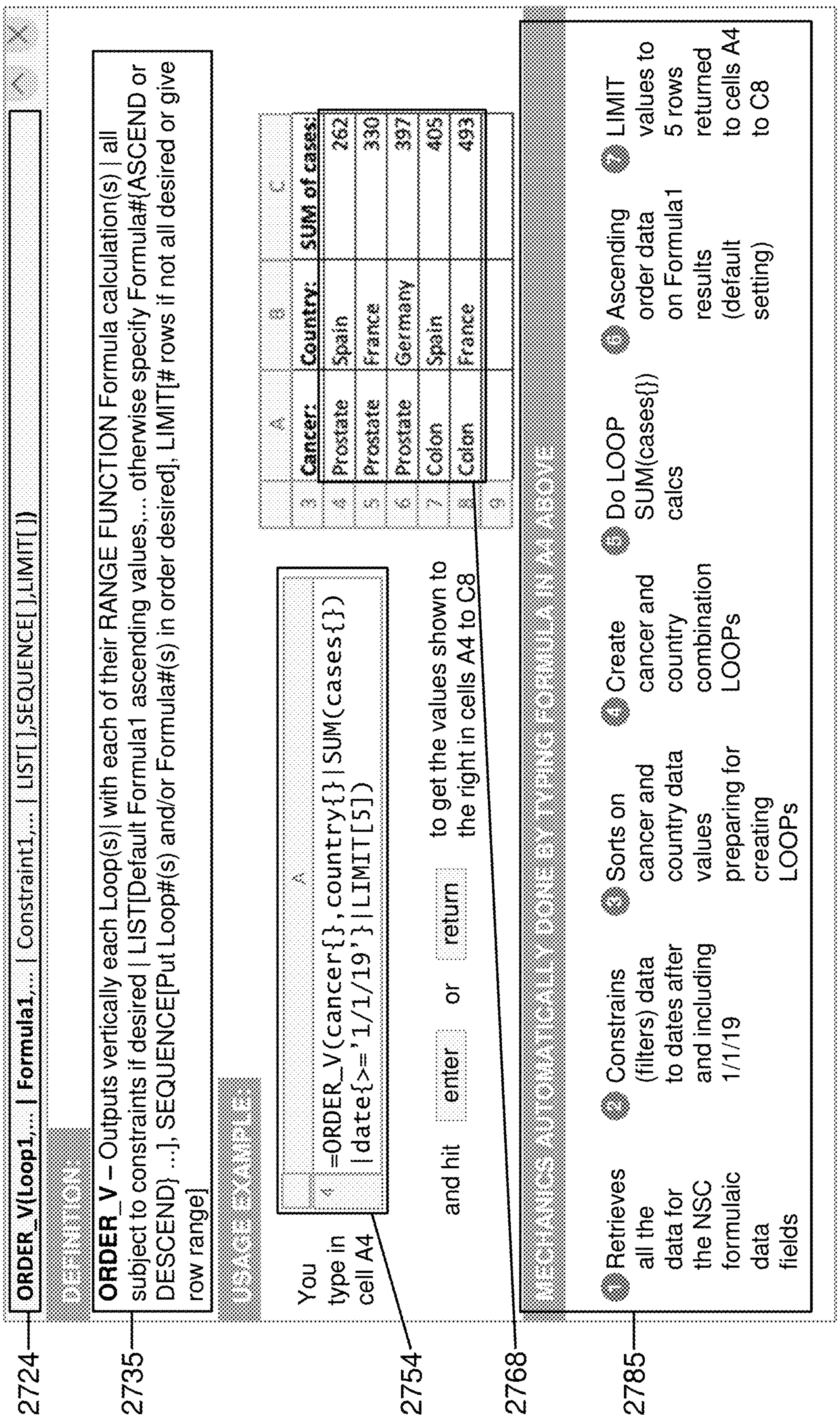

FIG. 27 through FIG. 29 then example our technology doing in one formula writing step what took either nineteen (FIG. 1 through FIG. 3) or seventeen steps (FIG. 4 through FIG. 6) in Microsoft Excel. In this example our ORDER_V function is used with the syntax outlined in 2724 supported by a definition of the syntax 2735. The formula written in cell 'A4' 2754 then automatically executes the steps explained in 2785 to deliver the output in cells A4 to C8 2768. That was all accomplished through the single step of writing one formula 2754, and recalculating it for a different date range, is as simple as inputting in the new date range with no additional activities. Thus, making it very easy for users to create and change our outcome ordered looped calculations. FIG. 28 and FIG. 29 illustrate the steps outlined in 2785, where the large difference relative to our previously exampled functions is the ordering step six 2937 which overrides the loop ordering to order values based on the ascending formula1 values, i.e., the SUM 2938. As the definition 2735 states, the default order is ascending values of formula1—so in this example the user desired the default setting.

Figure 77:
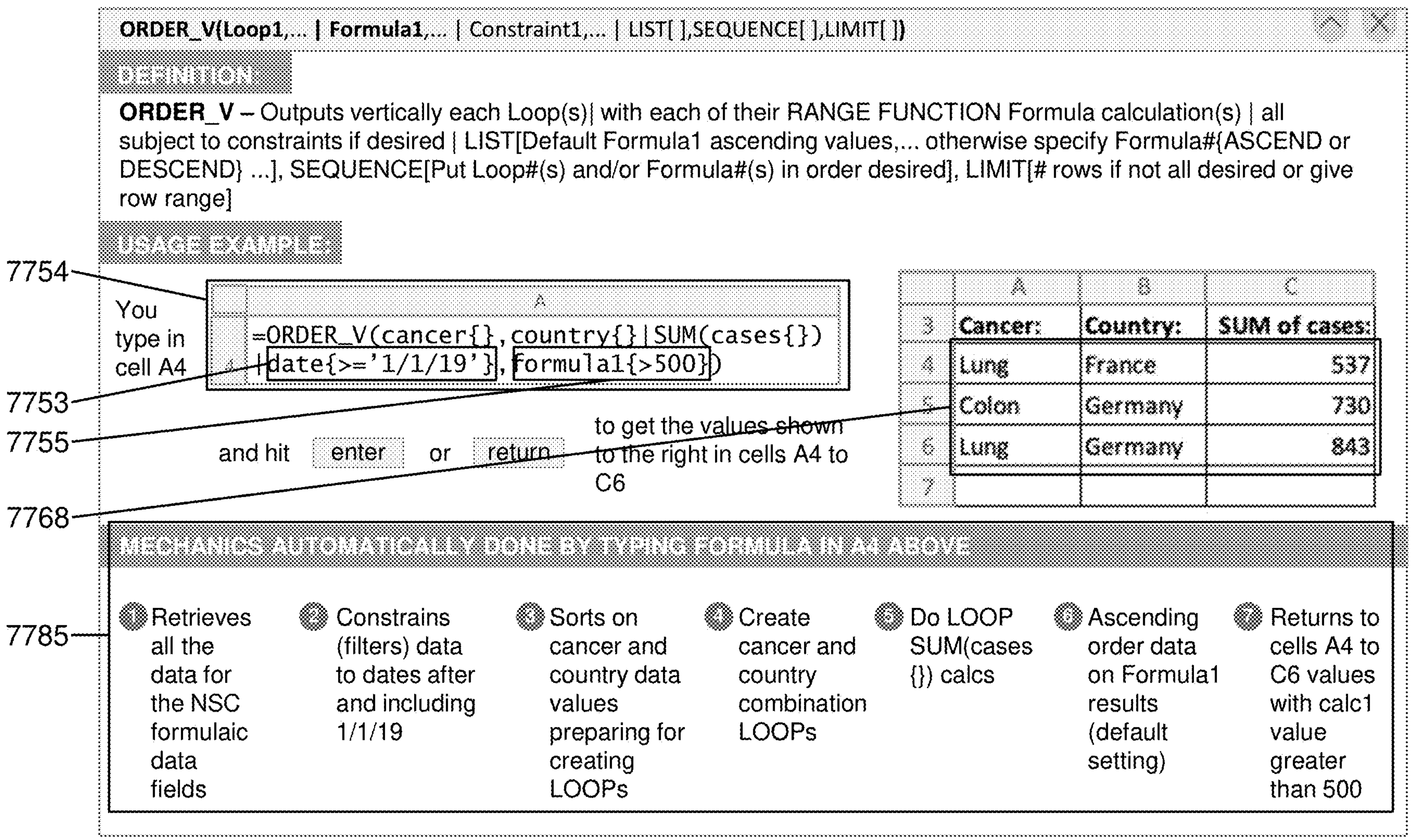
Figure 79:
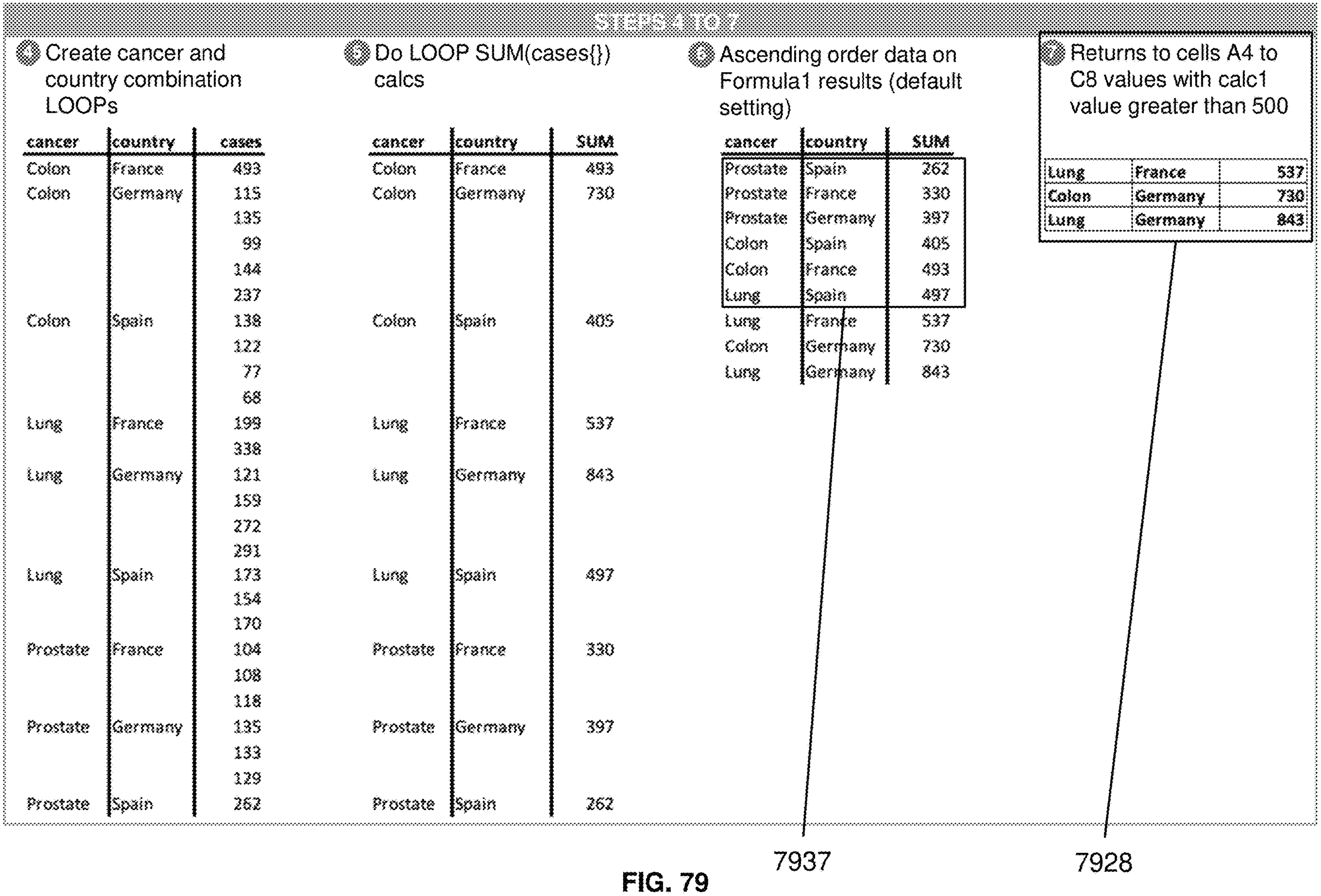

In some settings users may want additional control over the results presented from the loops. An example of this is shown in FIG. 77 through FIG. 79 where a user uses both a constraint (filter) on the data (exactly how it was done in FIG. 27 through FIG. 29) and a constraint (filter) on the calculated values. The data constraint is applied using the NSC formulaic data value 'date{>='1/1/19'}' 7753 in the formula in 'A4' 7754. The formula calculation constraint 'formula1 {>500}' 7755 is then applied in that same formula 7753. The data constraint is applied in the second step 7855 (in FIG. 78) of the seven automatically executed steps 7785. The formula calculation constraint is applied in the seventh step 7928 and in this example removes six of the loop calculations 7537 because their formula1 values are less than 500. The three sets of values with formula1 values greater than 500 7928 are returned to cells A4 to C6 7768. Thus, allowing users to automate in a single formula many loops, calculations, sorting and the screening of those calculations for what to output.

Figure 30:
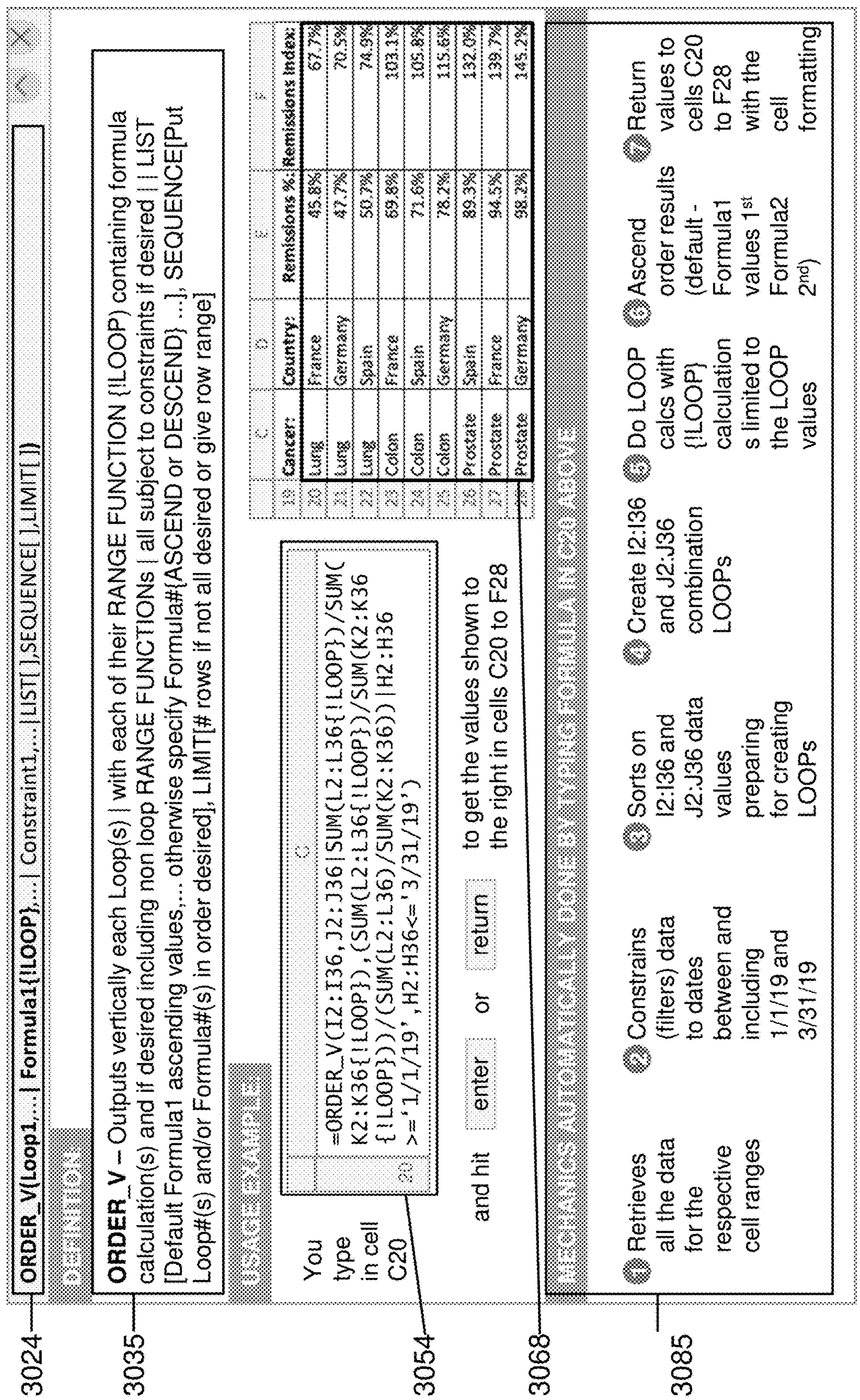
Figure 32:
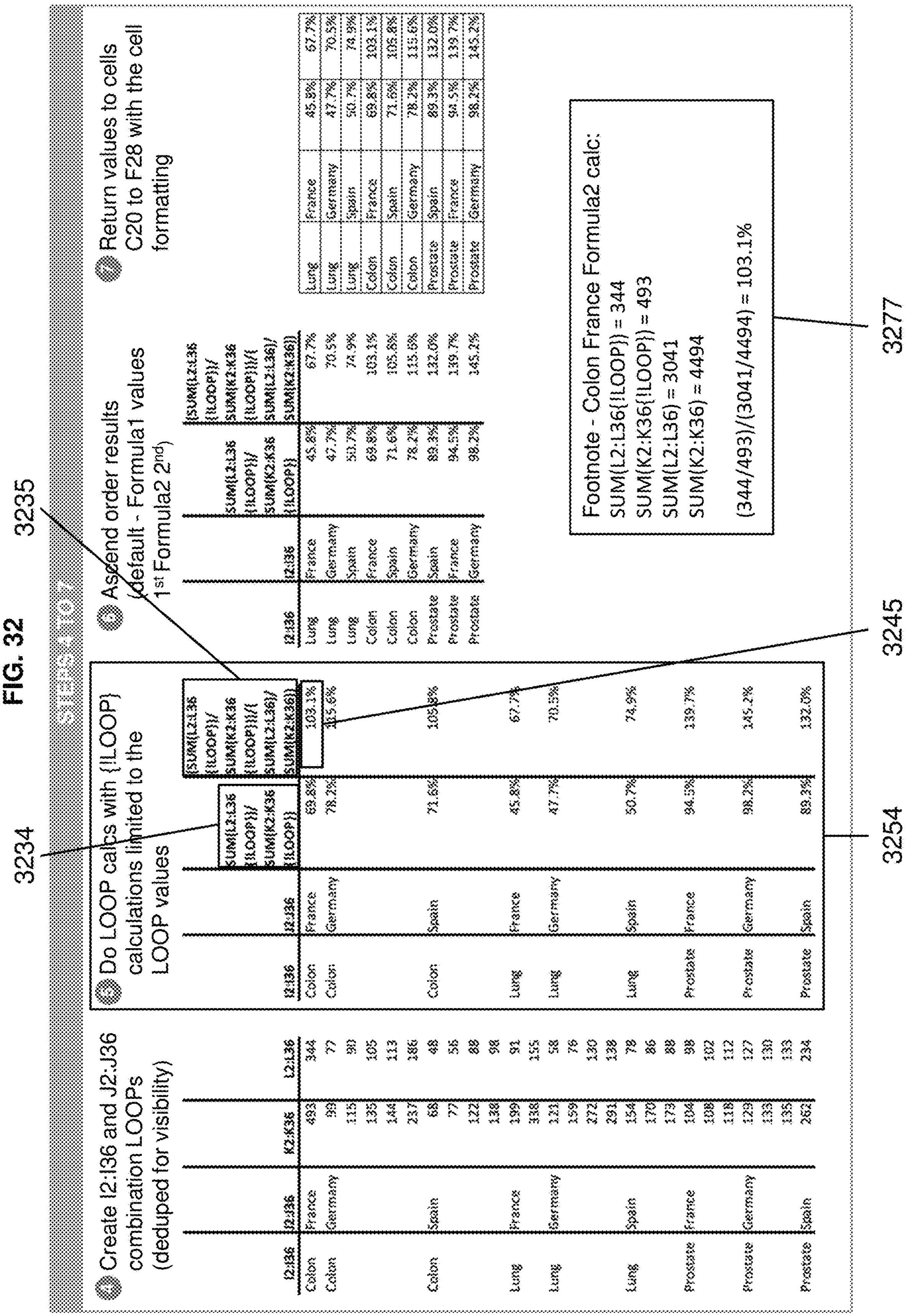

Like with our previous functions, the ORDER function works equally well for data sourced from our NSC formulaic data fields or formulaic data usage of in-cell data. A further embodiment of our ORDER function adds the previously described capability of designating which calculations use loop values versus which do not. FIG. 30 through FIG. 32 example that embodiment using the in-cell data 1258 shown in FIG. 12. The user has decided to add some further calculations using that data and is fine with the default ordering based on the formula calculated results. The user wants to calculate the percentage of remissions and the index of remissions (relative to all outcomes) for each cancer and country combination. Next, they want to see that data ordered from the lowest to the highest percentage remissions. The second calculation examples a formula where two of the range functions used the loop values and two of the range functions do not.

FIG. 30 shows a change to the syntax 3024, in this embodiment, to accommodate using loop values by incorporating '!LOOP' and using other terms (e.g., !ALL} to not use the loop values in formulas. That change is then explained in the definition 3035 telling users that they can add non-loop range functions to their formulas if desired. The formula in cell 'C20' 3054 contains two loop inputs, two moderately complex formulas and a date range constraint (filter). This automatically executes seven steps outlined in 3085 with the data retrieval and date range constraint (filter) application illustrated in FIG. 31. In FIG. 32 Formula1 3234 examples a formula where both SUM functions use the loop ranges '{!LOOP}'. Formula2 3235 examples a formula using range functions using both loop and non-loop ranges. The calculation for the first loop, with a result of '103.1%' 3245, for Formula2 3235 is detailed in the footnote 3277 showing both the loop and non-loop calculations. As previously discussed, this capability makes it possible for users to do a much broader set of calculations with our calculation ordering technology capabilities (e.g., ORDER_V).

Figure 33:
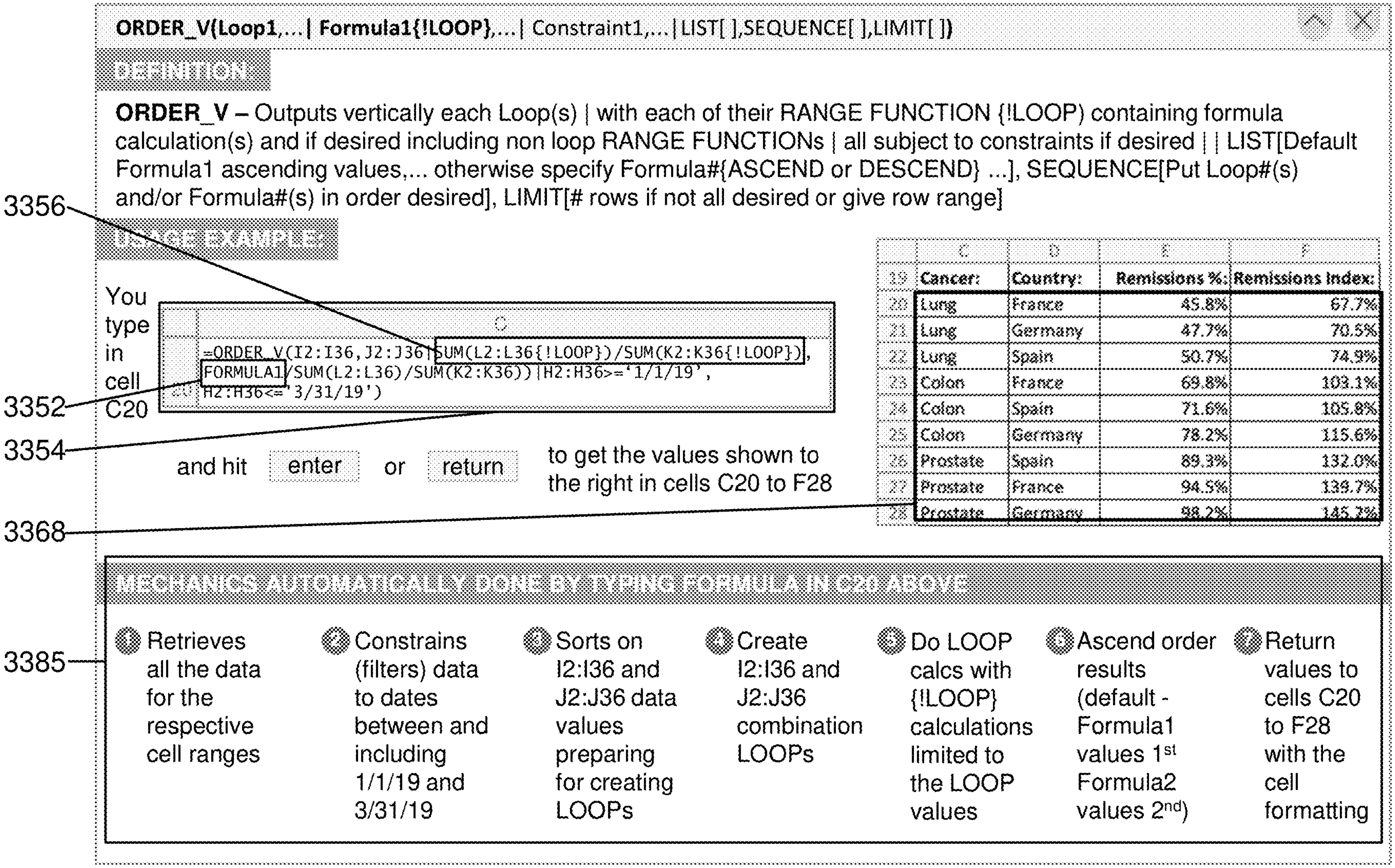
FIG. 33 examples using the FormulaX designator in formulas to replace rewriting formulas used more than once.

FIG. 33 examples another capability of our technology, where users can replace rewriting formulas used more than once in one of our functions. Users would particularly want to do that if it the formula repeated is long and complicated. In this embodiment that formula is replaced by its formula designator (e.g., FORMULAx). This is shown in the function formula in cell 'C20' 3354 where 'FORMULA1' 3352 is doing the exact same operation as 'SUM(L2:L36{!LOOP})/SUM(K2:K36{!LOOP})' 3356 without having to rewrite that formula. Thus, the formula 3354 is much shorter through the use of 'FORMULA1' 3352 than the same formula without the use of 'FORMULA1' in 3054 in FIG. 30. The mechanics automatically done are exactly the same in 3385, where the 'FORMULAx' formula abbreviation is used, as in FIG. 30 3085 when it is not. Thus, the output from the function put into cells C20 to F28 3368 and into FIGS. 30 C20 to F28 3068 are identical.

Figure 34:
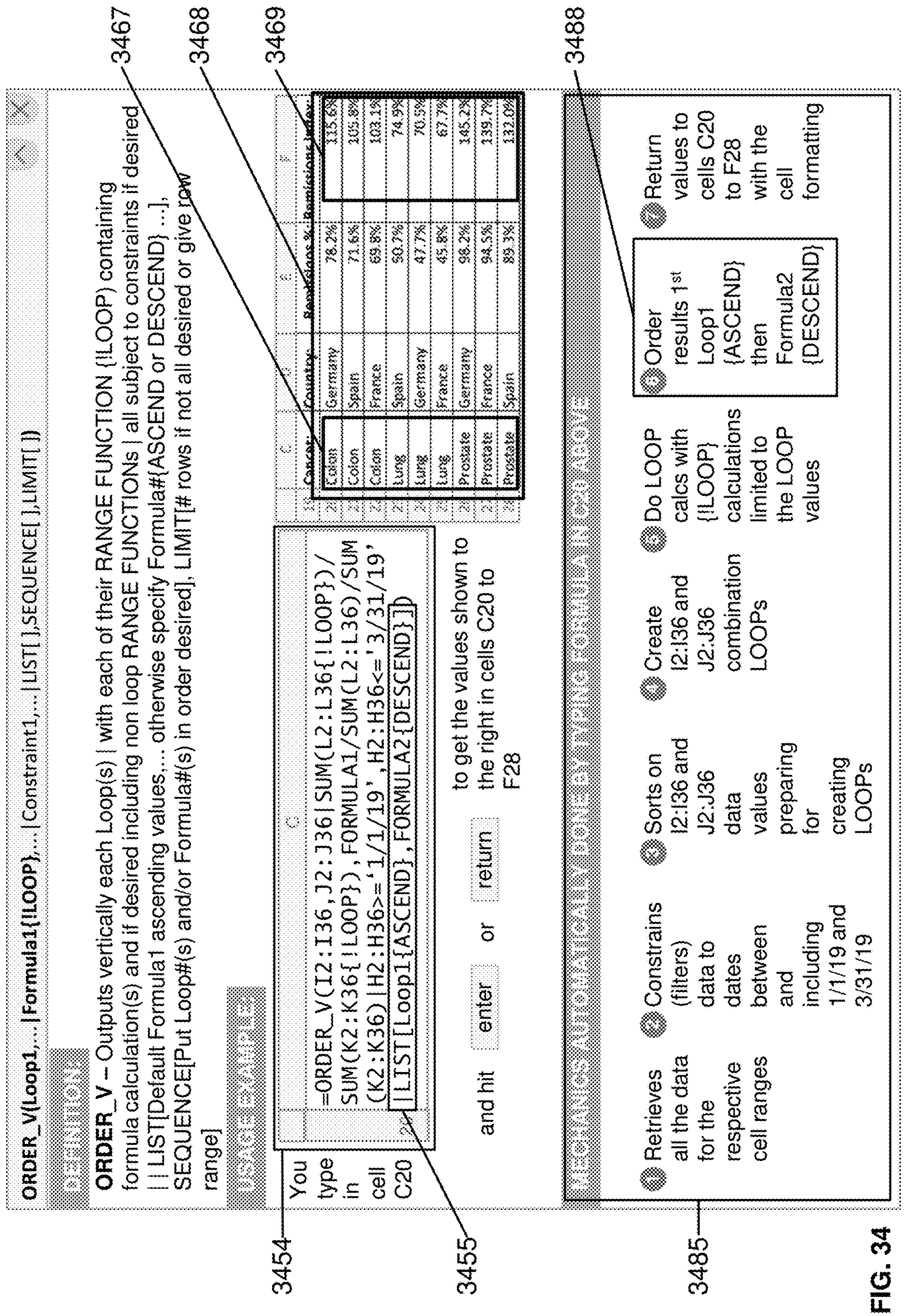
FIG. 34 examples altering the listing order of the function results to other than the embodiment's default.

FIG. 34 examples altering the ordering of the function results in our technology to be other than this embodiment's default. In this example the function formula in cell 'C20' 3454 has a specified list order '|LIST[Loop1{ASCEND}, FORMULA2{DESCEND}]' 3455 starting with Loop1 in ascending order and then Formula2 in descending order. That is reflected in the automatically executed mechanics 3485 which has the same steps as those in FIG. 33 3385 except step six 3488 incorporates the LIST input 'LIST [Loop1{ASCEND],FORMULA2{DESCEND}]' 3455. Those changes are then reflected in the output in cells C20 to F28 3468 where the results of the function are ordered first by ascending 'Cancer' values 3467 (Loop1) and then by descending Remissions indexes 3469 (Formula2). This gives users the ability to order the presentation of the results, i.e., the loop values and loop calculations, totally independent of how they were calculated.

Figure 35:
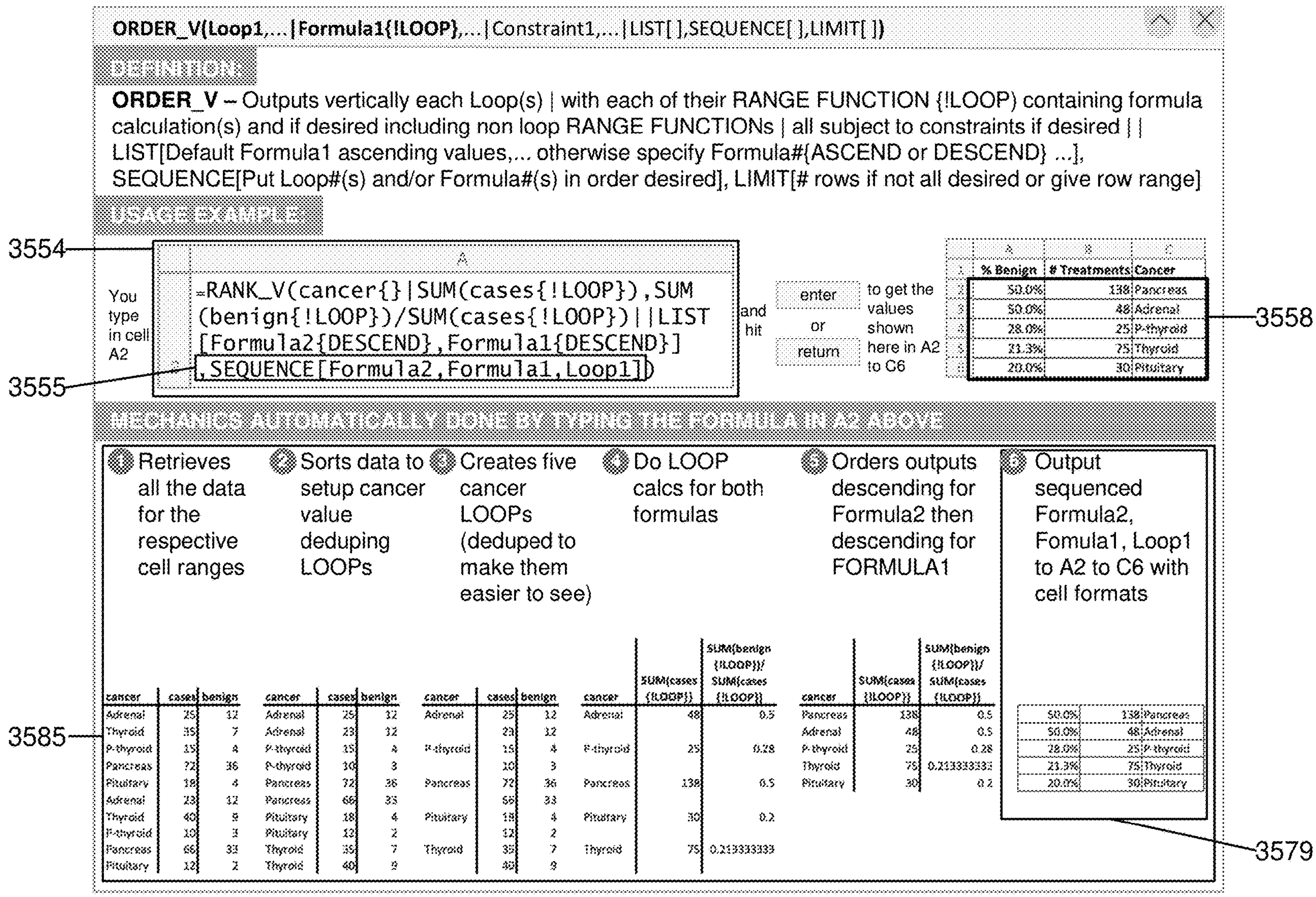
FIG. 35 examples further tailoring the output from our functions by selecting what to output and the sequencing of the output.

FIG. 35 examples further tailoring the output from our functions by selecting what to output and the sequencing of the output. The default output is all loop and formula results sequenced in the order they are entered in the function. In function formula cell 'A2' 3554 the user has employed the 'SEQUENCE[Formula2,Formula1,Loop1]' 3555 override to change the output sequence. This sequence change is then reflected in step six 3579 of the automatically executed mechanics 3585 and shown in the output in cells A2 to C6 3558. This gives users the ability to tailor result outputs on both sequence and order dimensions, giving users further independence from the loops used to calculate the results.

Our technology also lets the user decide to not output all the values that were inputted (loop values) or generated (formula calculations) in the process of doing the loops and the calculations. So, in FIG. 35 the user could have omitted one of the formulas or the loop in the 'SEQUENCE[Formula2,Formula1,Loop1]' 3555, and it would have been omitted in what was populated in the spreadsheet cells. Thus, allowing users to very highly tailor the presentation of their repetitive loop calculated results, and not be limited by how those values were generated (i.e., in the loops and loop formula calculations).

Figure 36:
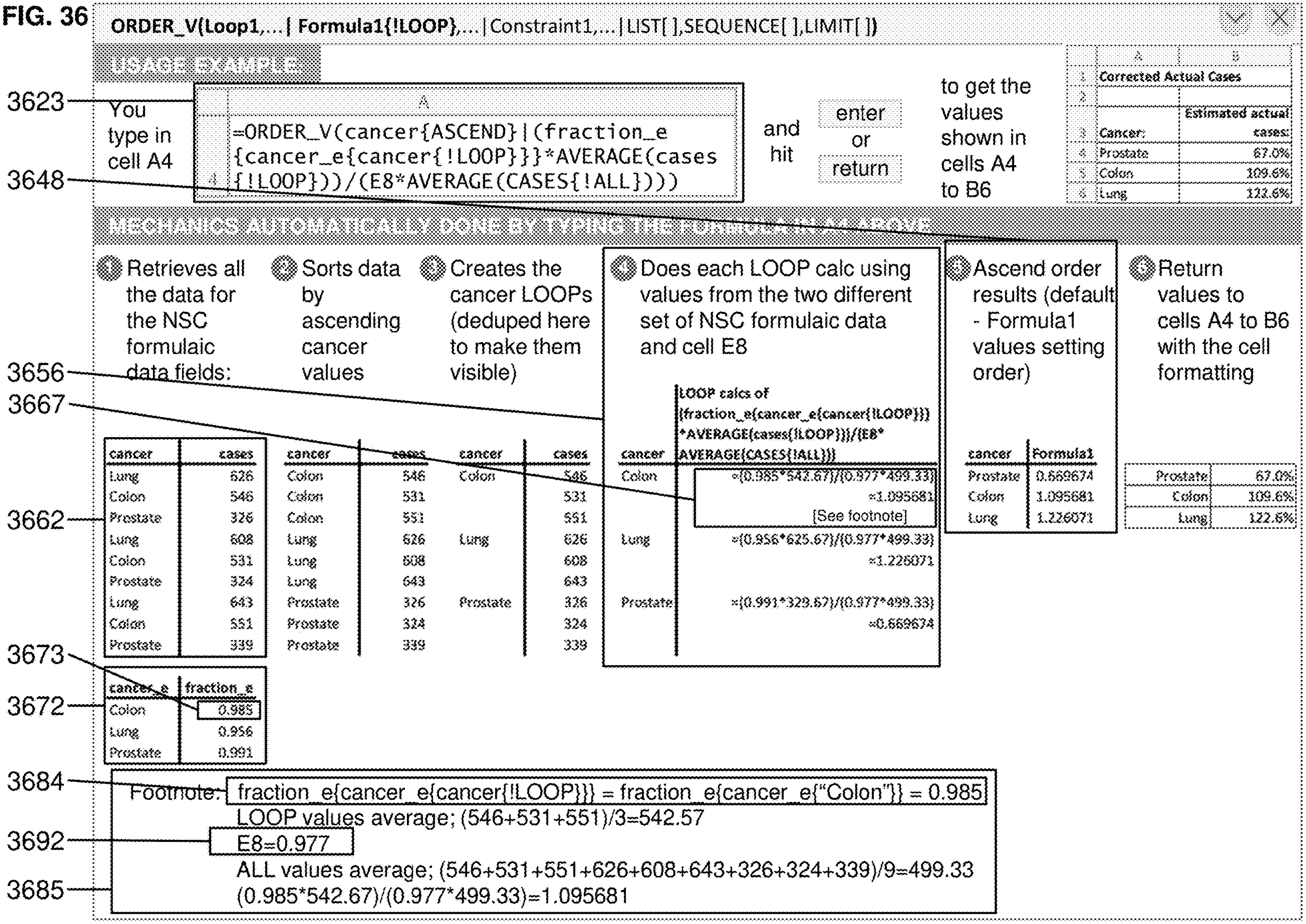
FIG. 36 examples reordering the output of a repetitive calculation which has joined data across two external data tables.

FIG. 36 examples reordering the output of a repetitive calculation which has joined data across two external data tables (using our NSC formulaic data fields). The cancer researcher is paralleling the work they did in FIG. 22, but this time wants to list the outcomes ordered by the outcome of Formula1. Like in FIG. 22 they are using data from two different NSC data sets, 3662 and 3672, as well as from a cell 'E8' that is not within the loop inputs yet used in the formula 3623. The data sets, 3662 and 3672, share cancer values in the two NSC formulaic data fields 'cancer' 3662 and 'cancer_e' 3672 so those values can be used to join data across the tables and in this example that will be done within the loops. That is exampled for the first loop calculation 3667 in step four 3656:

fraction_*e*{cancer_*e*{cancer{!LOOP}}}

Where the loop value of cancer from data in table 3662 is used to retrieve the fraction_e (i.e., fraction of reported cancer cases for each type of cancer that are actual cases) which resides in a different table of data 3672. How that works is exampled in the footnote 3685 first line 3684 where the 'Colon' from the loop is used via the formulaic data variable 'cancer_e' in the other table to look-up and get (join) the desired value of 'fraction_e' of '0.985' 3673. The rest of the calculations for the first loop of FORMULA1 are shown in that footnote 3685, including the use of cell value 'E8=0.977' 3692. In step five 3648 the mechanics differ from FIG. 22 as the results are ordered ascending on the calculated results for formula1. Returning the same values in a different order than in FIG. 22. Thus, adding the ability to order the multiple cell spreadsheet outputs by calculated values (not the loops that created them) to the ability to join data across tables in a single functional formula. To otherwise replicate these capabilities would require the ability to program in the spreadsheet embedded programming language, write fairly complicated programs and have direct external data access that conventional spreadsheets do not have. Our technology puts these advanced capabilities into the hands of regular users filling in a single formula with tremendous calculation and output flexibility.

Any Function any Algebraic Formula

Figure 37:
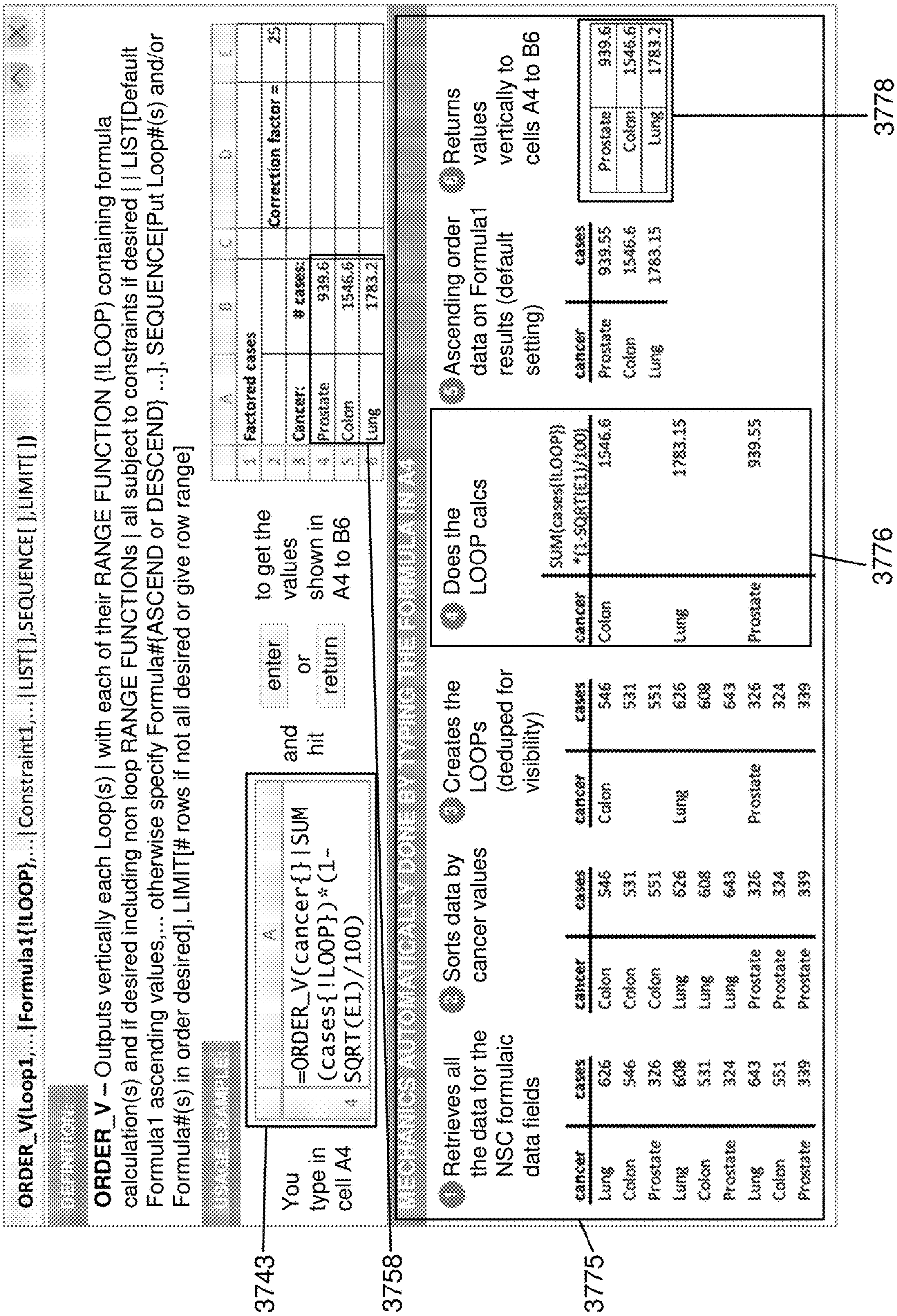
FIG. 37 examples the use of any function and any algebraic formula through the usage of a non-range evaluating function using a cell value and a multi-algebraic operator formula.

Our technology allows a user to incorporate virtually any function and any algebraic formula into a loop evaluated formula thereby substantially increasing the spectrum of repetitive problems our technology addresses. This is expanding well beyond the list of functions in FIG. 25 to allow use of virtually every analytical spreadsheet function, i.e., those evaluating numbers. FIG. 37 examples our loop equivalent function technology using a non-range evaluating function (SQRT), using a cell value (E1) and using multiple algebraic operators (*, – and /). The user has typed one of our ORDER_V functions into cell 'A4' 3743 containing a non-looped function 'SQRT' which is not a range or array evaluating function; demonstrating that our technology supports incorporation of a very broad range of analytical functions. The formula also includes the multiplication, subtraction and division algebraic operators exampling that any of the full set of operators can be used. The formula also uses a cell reference 'E1' exampling that cell references can be used just like in regular cell formulas but in this case also in repetitive calculations (loops). These calculations are then automatically executed, as exampled in 3775 to generate the result 3778 which is then populated in cells A4 to B6 3758. Each looped calculation 3776 has used the multiple algebraic operators, cell reference and non-range or array function (in this example SQRT).

Multilevel Loops

Some problems require multilevel loops for distinct or unique values of multiple data fields. Such as those where a user wants to see a result and then see further analyses relating to that result. This requires an embodiment of our technology that allows multilevel sequences of the loops and the formulas for calculations. The user difference relative to our previous embodiments is a syntax that allows comingling of loops and formulas. The huge outcome difference for the user is that they can effectively build a Pivot Table within a Pivot Table, something that cannot be done in conventional spreadsheet Pivot tables.

Figure 38:
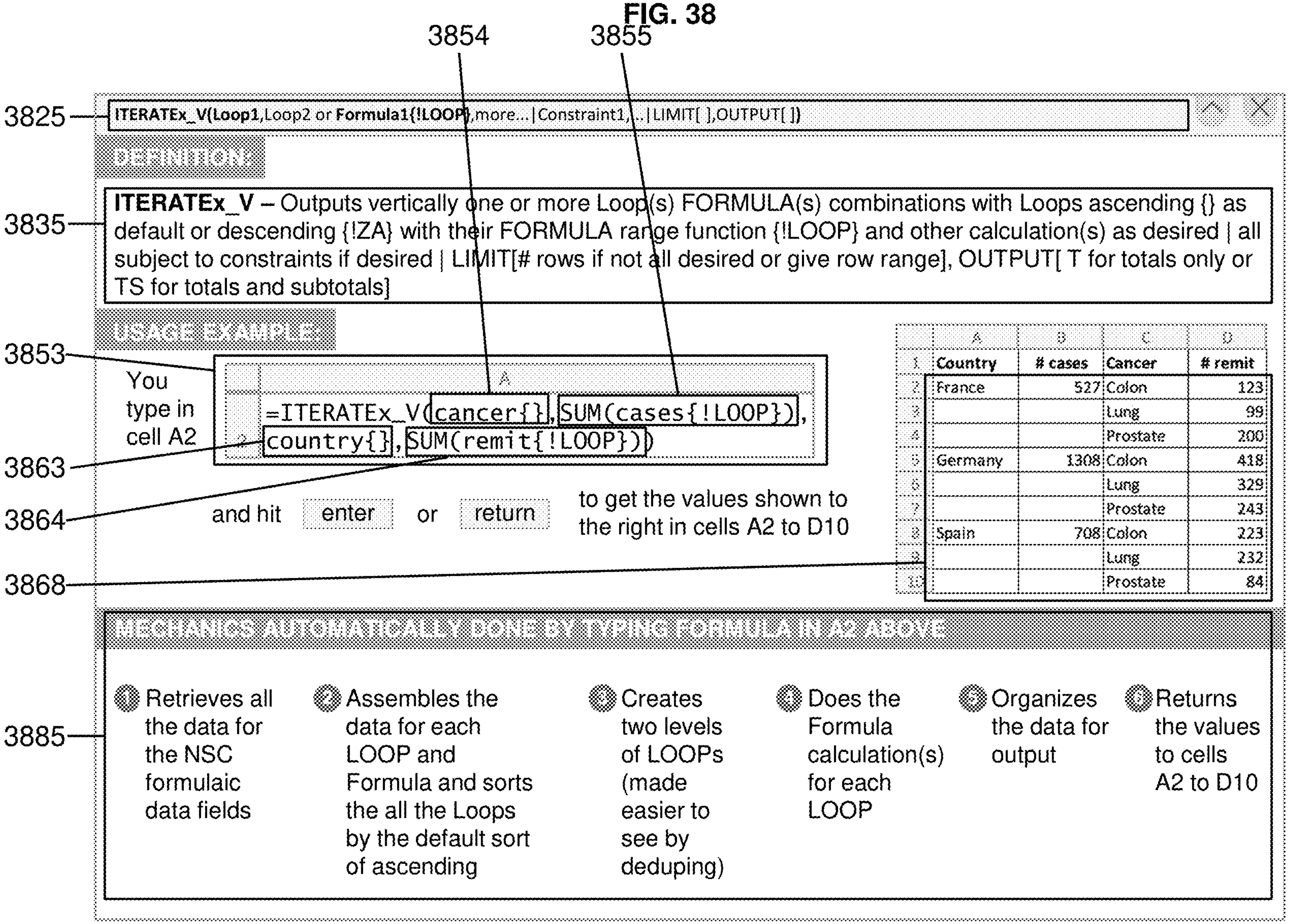
Figure 40:
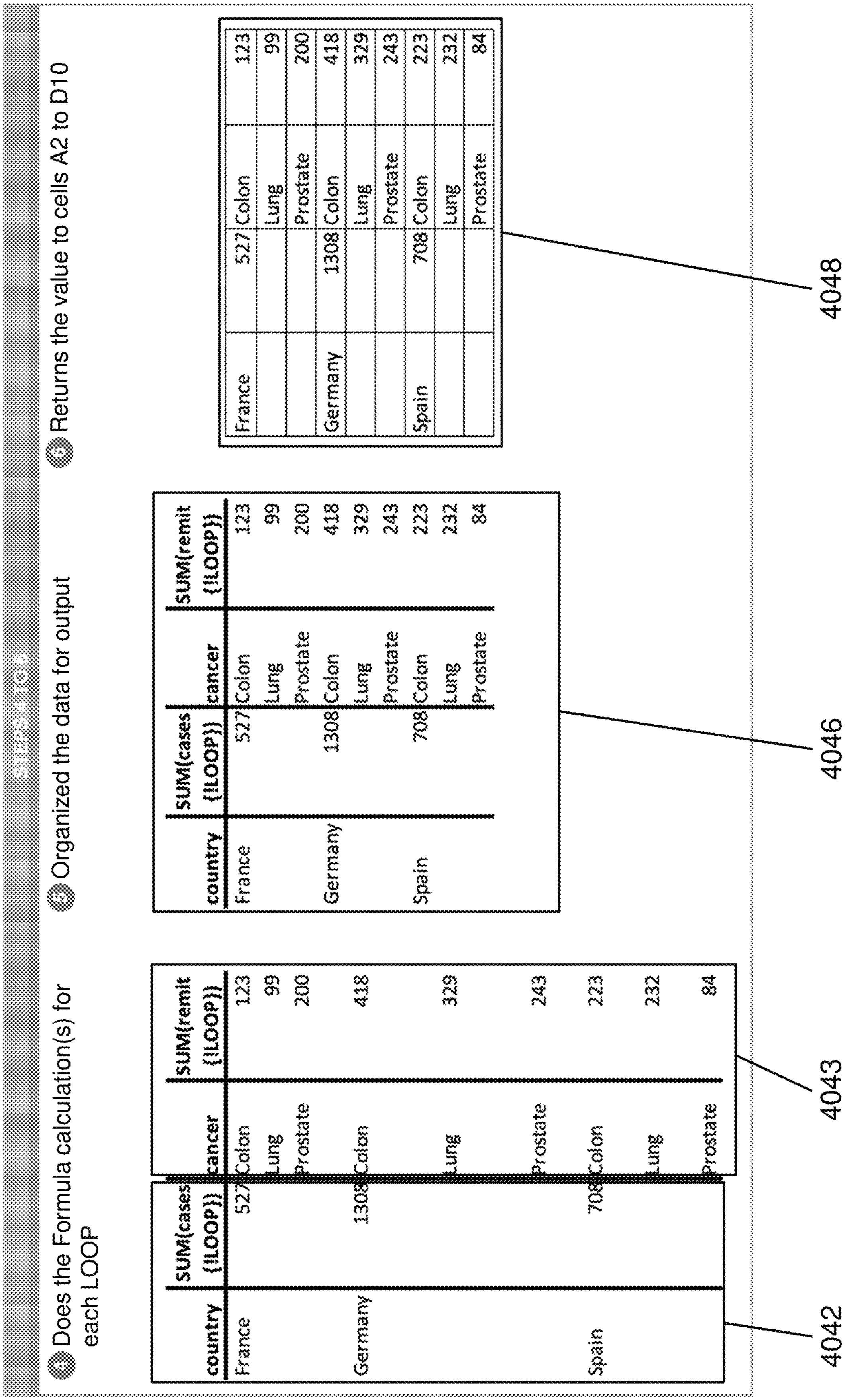

FIG. 38 through FIG. 40 example a two-level loop using our NSC formulaic data. The function syntax 3825 conveys to a user that once they put a loop 'Loop1' they then can put an 'Loop2' or a 'Formula1' and then continue on as the description 3835 states with more loop(s) and FORMULA(s) combinations. This is exampled in the formula written in cell 'A2' 3853 which starts with a 'cancer{ }' loop 3854 then a formula 'SUM (cases{!LOOP})' 3855 then another loop 'country{ }' 3863 followed by a formula 'SUM(remit{!LOOP})' 3864. Triggering the automatic evaluation of the six steps in 3885 to arrive at the values populated in A2 to D10 3868.

FIG. 39 examples the construction of the two levels of loops 3947 and 3948 in step three. FIG. 40 shows the two different sets of loop (equivalent) calculations 4042 and 4043 in step four. The values are then organized and returned to the cells A2 to D10 3868 by steps five 4046 and six 4048 respectively. The user has very easily created a two-level analysis in this situation breaking out the number of cancer cases by country and then for each country the number of remits by cancer type. However, the real power of this is users can do different analyses at the different levels of loops creating a set of analytics unlike anything that can be accomplished in an existing Pivot Table. Creating the equivalent of a complicated Pivot Table within a Pivot Table—something no conventional spreadsheet Pivot table can do. Creating in a single functional formula multi-level looped calculations that can analyze large data sets and output many different spreadsheet cell results.

Figure 41:
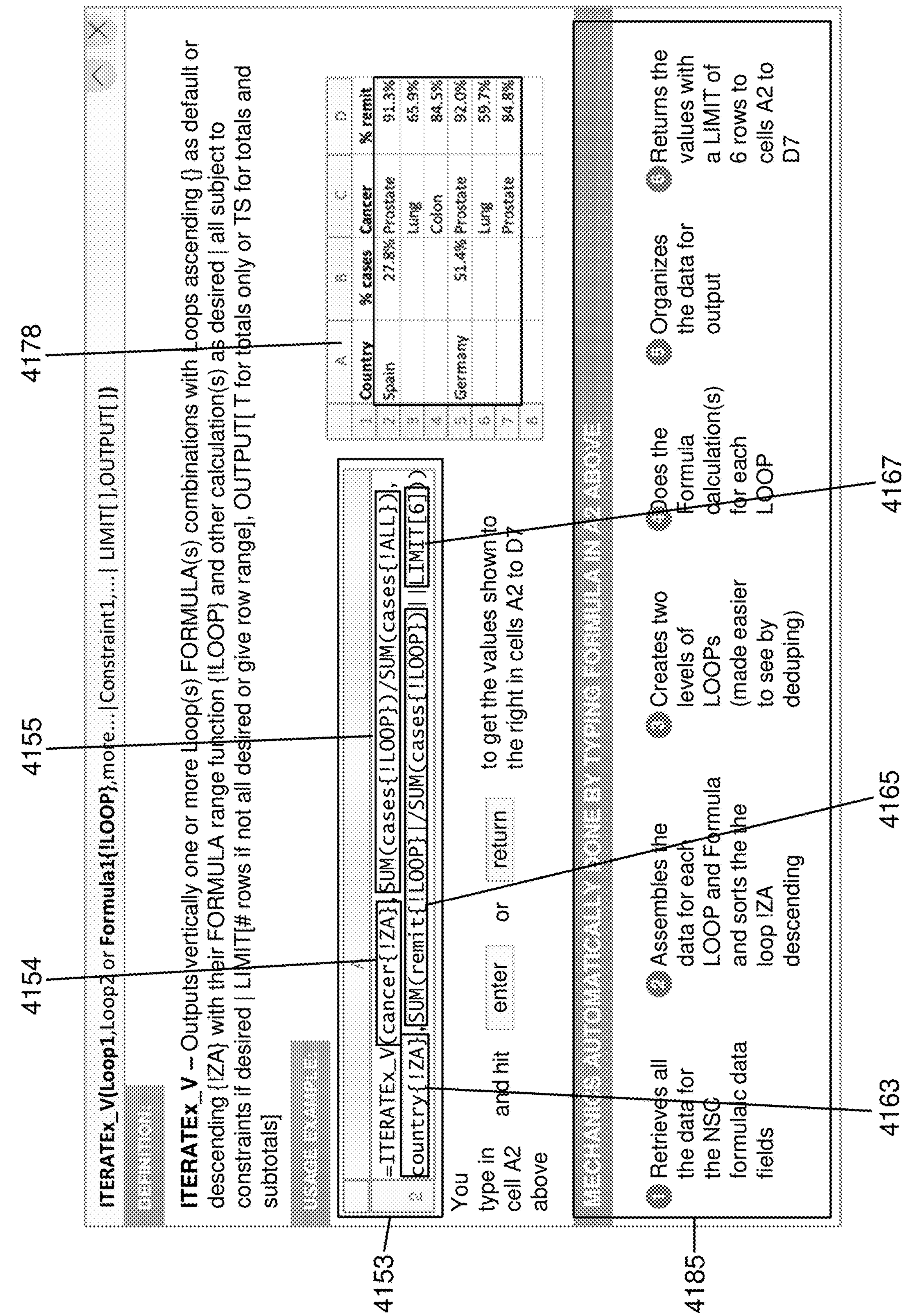

FIG. 41 through FIG. 43 examples a two-level loop using our NSC formulaic data doing multi-function calculations in the two different loops and limiting the output to six rows. The formula written in cell 'A2' 4153 starts with a loop 'cancer{!ZA}' 4154 sorted descending then a formula 'SUM (cases{!LOOP})/SUM cases{!ALL})' 4155 then another loop 'country{!ZA}' 4163 also sorted descending followed by a formula 'SUM(remit{!LOOP})/SUM(cases{!LOOP})' 4165. Both formulas are multi-function and do very different calculations with formula1 doing a percentage calculation across the country loops and formula2 doing calculations specific to each country and cancer combination. Hitting enter (or return) then triggers the automatic evaluation of the six steps in 4185 to arrive at the values populated in A2 to D7 4178 which have been limited to six rows by the term 'LIMIT[6]' 4167.

FIG. 42 examples in step two the sorting of the data in the two loops 4244 and 4246 to be descending for each of the loop values, 'country' and 'cancer'. Step three then automatically constructs the two loops 4247 and 4248. FIG. 43 shows the two different sets of loop calculations 4342 and 4343 in step four. The first 4342 calculates the percentage of cases for each country relative to the total while the second calculation 4343 does a very different calculation of the percentage remits for each country cancer combination relative to the number of cancer cases for each country cancer combination. The values are then organized and returned to the cells A2 to D7 4178 by steps five 4346 and six 4348 respectively, with step six limiting the returned values to six rows. Thus, exampling the further flexibility of our technology to create complicated equivalents of Pivot tables within Pivot tables from a single function formula.

Multilevel Ordering

Our multilevel loop technology also supports automatic reordering of the results in whatever manner the user desires as some multilevel repetitive calculations (loop equivalents) want very different output ordering. This technology creates a composite sort key with selectable ordering by field, all written in a formula in a spreadsheet cell.

Figure 44:
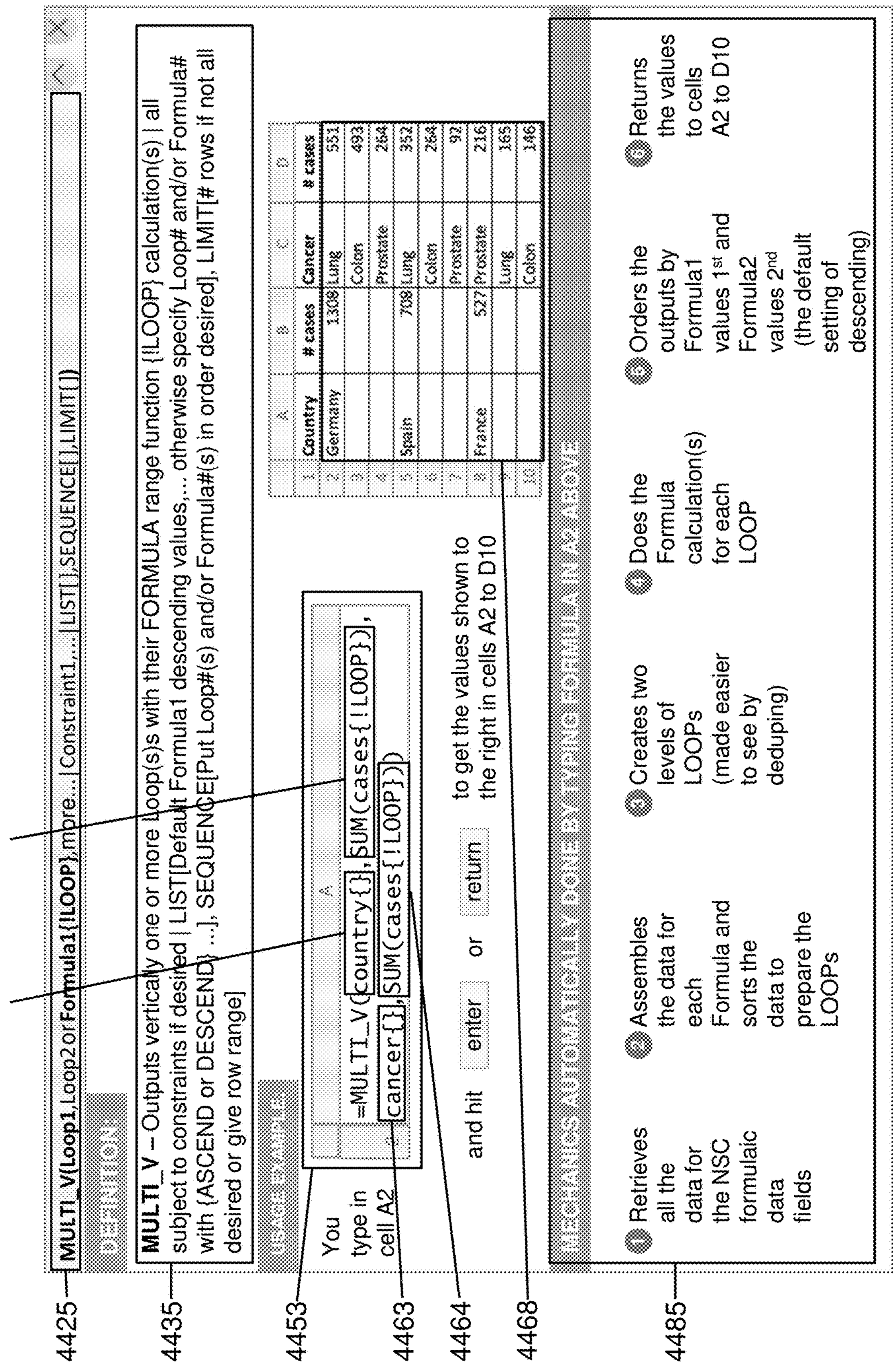
Figure 46:
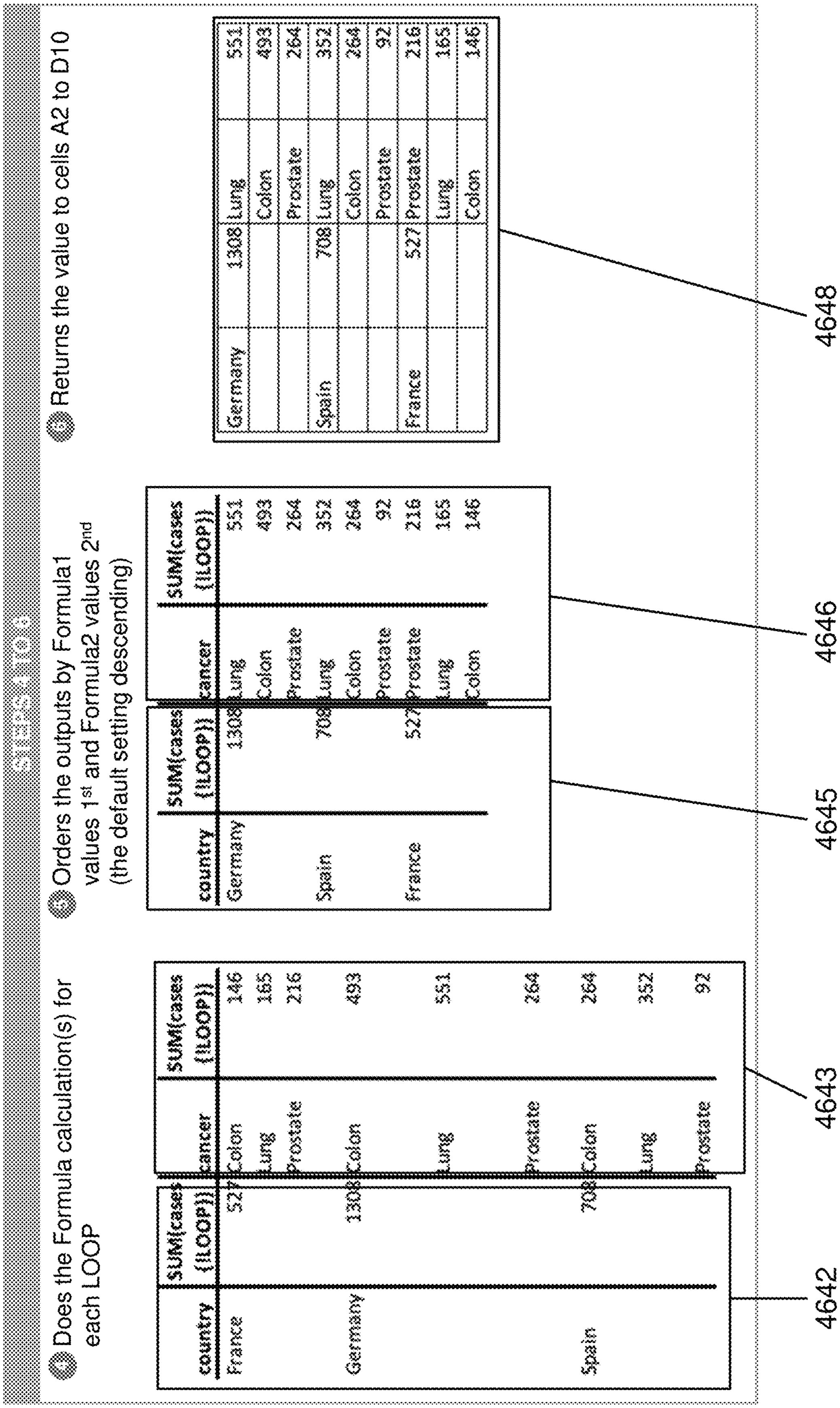

FIG. 44 through FIG. 46 example a two-level loop ordered function where the difference relative to the previous Order embodiments is a syntax and technology that allows comingling of loops and formulas. The function syntax 4425 conveys to a user that once they put a loop 'Loop1' they then can put an 'Loop2' or a 'Formula1' and then continue on as the description 4435 states with more loops and formulas. The example formula in cell 'A2' 4453 does a very simple example with a Loop1 of 'cancer{ }' 4454 followed by a calculation of Formula1 'SUM (cases{!LOOP}' 4455 then followed by the second level Loop2 of 'country{ }' 4463 and the calculation of Formula2 which is 'SUM(cases{!LOOP})' 4464. This 'MULTI_V' named function formula then automatically executes the six steps 4485 to return the values to the cells A2 to D10 4468. This has created the equivalent of a Pivot Table within a Pivot Table with even greater ordering capabilities than would be possible if you could embed a Pivot Tables within Pivot Tables in a conventional spreadsheet—which of course you cannot do.

FIG. 45 in step three shows the setup of the two levels of looped calculations. The first level 4547 sets up the calculations for the three country{ } loops, while the second level loops sets up the nine-combination country{ } and cancer{ } loops 4548. Step four in FIG. 46 shows the three calculations for the first level loops 4642 and the nine calculations for the second level loops 4643. In the second level loops the calculations have been limited to the respective values for both the NSC formulaic data fields country{ } and cancer{ }. In this example the user elected to use the default ordering of the results, which for this embodiment is descending first for Formula1 values and then descending for Formula2 values. They also elected to use the default sequencing of the results, which is in the order of the terms entered into the function—so in this example Loop1 4454 then Formula1 4455 then Loop2 4463 and finally Formula2 4464. As you can see in the results of the loop calculations, even though the formula for Formula1 and Formula2 was the same, the difference in looped data sets for each calculation resulted in different values as shown in steps five 4645 and 4646. The reordering of the results from Formula1 descending moved Germany to first, Spain to second and France to last as shown in step 5 4645, effectively moving entire sections of the subsequent loop with them. Then the descending ordering of Formula2 ordered the 'cancer' and 'SUM(cases{!LOOP})' subsequent loop values within each country as shown in step 5 4646. This allows users to create multiple levels of analyses from a single functional formula using our technology.

As with our previous embodiments of the technology, the user could have specified very different formulas for each Formula #input using loop values, non-looped values, table joined values, constant values and cells values. We will not replicate exampling all those different variants as well as the different LIST, SEQUENCE and LIMIT options which can work in these functions with the breadth of capabilities previously exampled. We also will not replicate exampling the use of in-cell data rather than NSC formulaic data fields, because as we have exampled before the syntax and operations of our new functions can be the same other than the actual data identifiers used to access the data. We will example mixing and matching more loops and calculations as well as different types of calculations which allows relatively unsophisticated users to do very sophisticated analyses.

Figure 47:
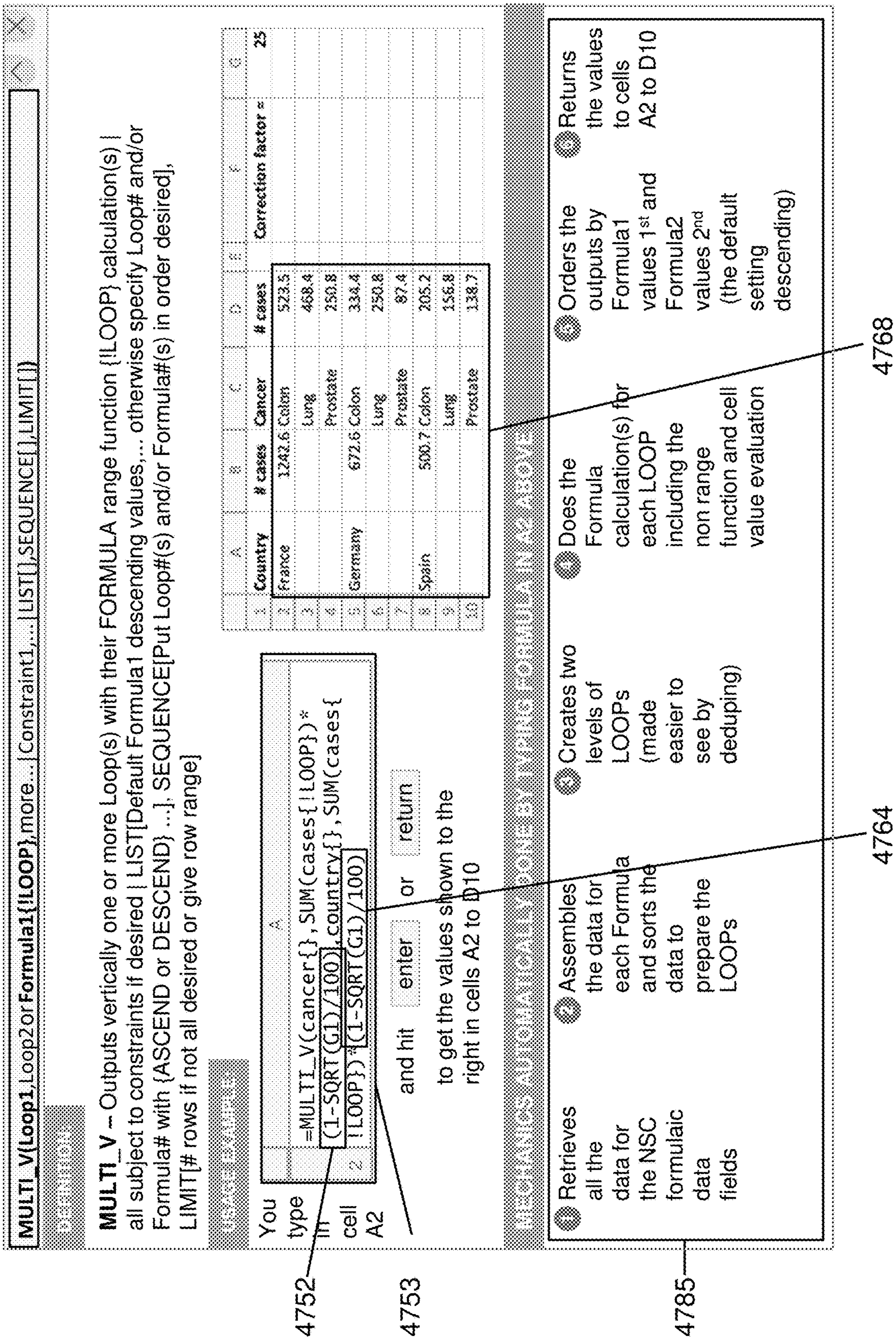
Figure 50:
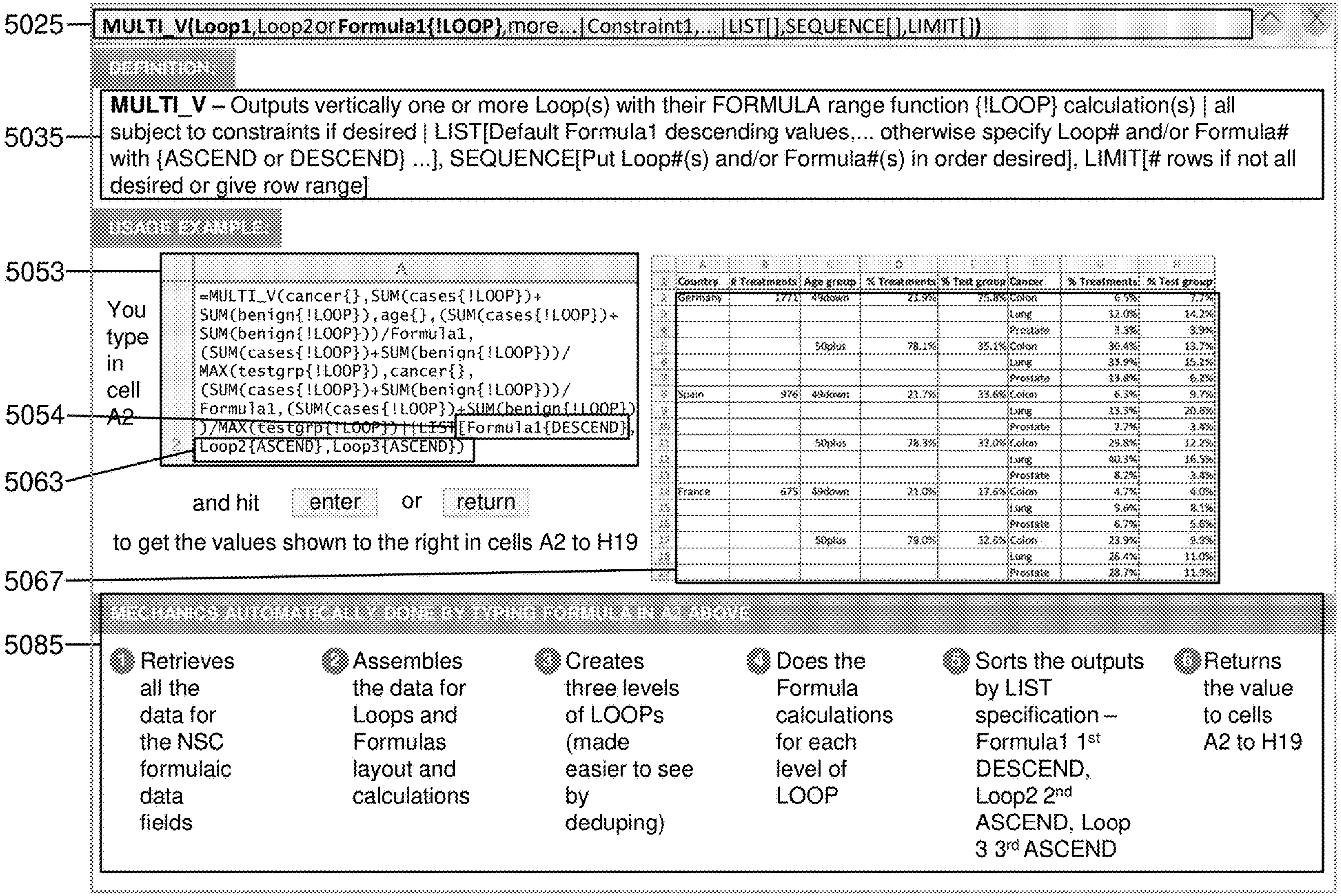

FIG. 47 through FIG. 49 examples multilevel ordering supporting any function and all algebraic operations. The 'MULTI_V' formula written by the user in cell 'A2' 4753 contains two terms 4752 and 4764 that include cell references (e.g., G1), non-range functions (e.g., SQRT), constant value inputs (e.g., 1 and 100) and multiple algebraic operators (*, –and/) as previously discussed representing much broader formula capabilities. These are automatically executed by 4785 to deliver the output in cell A2 to D10 4768. FIG. 48 through FIG. 49 example the detail of the six automatically executed steps 4785.

FIG. 50 through FIG. 53 example a three-level loop usage of the ordered function where two of the loop levels do two different calculations and the order of what is outputted to cells is determined by a sequence of both formula and loop values. The MULTI function syntax 5025 and definition 5035 has not changed (i.e., since its introduction in FIG. 44) although the user has now created a substantially more complicated formula in cell 'A2' 5053. This MULTI_V function, which is now holding five calculation FORMULA #inputs and three Loop #inputs, would likely require for many users another technology filing of ours which facilitates users easily constructing complicated formulas a piece at a time. Because unlike a spreadsheet Pivot Table capability, this technology now allows the user to build many complicated formulas, with combinations of functions, data from different data sets and cell inputs and allows users to effectively build multiple Pivot tables within Pivot tables with the multilevel capabilities. Comparable this new technology to setting up three Pivot tables within each other, each having one or more formulas more complicated than can be done in an existing spreadsheet Pivot table, with a reordering of the output capability which cannot be done in an existing Pivot table and where that reordering works across the different Pivot tables and reorders subsections of the subsequent Pivot tables. Our technology is easier to use.

The automatically executed mechanics 5085 done by the formula in cell 'A2' 5053 is executing the same six steps, however handling substantially more data and doing many more calculations in many of those steps. For example, step three in FIG. 52 creates three levels of loops (5262, 5263 and 5264) with the equivalent of many more data sets. Step four 5257 does many calculations at each of the three levels of the loop and step five 5353 (in FIG. 53) does the reordering of the results first based on the values of the FormulaX input 'Formula1{DESCEND}' 5054 input and then based on the values of two LoopX inputs 'Loop2{ASCEND}, Loop3{ASCEND}' 5063. Please note the illustration of what the app is doing in FIG. 51 through FIG. 53 is done to more visually show what is occurring and not a representation of how those calculations are actually done by our application.

Figure 54:
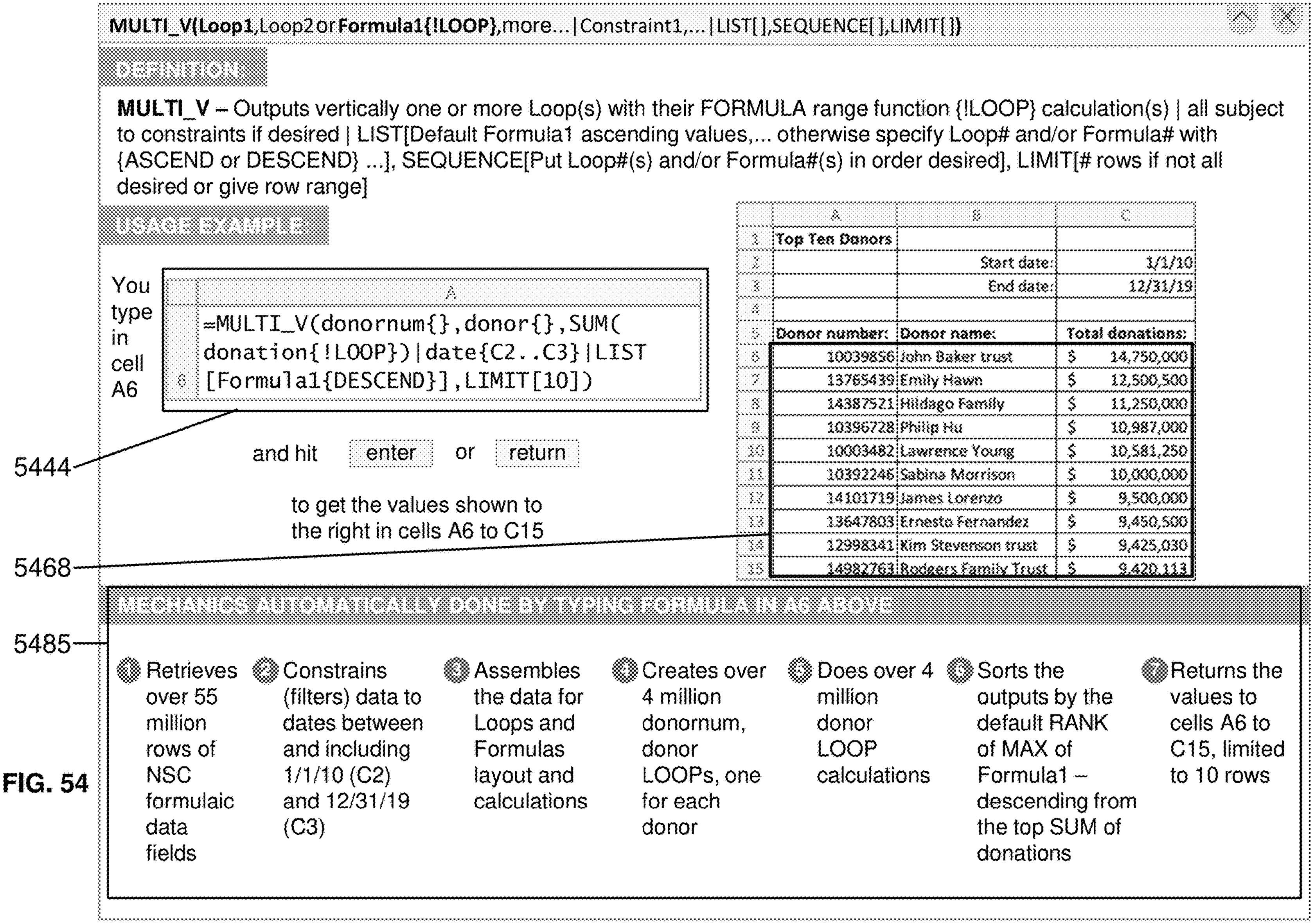
Figure 56:
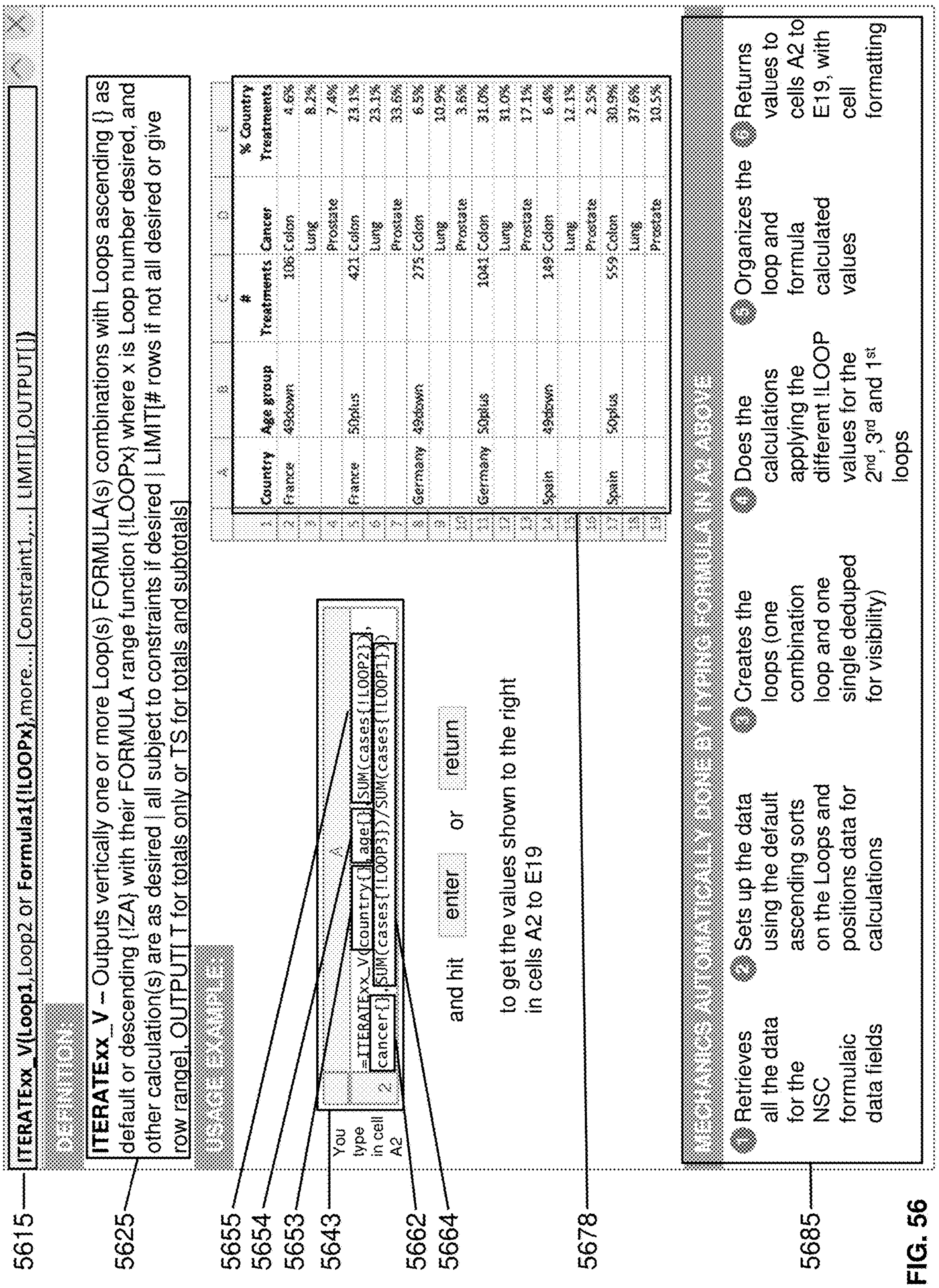

FIG. 54 examples the scale easily achievable in our technology and the ease with which users can change calculations. A charity spreadsheet user has a little over 10 years of donation data with over fifty-five million rows of donations representing over four million donors. They would like to know for different time periods, starting over the last ten years, who were their top ten donors and how much did they donate. This is beyond the scale where a user can easily have the data downloaded to their conventional spreadsheet, given the row limitations of Microsoft Excel at 1,048,576 rows, which is substantially larger than Google Sheets, Apple Numbers and the other spreadsheets. In Excel, it can be downloaded putting the data in over fifty-four columns, but that will not be easily usable by any user not having VBA programming skills. However, using our NSC formulaic data fields it is easy to use the data as exampled in FIG. 54. The user writes a fairly simple MULTI_V formula in cell 'A6' 5444 with a constraint (filter) of a date range coming from cells 'C2' and 'C3'. The automatically done mechanics 5485 execute to give the outcome in cells A6 to C15 5468. Once the user has looked at the results, they can do their next analysis, of the top ten over the last five years, by simply changing the value in cell 'C2' 5524 in FIG. 55A from '1/1/10' to the value '1/1/15' 5528 in FIG. 55B which automatically changes the values in cells A6 to C15 from 5553 to 5557 to reflect the different date range without need to do anything to the formula generating those results. With one fairly simple function formula a user of our technology can do a set of calculations not doable in an existing spreadsheet Pivot table. They can change the date by simply changing a cell value and never touching the formula. They can add further constraints, e.g., such as limiting the geography or some other dimension by simply adding one additional argument (constraint/filter) to the formula. Putting the power of advanced computing and large-scale data analysis into the hands of low skilled spreadsheet users.

Figure 64:
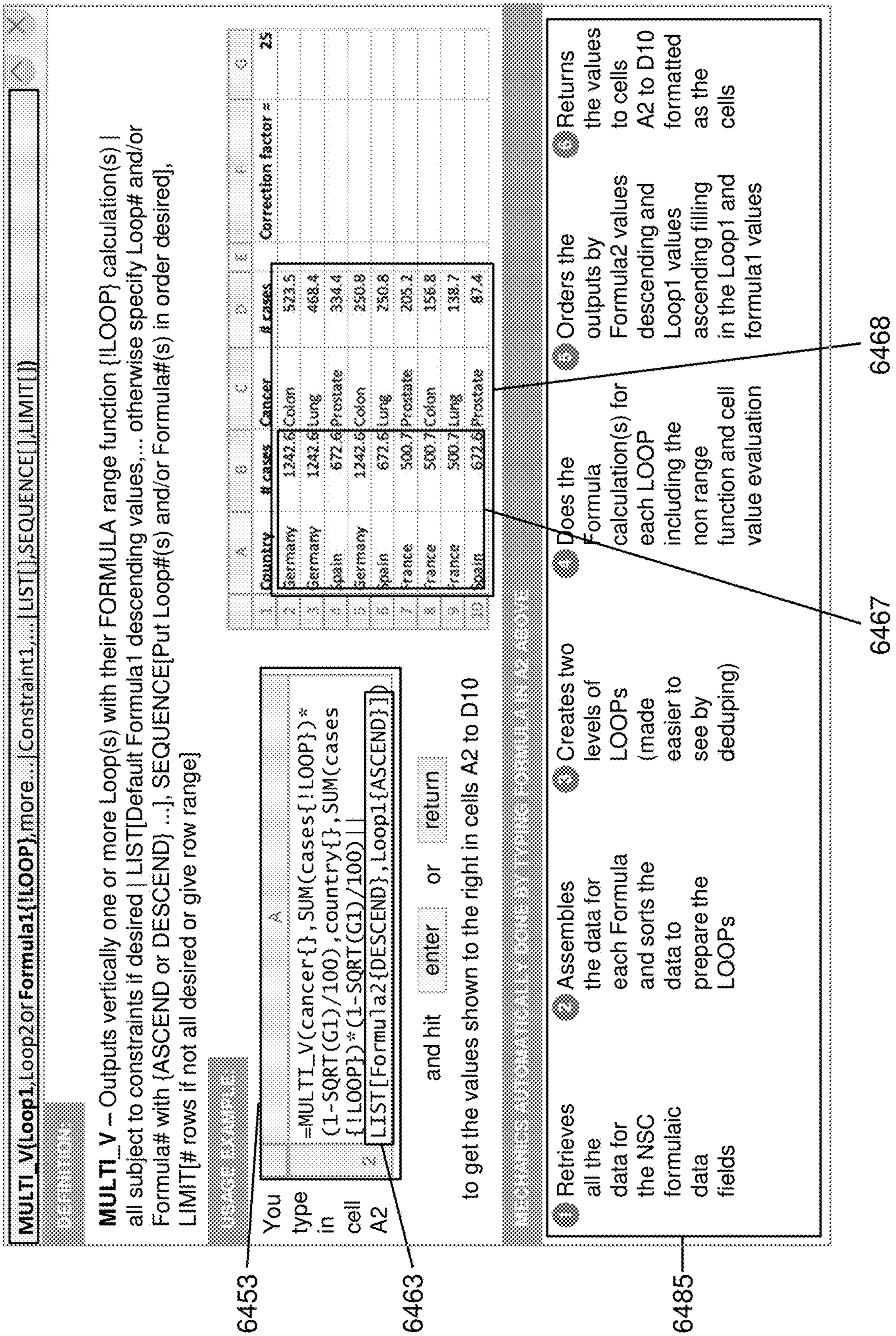
Figure 66:
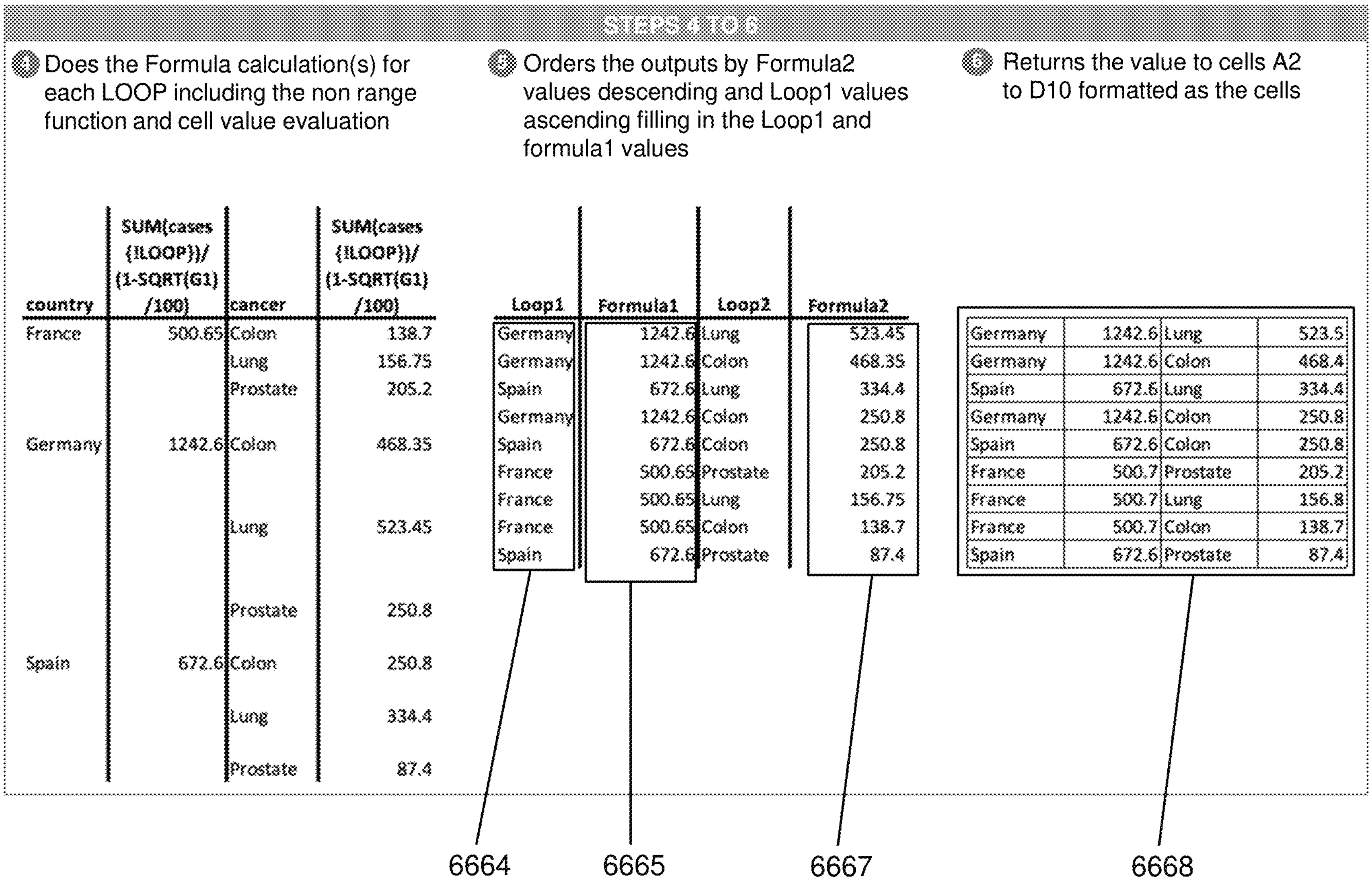

In situations where the ordering of the results cuts across the multiple loop levels then an added presentational option is automatically triggered in our technology. FIG. 64 through FIG. 66 shows this for a two-level loop example. In this embodiment the ordering cutting across the two loop levels is done by the user typing 'LIST [Formula2{DESCEND},Loop1{ASCEND}] 6463 in the formula 6453 in cell 'A2'. Formula2 is in the second loop and is now being specified before ordering of the first level loop. That can break the integrity of the first level loops and therefore our technology visually replicates the first level loop values (both Loop values and Formula values) so that each loop level value is shown across all loops as shown in the result 6468 where every cell in the first loop 6467 shows a value. The six steps in the automatically done mechanics 6485 do the visual changes. Steps one through four are done as previously exampled and the difference is in step five in FIG. 66 where the Loop1 values are replicated for each row 6664 as are the Formula1 values 6665. The values are then ordered by descending value of Formula2 6667 and then by ascending value of Loop1 6664 (which is not really invoked here because no two values of Formula2 are the same). Those values are then formatted and returned by step six 6668 to cells A2 to D10 6468 (in FIG. 64).

Some users may want to have all the values shown for all the loop levels even when the loop integrity is not disrupted by the ordering (LIST in this embodiment) or partial presentation of the information (SEQUENCE in this embodiment). So, this capability can be set up as an option available at user discretion. Another of the many combinations of outcomes and many different ways to present them within our technology.

Our different versions of loop and multilevel loop functions give users the opportunity to create one-dimensional Pivot Tables through a single formula and then go well beyond that to reorder the loop to answer questions which require substantial additional work in conventional spreadsheets. And conventional spreadsheets require even more work for post creation changes, such as the date range change in FIG. 55A and FIG. 55B. Our technology also supports multilevel loops which are the equivalent of multiple Pivot Tables within another Pivot Table—which is impossible to do in an existing spreadsheet. Beyond that, the ability to reorder the results to answer question in ways that are not possible in Pivot Tables without manual overrides and a considerable amount of additional work becomes possible. Additionally, the ability to re-sequence, limit and selectively omit the output of your loops and calculations is present. However, there is one additional capability that opens up even further flexibility to do any set of looped calculations, namely being able to select for a calculation done in a loop, any loop value in the related level of loops for the calculation.

Selectable Loop Calculations

FIG. 56 through FIG. 59 examples our technology supporting formulas using any preceding loop value. This does not confine users to the loop the formula sits within but allows users to select values from any preceding loop. Those loops could be the combination loops or simple multilevel loops exampled previously or as in this example a multilevel loop with one level of a combination loop and a second level of a single loop. For purposes of this embodiment, we have named this function 'ITERATExx' as shown in the syntax 5615 and indicated to the Loop selection capability by the x added to the 'Formula1{!LOOPx}'. The definition 5625 explains 'where the x is Loop number desired'. In this example the user wrote in cell 'A2' 5643 a formula where 'country{ }' 5653 is Loop1, 'age{ }' 5654 is Loop2 and 'cancer{ }' 5662 is Loop3. In each formula the user selects what loop they want to use and then as previously described could add any other functional or algebraic calculations. In this example we are keeping the formulas simple—Formula1 'SUMcases{!LOOP2})' 5655 is using the Loop2 values while Formula2 SUMcases{!LOOP3})/SUMcases{!LOOP1})' 5664 is using Loop3 values for the first term and the much larger set of Loop1 values for the second term. The six steps S685 are then automatically executed to return the values to cells A2 to E19 5678.

Figure 58:
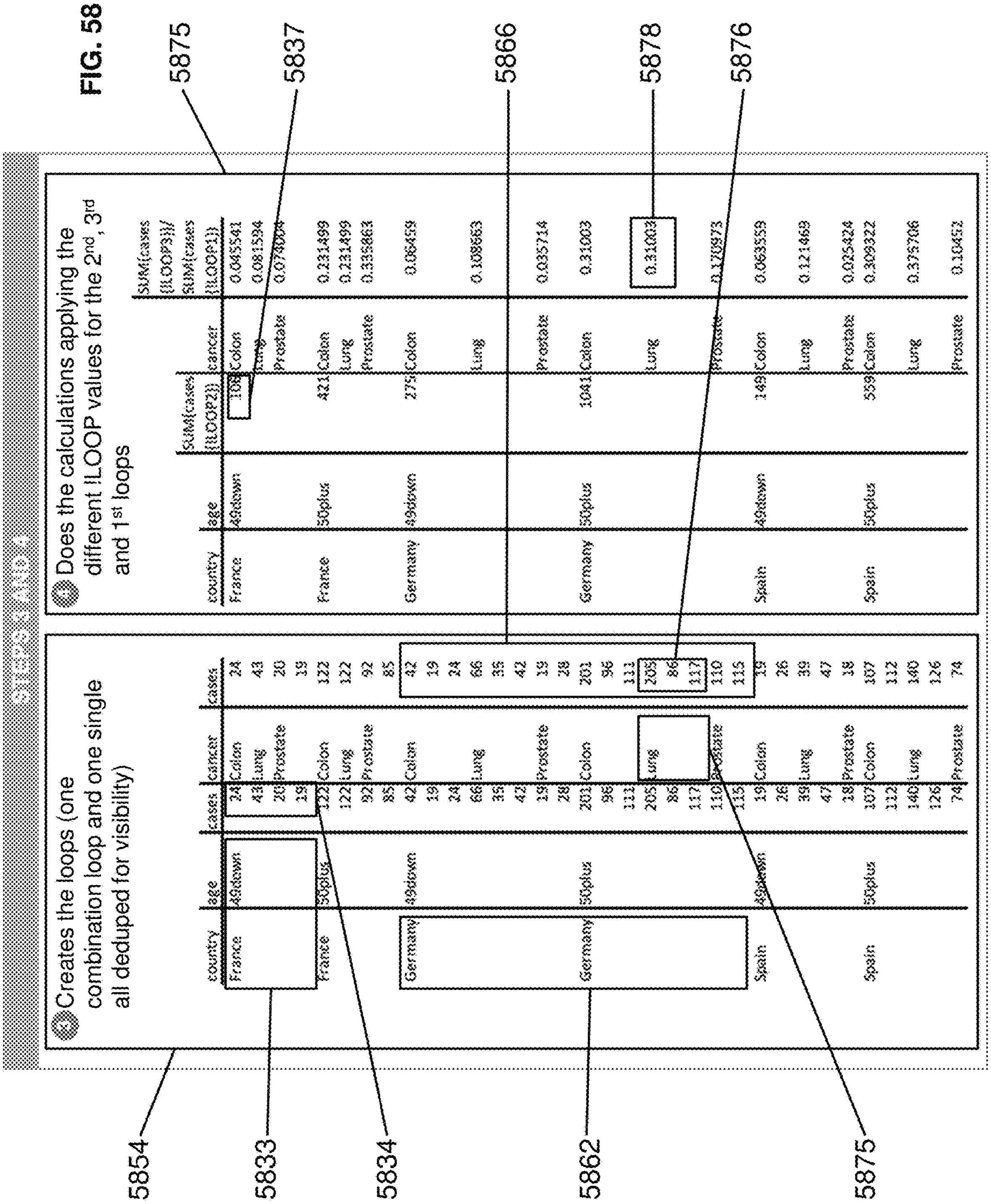
Figure 60:
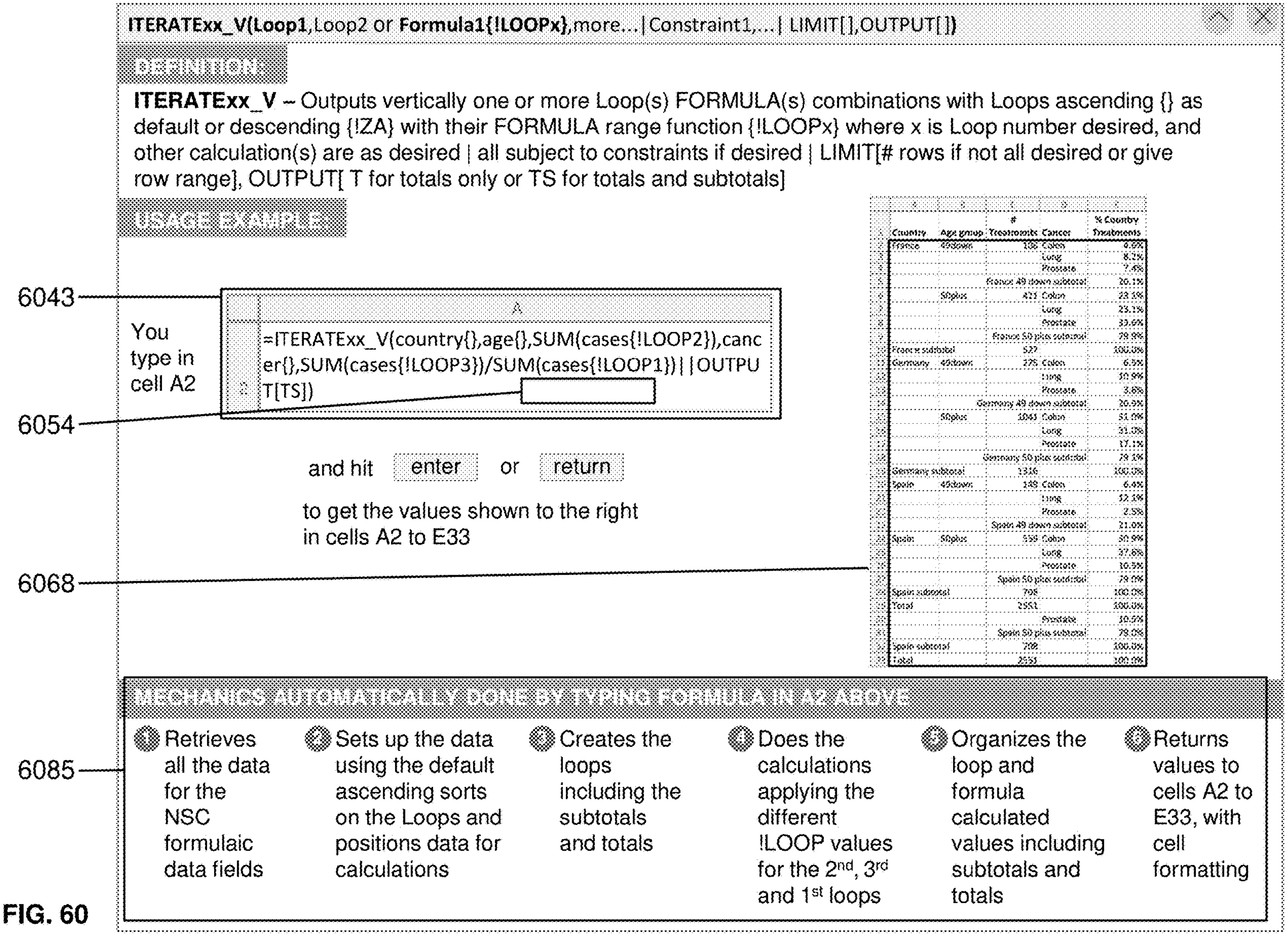

FIG. 57 through FIG. 58 example the detailed steps automatically executed. Steps one 5754 and two 5757 retrieve the data and setup up/sorts the data for the loops and formulas. Step three 5854 creates the loop equivalents while step four 5875 does each of the calculations. We will walk through the calculation of the Formula1 value example '106' 5837 for the combination of Loop1 (country 'France') and Loop2 (age '49down') 5833. It is the SUM of the cases 5834 which arrives at the value '106' 5837. In the Formula2 calculation exampled '0.31003' 5878 the first calculation is the 'SUM(cases{!LOOP3})' which is for the 'Germany' '50plus' 'Lung' combination 5875 for the values 5876. The second part of the formula 'SUM(cases{!LOOP1})' uses the Loop1 value 'Germany' 5862 which means the corresponding values 5866 are summed. Then the two parts of the formula are divided to arrive at the value '0.31003' 5878. Thus, utilizing the SUM of the small number of values from Loop3 (5876) with the much greater SUM of the number of values for Loop1 (5866). All of these calculated values are then organized in step five 5943 and returned to cells A2 to E19 5678 by step six 5947. Thus, our technology has supported users doing calculations across different loop equivalents, substantially expanding the types of looped repetitive calculations they can therefore do.

FIG. 60 through FIG. 63 examples our technology supporting formulas using any preceding loop value including Total and subtotal calculations. The user is replicating the calculations done in FIG. 56 through FIG. 59 with the only change of adding the term 'OUTPUT[TS]' 6054 in formula they wrote in cell 'A2' 6043. That alters the six automatically done steps 6085 (shown in detail in FIG. 61 and FIG. 62) to include inserting and then calculating the values for the total and subtotals to arrive at the values shown in A2 to E23 6068.

Our selectable loop calculations technology is applicable to the varied set of our capability combinations discussed therein. It brings a very powerful ability to do very tailored loop equivalent calculations to users who therefore will not need to learn a programming language and write code to address sophisticated repetitive calculations. Totals have pretty broad applicability and will come in configurations where they are at the bottom or top (right or left of horizontal variants) based on user desires. Subtotals are more limited to those settings where different forms of ordering limiting or sequencing the results have not disrupted their groupings. Using our family of predefined formula spreadsheet functions users will be able to create programming loop equivalents in their regular spreadsheet cells employing familiar range functions within our new functions with the help of the function syntax and help guides for the function use.

Repetitive Multicell Calculations

Figure 67:
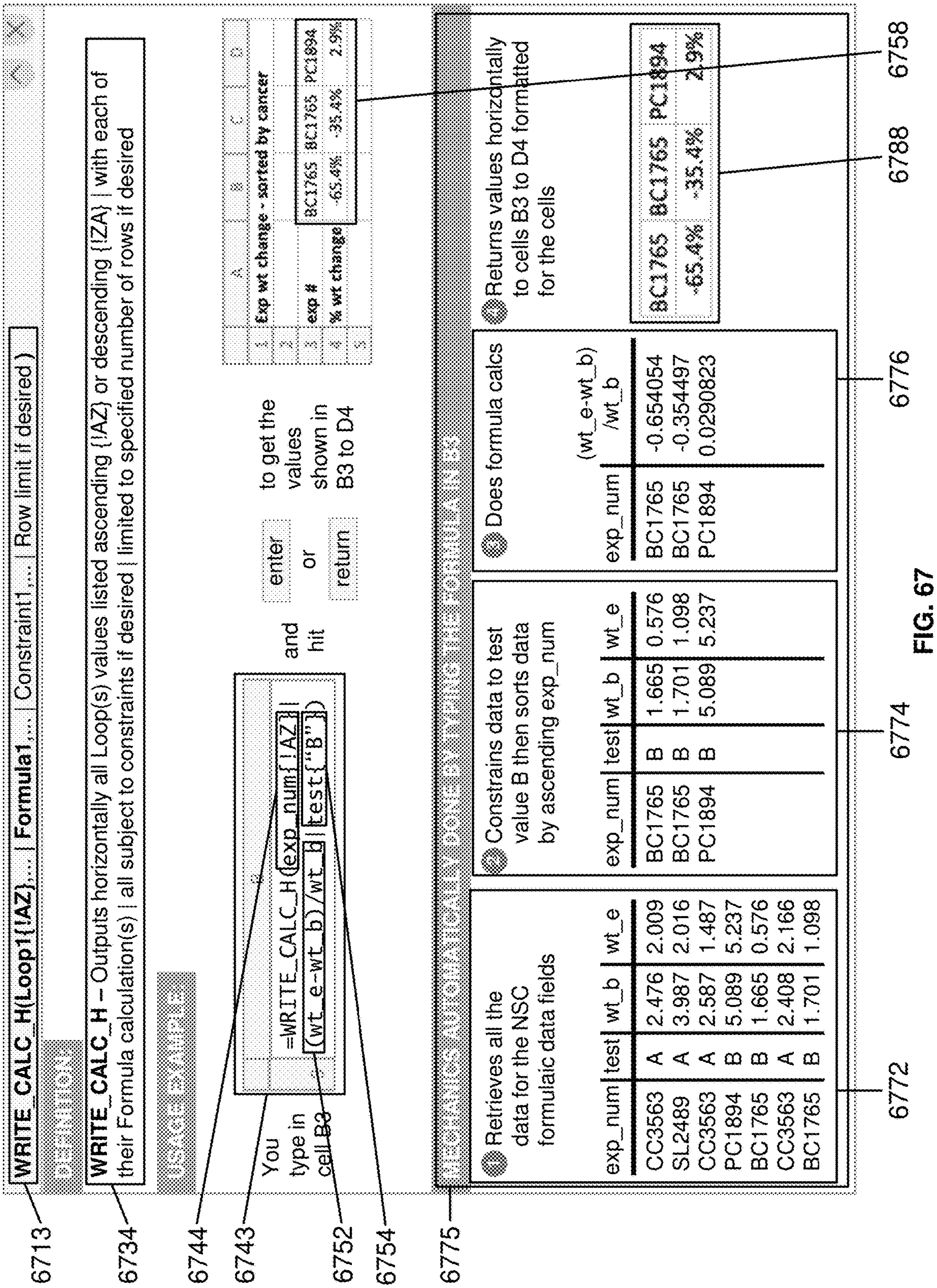
FIG. 67 examples our technology supporting a cell function which outputs repetitive calculations to multiple cells (WRITE_CALC_H).

The prior repetitive calculations involved loop evaluations utilizing a range or array function evaluation of the loop values. There are also situations where repetitive calculations are valuable for each loop repetition. FIG. 67 examples an embodiment of our technology outputting more than one cell calculated value from a single functional cell formula. It is exampled with a very small data set but is applicable to much larger data sets with many more outputs.

The new function, in this embodiment named 'WRITE_CALC_H', has syntax 6713 where the required inputs are bolded for ease of use. The definition 6734 helps explain to the user how to fill in the function syntax. In this example the user has written the formula in cell 'B3' 6743 with our Non-Spreadsheet Cell (NSC) formulaic data. They have inputted the minimum requirement of one loop input 'exp_num{!AZ}' 6744 and one formula input '(wt_e−wt_b)/wt_b' 6752 and added one constraint 'test{"B"}' 6754. Upon hitting enter (or return on a Mac) our technology automatically executes the four steps 6775 to deliver the values to cells B3 to D4 6758 where the outputs have been listed horizontally in order of ascending values of Loop1 'exp_num{!AZ}' 6744).

The automatically done steps 6775 start with step one 6772 retrieving the NSC formulaic data and in step two 6774 constraining the data to test values of B (test{"B"} 6754) and then sorts the remaining values ascending for exp_num ('exp_num{!AZ}' 6744). Step three 6776 does the formula calculations, i.e., '(wt_e−wt_b)/wt_b' 6752, for each of the remaining repetitions, producing repetition results. The final step, step four 6788, then formats the results for the cells and populates the values horizontally starting in cell B3 and ending in cell D4 6758. In this situation our technology has allowed a cancer researcher to write a single formula to see the percent success in reducing cancer growths for all the B tests in their data set and organize the output by experiment numbers (which in this case organizes them by cancer type). The formula would be absolutely the same for three outputs, three hundred or three thousand. There is no function in existing spreadsheets to do these repetitive calculations and these are not calculations that existing Pivot tables can do.

Figure 68:
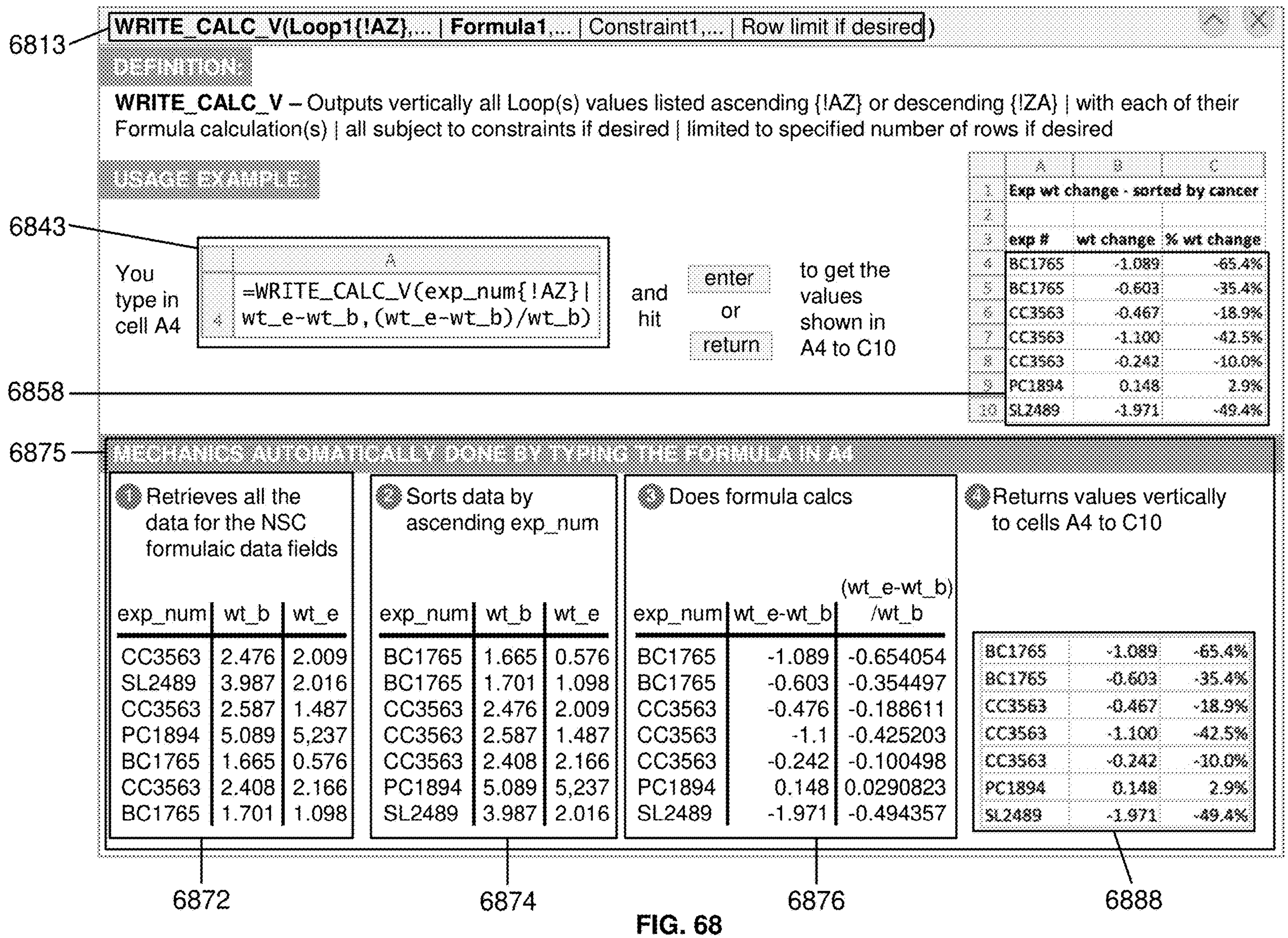
FIG. 68 examples our technology supporting multiple calculations per repetition (WRITE_CALC_V).

FIG. 68 examples the same embodiment of our technology (i.e., using the same syntax 6813) executing multiple calculations per repetition. The formula 6843 does two calculations per each repetition as exampled in the automatically done mechanics 6875. Step one 6872 retrieves the NSC formulaic data fields. Because there is no constraint, step two 6874 just sorts the data. Step three 6876 then does both calculations per repetition which step four 6888 formats and returns vertically to cells A4 to C10 6858, producing repetition results. In this example the user chose to use one loop and two formula calculations but could have easily had more loops and more formula calculations.

Figure 69:
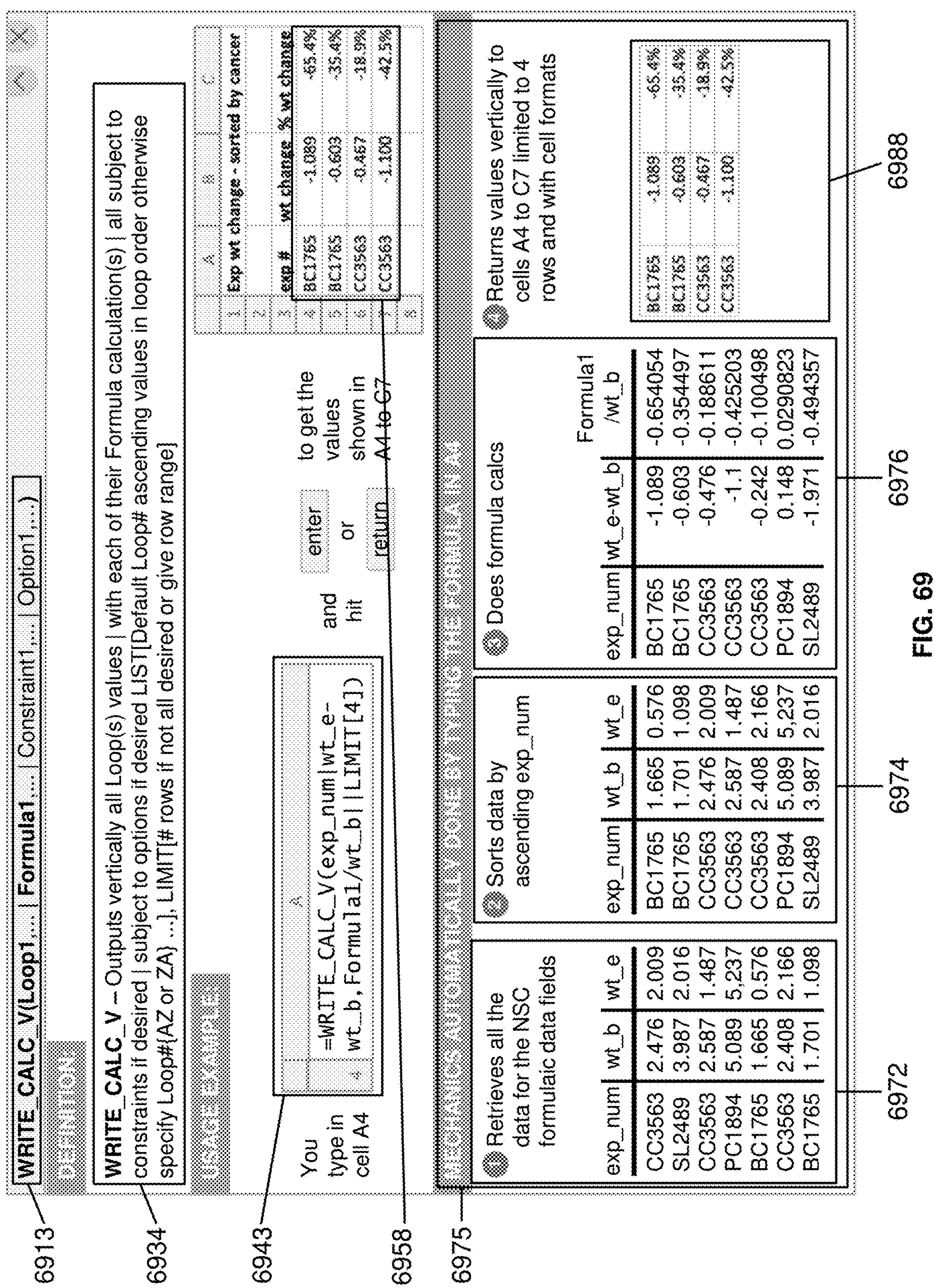
FIG. 69 examples our technology supporting multiple calculations per repetition using an option including syntax and exampling limiting output to four rows.

FIG. 69 examples a related embodiment of our technology using a different syntax 6913 than FIG. 67 and FIG. 69. This is reflected in the different definition 6934 and the formula in cell A4 6934 using an argument 'LIMIT[4]' to limit the output to four rows. The formula 6934 also uses a designator or proxy 'Formula1' to replace the first formula in later formulas. While the Formula1 proxy is only a slight Formula2 simplifier in this situation, in cases where Formula1 is a long and complex formula users would prefer not to have to type it again. Despite the changes, the visual representation of the automatically done mechanics 6975 are the same in steps one 6972 and two 6974 as in FIG. 68. Step three 6976 does the same calculations as step three 6876 and the difference in outcome is reflected in step four 6988 where the results returned are limited to four rows in cells A4 to C7 6958.

Figure 70:
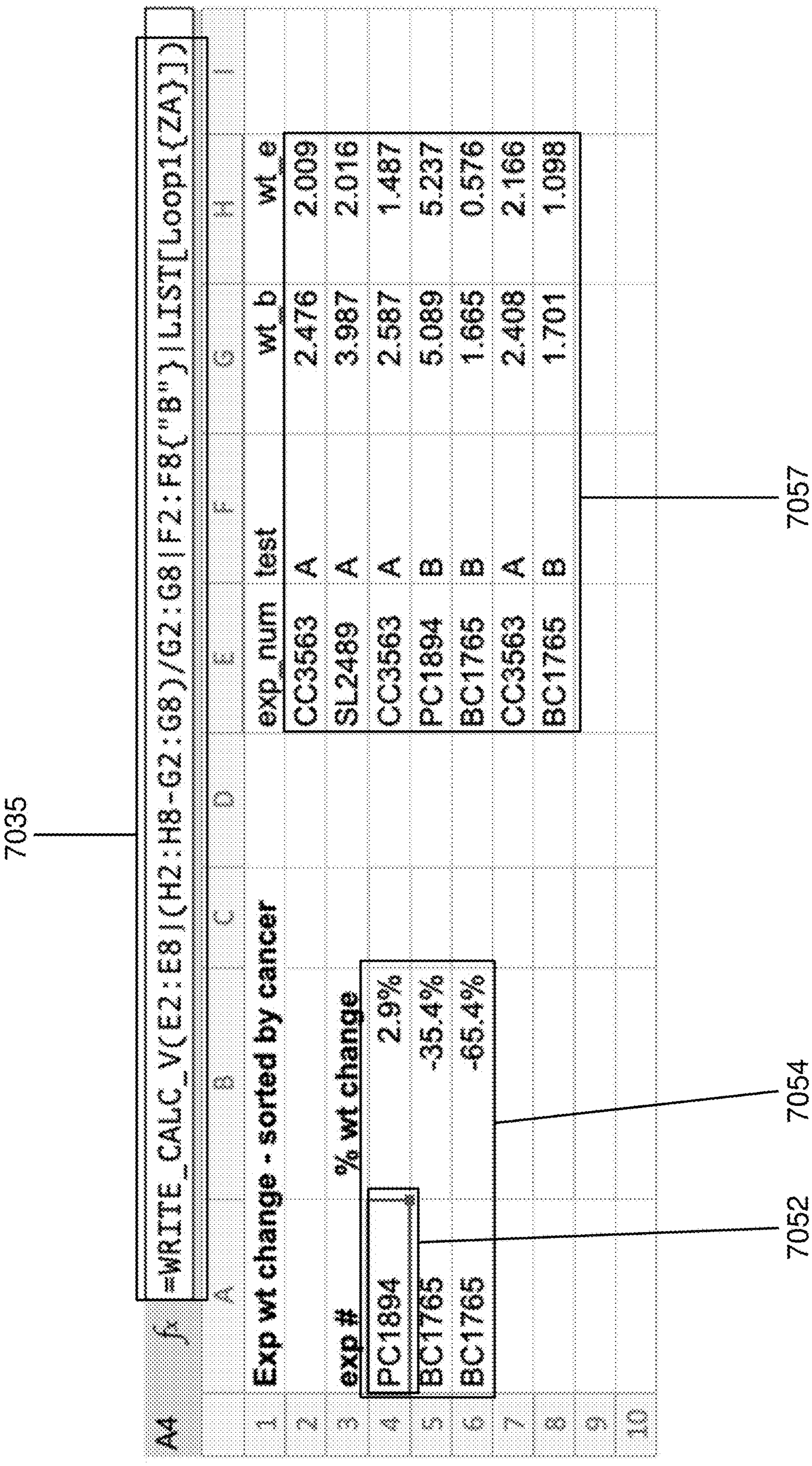
FIG. 70 and FIG. 71 examples our technology using the exact same function syntax for formulaic data sourced from spreadsheet cells that worked for Non-spreadsheet cells (NSC) formulaic data.
Figure 71:
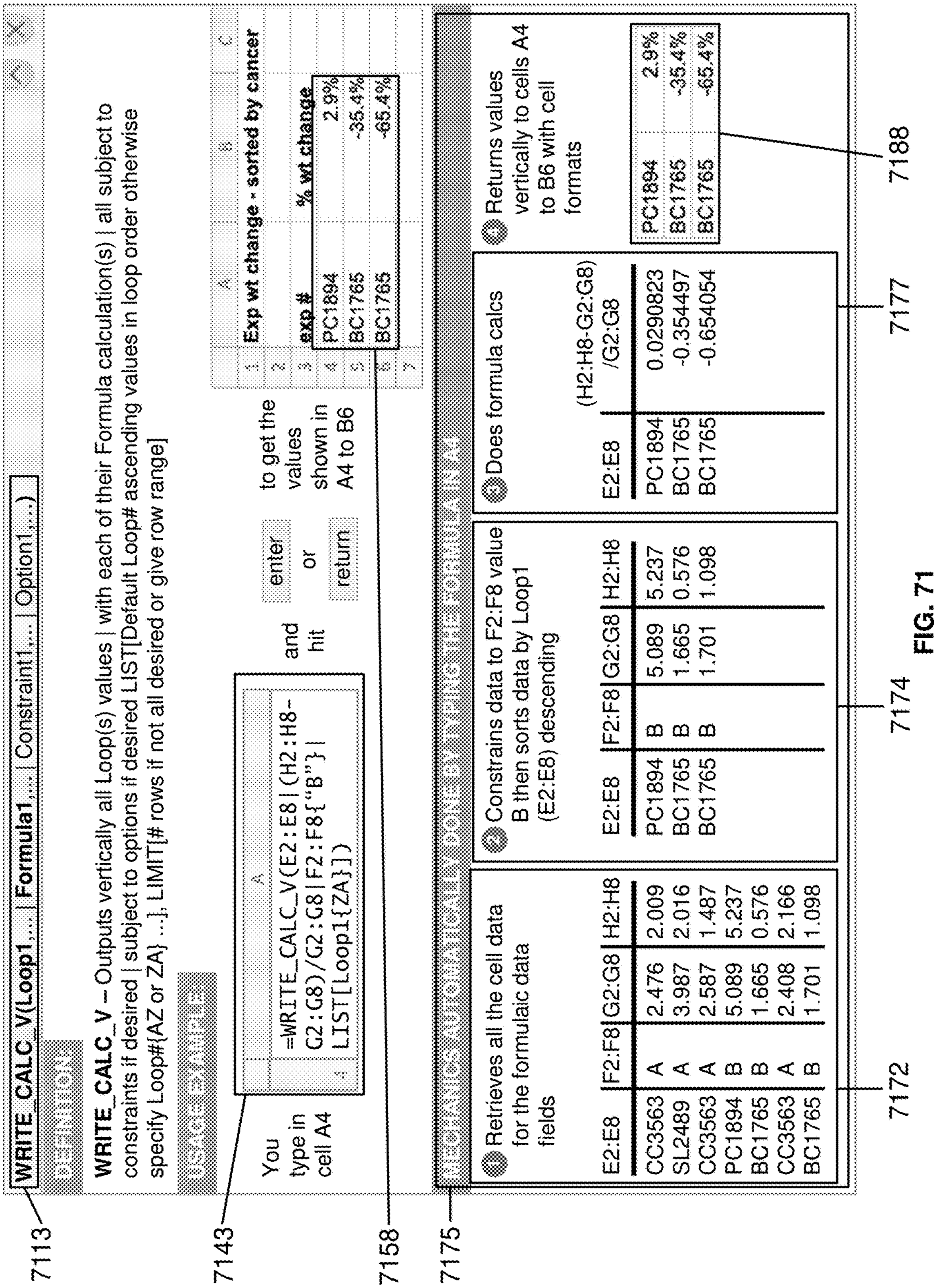

FIG. 70 and FIG. 71 examples using the exact same syntax as FIG. 69 for formulaic data sourced from spreadsheet cells rather than Non-spreadsheet cells (NSC). The repetitive calculations being done are identical to those in FIG. 67. FIG. 70 shows the data used 7057, which in this example is shown close to where it is used for illustrative convenience but could have been on a different worksheet and/or in hidden cells. The formula in the formula bar 7035 for cell 'A4' 7052 populates the values in cells A4 to C6 7054. FIG. 71 examples that the syntax 7113 is the same as that in FIG. 69 6913 thereby making our functions usable by either cell or NSC data with no syntax or argument changes.

The formula 7143 and its automatically executed mechanics 7175 execute the same calculations as those in FIG. 67 other than the sort order in step two 7174 being descending and the outputs returned 7188 being vertical rather than horizontal. The data retrieval in step one 7172 is of course from a different source and in this embodiment the in-cell formulaic data fields are named for their data ranges.

Calc Ordered Repetitive Multicell Calculations

In these repetitive calculations users also benefit from being able to reorder the output of the repetitive calculation outputs based on the calculated values. In the cancer researcher example, the user would love to be able to easily reorder the results by those experiments that had the best outcome at reducing the cancer.

Figure 72:
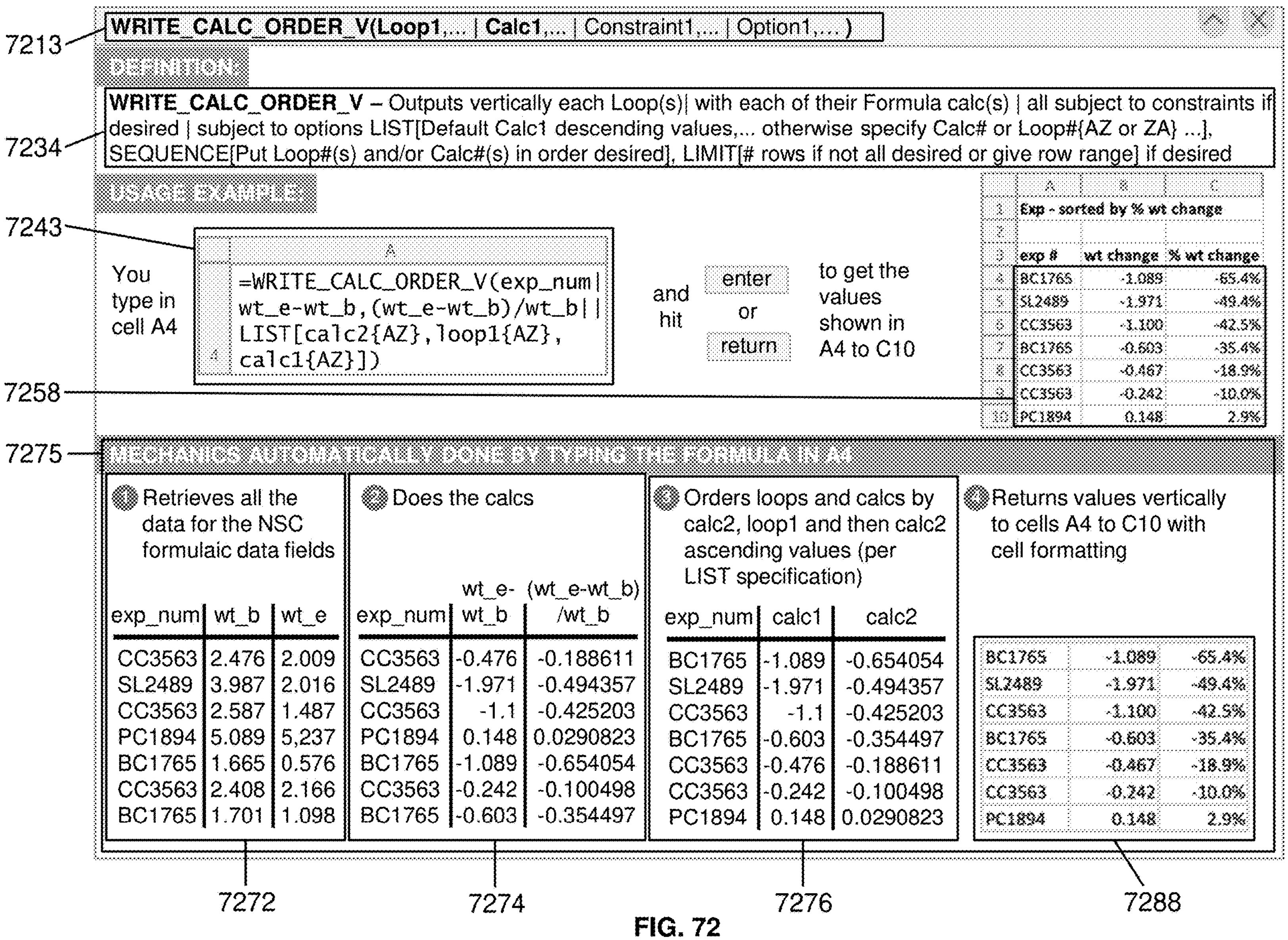
FIG. 72 examples our technology supporting calc ordered repetitive multicell calculations (WRITE_CALC_ORDER_V).

FIG. 72 examples an embodiment of that ability to reorder results using an option here called LIST. The new function, in this embodiment named 'WRITE_CALC_ORDER_V', has syntax 7213 where the required inputs are bolded for ease of use. The definition 7234 helps explain to the user how to fill in the function syntax. In this example the user has written the formula in cell 'A4' 7243 with our Non-Spreadsheet Cell (NSC) formulaic data. In that formula 7243 they have inputted one loop 'exp_num', two formulas 'wt_e−wt_b,(wt_e−wt_b)/wt_b' and three LIST values 'LIST[calc2{AZ},loop1{AZ},calc1{AZ}'. Upon hitting enter (or return on a Mac) our technology automatically executes the four steps 7275 to deliver the values to cells A4 to C10 7258 where the outputs have first been listed vertically in order of ascending values of calc2 ('(wt_e−wt_b)/wt_b') and in the event of ties would then revert to loop1 and calc1 values for sortation.

The automatically done steps 7275 start with step one 7272 retrieving the data with our NSC formulaic data. Step two 7274 does the formula calculations. Step three 7276 orders the values by calc2 ascending values (the other list orders are not invoked because there are no ties). The final step, step four 7288, then formats the results for the cells and populates the values vertically starting in cell A4 and ending in cell C10 7258. This technology allows users to write a single functional formula to create many repetitions, with many calculations per repetition and then reorder the outcome on one or more sets of calculated and/or loop values in the order of their liking.

Figure 73:
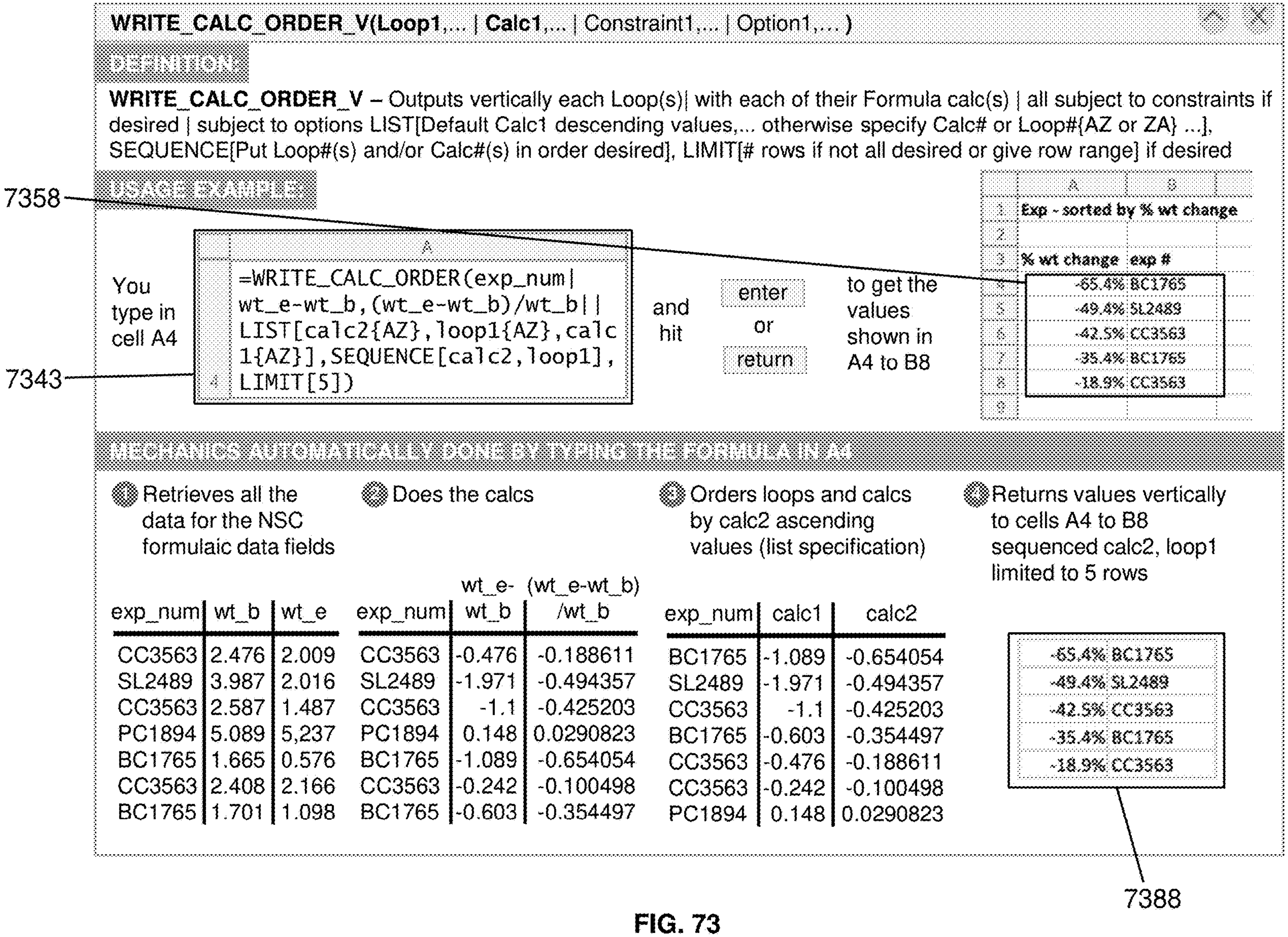
FIG. 73 examples a capability of our technology for repetitive calculations that lets users select what they want to output and its output sequence.

FIG. 73 examples use of a capability of our technology to let users select what they want to output and what sequence they want to output it. The formula 7343 is identical to that in FIG. 72 7243 until the added arguments 'SEQUENCE [calc2,loop1],LIMIT[5]' which changes what is outputted by step four 7388. In step four instead of returning all the values the SEQUENCE[calc2,loop1] omits calc1 values and sequences the calc2 values before the loop1 values in the output. The LIMIT[5] then limits the output to five rows. Thus, giving the user complete control of what they output to the cells 7358.

Figure 74:
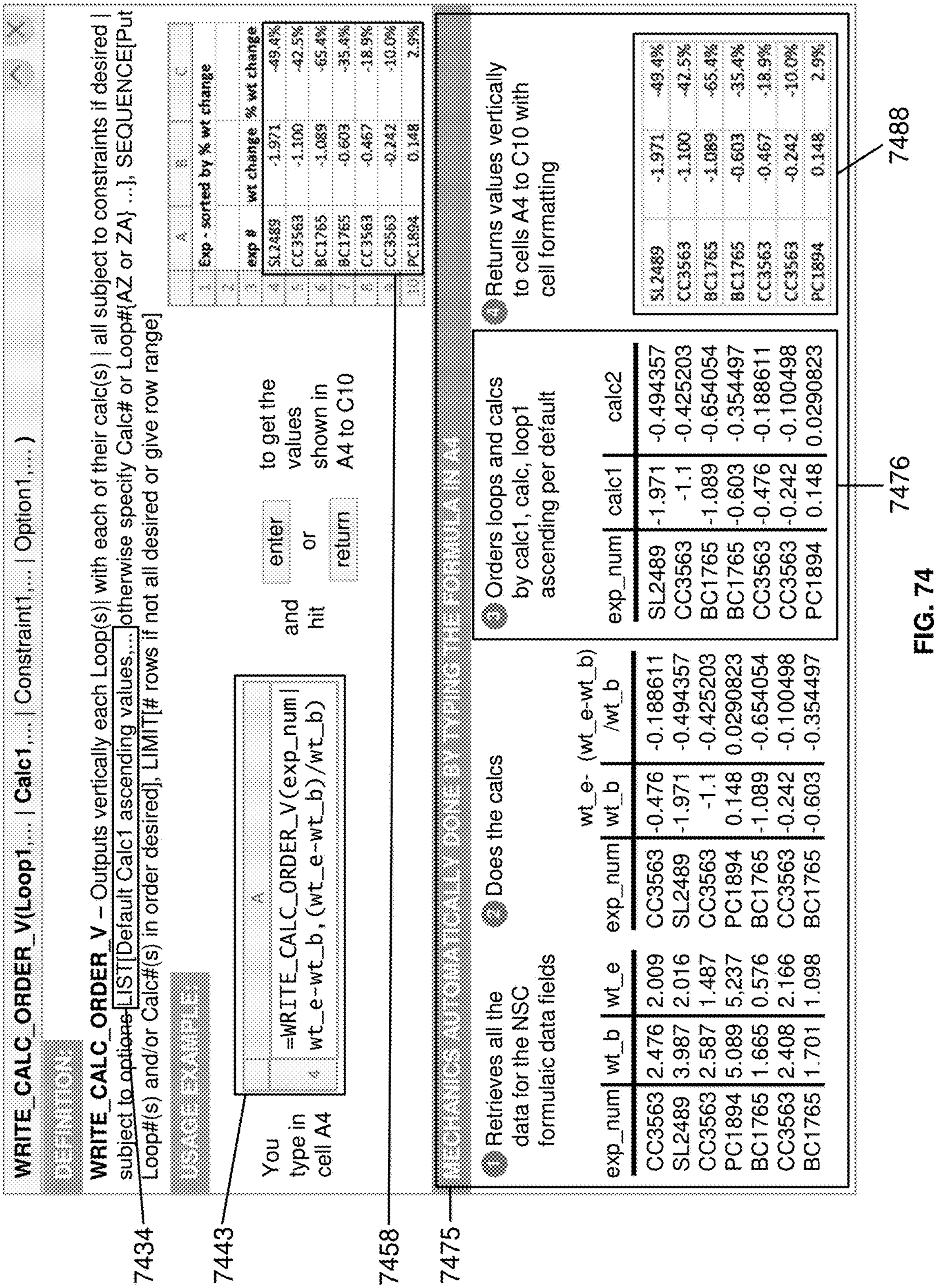
FIG. 74 examples our technology supporting default ordering of the repetitive loops and calculations starting the sort with calculation values or results.

FIG. 74 examples a user using the default LIST sorting, as the capability is called in this embodiment, ordering of the WRITE_CALC_ORDER outputs. In this embodiment the default listing order is 'LIST[Default Calc1 ascending values . . . ' 7434 which means the next list ordering is the next calc until there are none of them and then it goes through the loops. This is exampled in step three 7476 where the order is calc1, calc2 and then loop1 all ascending. These values are generated by the formula in 'A4' 7443 which automatically executes the four steps 7475 returning the values 7488 to the cells A4 to C10 7458. This makes it convenient for users who are happy with the default settings not to have to specify additional inputs.

Figure 75:
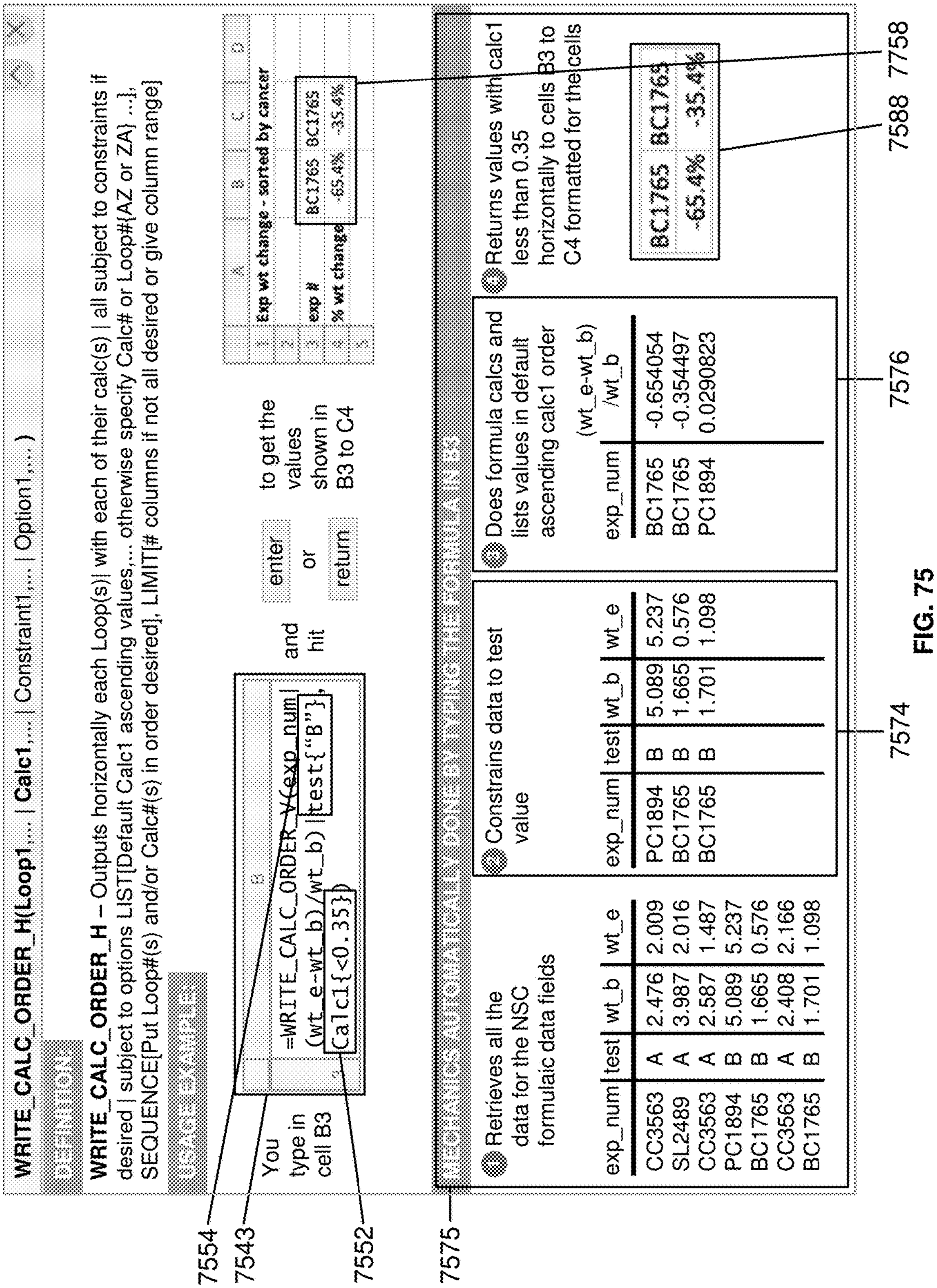
FIG. 75 examples use of both a constraint (filter) on the data used in the repetitions and a constraint (filter) on the calculated values outputted.

FIG. 75 examples a user using both a constraint (filter) on the data used in the repetitions but also using a constraint (filter) on the calculated values outputted. The data constraint is applied using the NSC formulaic data value 'test{"B"}' 7554 in the formula in 'B3' 7543. The formula calculation constraint 'Calc1{<0.35}' 7552 is then applied in that same formula 7543. The data constraint is applied in the second step 7574 of the four automatically executed steps 7575. The formula calculation constraint is applied in the fourth step 7588 and in this example removes one of the repetitions that were calculated in step three 7576 because its calc1 value is greater than 0.35. Therefore, the two sets of values with a calc1 value less than are returned to cells B3 to C4 7758. Thus, adding an additional way a user can easily decide what values they want to see. Like the preceding capabilities this technology works for data from cells and easily scales to calculations in the millions or higher while allowing the user to very selectively output the results they are interested in.

Figure 76:
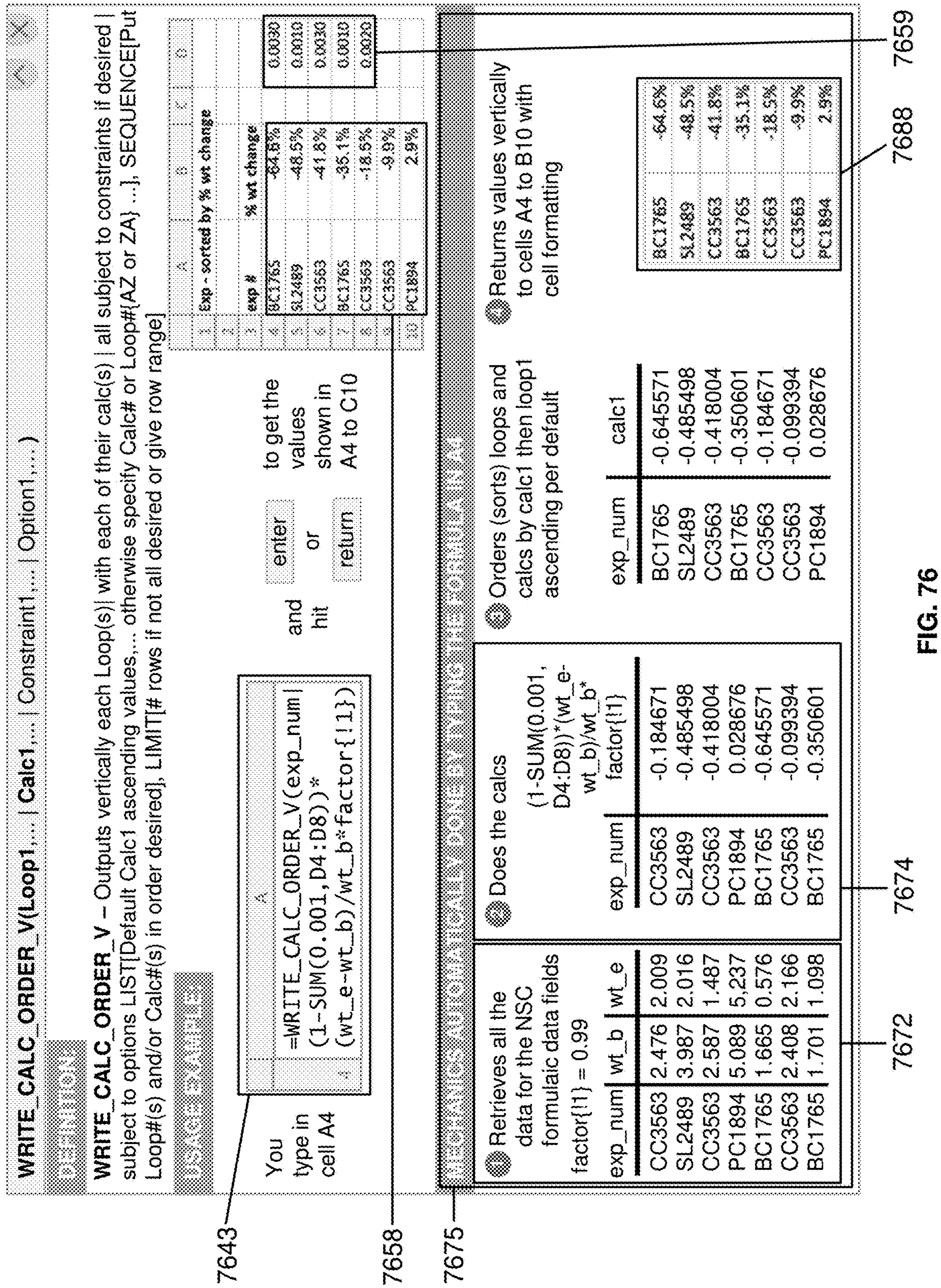
FIG. 76 examples how our technology is not limited to calculations from the repetition data but can use other data, cell values, constants and/or functions.

FIG. 76 examples how in our technology the user is not limited to calculations from the repetition data, meaning the data from its formulaic data set for that repetition. Instead, the user can include formulaic data fields (either NSC or from cells) where the value specified is not the repetition value. Those values can also be from a different data set (e.g., a different NSC data table or from a different area of the cells than the repetitive data). The user can use constant value inputs and the user can make use of applicable regular cell or range/array functions in their repetition calculations to produce repetition results. The formula 7643 examples the use of a constant value '1' and '0.001', a function 'SUM', a cell range 'D4:D8' which in this case is not in the repetitive data set (as that data set is NSC) and a NSC formulaic data field 'factor{! 1}' which by its specification of a specific value '!1' is not using the repetitive values. It might also not be in the same data table as the repetitive formulaic data fields 'exp_num', wt_e' and 'wt_b', which is this embodiment are using the repetitive values because they have no other specification of a value to otherwise use. Step one 7672 shows the retrieval of the NSC data while the cell range data 'D4:D8' 7659 is shown in the spreadsheet. The calculations using the repetitive and non-repetitive data are done in step two 7674. The other steps are automatically done 7675 to then return the values 7688 to the cells A4 to B10 7658. The ability to blend repetitive data and non-repetitive data and utilize spreadsheet functions in the repetitive calculations gives users tremendous capability to automate a large set of calculations from a single formula. FIG. 76 only showed one repetitive calc but the user of our technology could do as many as they like.

Computer System

FIG. 80 is a block diagram of an example computer system, according to one implementation. Computer system 8010 typically includes at least one processor 8014 which communicates with a number of peripheral devices via bus subsystem 8012. These peripheral devices may include a storage subsystem 8024 including, for example, memory devices and a file storage subsystem, user interface input devices 8038, user interface output devices 8020, and a network interface subsystem 8016. The input and output devices allow user interaction with computer system 8010. Network interface subsystem 8016 provides an interface to outside networks, including an interface to communication network, and is coupled via communication network to corresponding interface devices in other computer systems or in the cloud and usable for cloud applications.

User interface input devices 8038 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 8010 or onto communication network.

User interface output devices 8020 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 8010 to the user or to another machine or computer system.

Storage subsystem 8024 stores programming and data constructs that provide the functionality of some or all of the modules and methods described herein. These software modules are generally executed by processor 8014 alone or in combination with other processors.

Memory 8026 used in the storage subsystem can include a number of memories including a main random-access memory (RAM) 8030 for storage of instructions and data during program execution and a read only memory (ROM) 8032 in which fixed instructions are stored. A file storage subsystem 8028 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 8028 in the storage subsystem 8024, or in other machines accessible by the processor.

Bus subsystem 8012 provides a mechanism for letting the various components and subsystems of computer system 8010 communicate with each other as intended. Although bus subsystem 8012 is shown schematically as a single bus, alternative implementations of the bus subsystem may use multiple busses.

Computer system 8010 can be of varying types including a workstation, server, computing cluster, blade server, server farm, or any other data processing system or computing device. Due to the ever-changing nature of computers and networks, the description of computer system 8010 depicted in FIG. 80 is intended only as one example. Many other configurations of computer system 8010 are possible having more or fewer components than the computer system depicted in FIG. 80.

Some Particular Implementations

Some particular implementations and features are described in the following discussion. In general, this section describes algorithms that can be embodied in computer-implemented methods, devices or computer readable media. The algorithms described below are database-like operations, which can be practiced as methods that improve the operations of spreadsheets by simplifying formulation of calculations, programming of the calculations to be executed and/or debugging the programmed calculations. The algorithms described above and below can fairly be described as steps for achieving the functions described. The algorithms can be embodied in systems configured for software to run on hardware, the software embodying these algorithms. The algorithms described above and below can fairly be described as means or modules for achieving the functions described. The algorithms can be practiced as article of manufacture, that is non-transitory computer readable media holding instructions either that carry out any of the methods described or that can be used to configure suitable hardware as any of the systems described.

For jurisdictions that support other classes of patentable subject matter, the algorithms can be embodied in programs, or in use of systems to produce spreadsheets with formulas achieving the useful results described. The algorithms also can be embodied in transitory signals that carry program information between users and systems or among systems.

One implementation of our technology provides the user with a single dimensional Pivot table through the simplicity of writing a single function formula. The table generator function is in a spreadsheet cell as a formula, rather than in a side panel as in prior art pivot tables. That function includes: receiving two or more data field inputs from user specified Non-Spreadsheet Cell (NSC) formulaic data fields (descriptive terms) or cell ranges; using at least one of the user defined data field inputs to create loop equivalents for distinct or unique values of the data field; evaluating for each loop equivalent at least one formula containing a range or array function with at least one of the user defined data fields; and outputs sequenced and listed by function specification or user selection as exampled in FIG. 7B, FIG. 8, FIG. 12, FIG. 13 and FIG. 26. These outputs sometimes include labels from a first field of a record (or row in a vertical, row-major table) adjacent to values calculated over a second field of the record.

For any implementation the output can be oriented so that each sequence is listed Vertically, as shown in FIG. 7B and FIG. 13, or Horizontally, as shown in FIG. 8. In another implementation of our technology the outputs are sequenced (in the columns for Vertical or the rows for Horizontal) by their order of unique values in loop equivalent input(s). Secondary ordering can be by then formula input(s) into the function as exampled in FIG. 7B, FIG. 8, FIG. 13 and FIG. 26.

In one implementation, with capabilities that parallel a one-dimensional Pivot Table, each sequenced set of outputs (rows in the Vertical functions and columns in the Horizontal ones) is listed by their sequenced order of loop input values ordered by default sorting (e.g., ascending) as exampled in FIG. 27 and FIG. 38 through FIG. 40. Outputs can include both labels and related results of function evaluations. Or each sequenced set of outputs is listed by their sequenced order of loop input values ordered by user selected sorting (e.g., !AZ for ascending or !ZA for descending ordering) as exampled in FIG. 7B through FIG. 9 and FIG. 12 through FIG. 16. This combination of the sequencing and ordering within the two-dimensional listing is such that in a vertical example outputs are sequenced in columns by their order of loop input followed by their order of formula input into the function and the order of row-by-row content is determined by a default setting or user selection of ascending, or descending value order. In horizontal usage it is the opposite, the outputs are sequenced in rows by their order of loop followed by their order of formula input into the function while the list default or user selection (e.g., ascending, or descending value order) determines the order of column-by-column content.

In one implementation of our technology, that allows users to create the equivalent of a Pivot Table within a Pivot Table, more than one sequenced set of loop equivalents and formulas are comingled as exampled in FIG. 38 through FIG. 40. This further table generator function also is in a spreadsheet cell as a formula, rather than in a side panel as in prior art pivot tables. This implementation can then be enhanced to allow by user specified lists and limits as exampled in FIG. 54 and FIG. 55 as well as the other combinations of the technologies embodied here.

Another implementation of our technology adds the equivalents of calculated totals and/or subtotals listed by their sequenced order of loop input values as exampled in FIG. 17 through FIG. 20 and for Pivot tables within Pivot tables as exampled in FIG. 60 through FIG. 63. Implementations of our technology can position these totals and subtotals at the tops or bottoms of their respective groups in a Vertical setting or at the right or left of their respective groups in a Horizontal setting.

In an implementation, that goes beyond the one-dimensional Pivot Table by ordering the outcomes across the equivalent loops for distinct or unique values of a data field to facilitate a much broader set of analyses, each sequenced set of outputs (rows in the Vertical functions and columns in the Horizontal ones) is listed by their sequenced order of equivalent loop formula calculated values ordered by default sorting (e.g., ascending or descending) as exampled in FIG. 26. This further table generator function also is in a spreadsheet cell as a formula, rather than in a side panel as in prior art pivot tables. Where that default sorting order can apply across more than one loop equivalent formula calculation value results in the sequence of the formula inputs as exampled in FIG. 33. Where the default sorting order can apply across Pivot tables within Pivot tables loop equivalent formula calculation value results in the sequenced of formula inputs as exampled in FIG. 44 through FIG. 46. Or each sequenced set of outputs is listed by their sequenced order of loop input values and/or loop equivalent formula calculation value results ordered by user selected sorting (e.g., ASCEND for ascending or DESCEND for descending ordering) as exampled in FIG. 34. And where the user specified order of listing can apply across Pivot tables within Pivot tables as exampled in FIG. 50 through FIG. 53.

Our technology that goes well beyond one-dimensional Pivot Tables includes an implementation where outputs are sequenced by user selection of inclusion and order of loop and/or formula calculated values as exampled in FIG. 35 function term 'SEQUENCE[Formula2,Formula1,Loop1]' 3555. This allows users to only present the answers they desire without having to show all of loop equivalents and/or formula calculated values that they used to arrive at the answers.

In situations where the user only wants to see a limited listing of the output, the output can be limited as exampled in FIG. 9 through FIG. 11 and FIG. 27 through FIG. 29. This limitation can be applied to Pivot tables within Pivot tables as exampled in FIG. 41 through FIG. 43. This implementation is for when the user is only interested in a certain number or results or when the user is concerned that they will get a huge number of outputs and wants to see some values before deciding exactly what to do. The limit can also be a number range such as '6:10' if what the user wants to see is the sixth through the tenth rows (in Vertical settings) or columns (in Horizontal settings) of values.

For any of the implementations' constraints (filters) can be applied to the data sets, as exampled by the date range constraints in FIG. 9 through FIG. 11 and FIG. 27 through FIG. 29 and FIG. 54 through FIG. 55B. This allows users to very easily transform an analysis from one period of time (or other subset of data) to another and can be done via a referenced cell as exampled in FIG. 54 through FIG. 55B. The constraints can be implemented as data selection parameters of the user specified formulaic data description terms. Examples of data selection parameters used in the examples that vary the data selected at input are !JOIN and !ALL.

Also, for any of the implementations' constraints (filters) can be applied to the calculated values, as exampled by 'formula1{>500}' 7753 in FIG. 77. This allows users to constrain the outputs to values of their choosing based on the outcomes of their loop formula calculations.

Another implementation of our technology supports more than one user inputted data field used to create compound loop equivalents as exampled in FIG. 9 through FIG. 11 (cancer{!AZ},country{! AZ}), FIG. 27 through FIG. 29 (cancer{ },country{ }) and FIG. 56 through FIG. 62 ('country{ },age{ }). The user can create as many of these compound loops equivalents as they like with as many fields as desired (within bounds of the field availability) in the compound or nested structure, thereby dramatically expanding the breadth of repetitive analyses they can do with our functions.

Another implementation of our technology further broadens the range of repetitive analyses by allowing users to construct loop equivalent formula evaluations including more than one range or array functions per formula as exampled in FIG. 9 through FIG. 11, FIG. 14 through FIG. 16, FIG. 30 through FIG. 32, and FIG. 50 through FIG. 53. Further implementations allow our technology to support multiple range and array function formulas evaluated for a loop equivalent over distinct or unique values of a data field as also exampled in FIG. 9 through FIG. 11, FIG. 14 through FIG. 16, and FIG. 30 through FIG. 32. And support multiple range and array function formulas evaluated for Pivot table with Pivot table loop equivalents as exampled in FIG. 50 through FIG. 53.

Another implementation expands our technology's capability to execute loop equivalent formula calculations where the loop data field values are selectively applied within a formula. Therefore, users can make part of a formula use the loop values and other parts not, as exampled in FIG. 21, FIG. 30 through FIG. 32, and FIG. 41 through FIG. 43.

An additional implementation supports a fundamental capability that allows users to specify the loop used for a range or array function evaluation as exampled in FIG. 56 through FIG. 59. This allows users to mix and match loops within different parts of an individual formula, having different parts of the formula use different sets of loop equivalent values as done for the calculation 'SUM (cases{!LOOP3})/SUM(cases{!LOOP1})' 5664 in FIG. 56 which uses values from both Loop3 and Loop1.

The range of possible repetitive analyses possible is further expanded by implementations supporting the use of data values not within the loop equivalent data sets and the use of non-range or non-array functions in the loop evaluated formulas as exampled in FIG. 37 and FIG. 47 through FIG. 49. This allows the use of a much broader set of functions and algebraic equations in our repetitive evaluations. In some examples, two data fields, such as second and third data fields in a record, or functions operating on the data fields are connected by an algebraic operator in an algebraic equation. We already had a materially larger set of range or array functions, exampled in FIG. 25, that our loop equivalent technology could use relative spreadsheet Pivot tables, but can add substantially to user options with the large set of non-range or non-array functions which our technology can use in repetitive calculations.

Another implementation of our technology supports cross data set joining directly in our family of new functions. When using our Non-Spreadsheet Cell (NSC) formulaic data this supports using data from different external data tables as is exampled in FIG. 22 and FIG. 36. When using sets of data from spreadsheet cells our technology supports using different data sets that are entirely separate as exampled in FIG. 23 and FIG. 24. These separate cell data sets could be anywhere within the spreadsheet, e.g., on different worksheets. Out technology allows users to join the data cell sourced data without the need of VLOOKUPs and for external data not adding the many complications of importing and joining tools like Microsoft Power Query, all of which requires a lot of additional work done very simply in our technology with a single functional formula. The user could also join data sets from different sources, one data set from NSC formulaic data and one from cell sourced formulaic data.

An additional implementation facilities easier formula writing by users where a designator (e.g., 'FORMULA1' 3352) can be employed to replace rewriting formulas used more than once in the function as exampled in FIG. 33.

The prior repetitive calculations involved loop evaluations utilizing a range or array function evaluation of the loop values for distinct or unique values of a data field. There are also situations where repetitive calculations are valuable for each repetition and every item in a data field. One implementation of our technology provides the user that through the simplicity of writing a single function formula. That function includes: receiving two or more data field inputs from user specified Non-Spreadsheet Cell (NSC) formulaic data fields (descriptive terms) or cell ranges; using at least one of the user defined data field inputs to create data repetitions; evaluating for each data repetition at least one formula containing at least one of the user defined data fields to produce repetition results; and outputs sequenced and listed by function specification or user selection as exampled in FIG. 67.

For any implementation the output can be oriented so that each sequence is listed Vertically, as shown in FIG. 68 and FIG. 69, or Horizontally, as shown in FIG. 67. In another implementation of our technology the outputs are sequenced (in the columns for Vertical or the rows for Horizontal) by their order of loop equivalent input(s) and then formula input(s) into the function as exampled in FIG. 67 through FIG. 69.

In one implementation each sequenced set of outputs (rows in the Vertical functions and columns in the Horizontal ones) is listed by their sequenced order of loop input values ordered by default sorting (e.g., ascending) as exampled in FIG. 69. Or each sequenced set of outputs is listed by their sequenced order of loop input values ordered by user selected sorting (e.g., !AZ for ascending or !ZA for descending ordering) as exampled in FIG. 67 and FIG. 68. This combination of the sequencing and ordering within the two-dimensional listing is such that in a vertical example outputs are sequenced in columns by their order of loop input followed by their order of formula input into the function and the order of row-by-row content is determined by a default setting or user selection of ascending, or descending value order. In horizontal usage it is the opposite, the outputs are sequenced in rows by their order of loop followed by their order of formula input into the function while the list default or user selection (e.g., ascending, or descending value order) determines the order of column-by-column content.

In an implementation, that gives users greater flexibility on ordering their repetitive calculations, each sequenced set of outputs (rows in the Vertical functions and columns in the Horizontal ones) is listed by their sequenced order of equivalent loop formula calculated values ordered by default sorting (e.g., ascending or descending) as exampled in FIG. 74. Or each sequenced set of outputs is listed by their sequenced order of loop input values and/or loop equivalent formula calculation values ordered by user selected sorting (e.g., AZ for ascending or ZA for descending ordering) as exampled in FIG. 72.

Our technology includes an implementation where outputs are sequenced by user selection of inclusion and order of loop and/or formula calculated values as exampled in FIG. 73 function term 'SEQUENCE[calc2,loop1]' in formula 7343. This allows users to only present the answers they desire without having to show all of loop repetitions and/or formula calculated values that they used to arrive at the answers.

In situations where the user only wants to see a limited listing of the output, the output can be limited as exampled in FIG. 69 ('LIMIT[4]') and FIG. 73 (LIMIT[5]). This implementation is for when the user is only interested in a certain number or results or when the user is concerned that they will get a huge number of outputs and wants to see some values before deciding exactly what to do. The limit can also be a number range such as '6:10' if what the user wants to see is the sixth through the tenth rows (in Vertical settings) or columns (in Horizontal settings) of values.

For any of the implementations' constraints (filters) can be applied to the data sets, as exampled by the constraints in FIG. 67 ('test{"B"}') and FIG. 71 (F2:F8{"B"}'). This allows users to very easily transform an analysis from one subset of data to another and can be done via a referenced cell as exampled previously exampled in FIG. 54 through FIG. 55B.

For any of the implementations' constraints (filters) can be applied to the calculated values, as exampled by 'calc1{<0.35}' 7552 in FIG. 75. This allows users to constrain the outputs to values of their choosing.

Another implementation of our technology further broadens the range of repetitive analyses by allowing users to construct more than one formula calculation that is evaluated for each repetition to produce repetition results, as shown in FIG. 68, FIG. 69 and FIG. 72.

An implementation applicable to the previous implementations supports the use of non-looped cell reference(s), non-looped NSC formulaic data, constant values and/or functions in the repetitive calculation formulas, as exampled in FIG. 76.

An additional implementation facilities easier formula writing by users where a designator/proxy (e.g., 'Formula1' in formula 6943) can be employed to replace rewriting formulas used more than once in the function as exampled in FIG. 69.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

Clauses

The technology disclosed includes the following clauses.

18. A method of evaluating data in a spreadsheet using a table generator function that applies a user specified formula to a user specified data field inputs, including:

- accessing from the spreadsheet the table generator function entered in a first spreadsheet cell;
- receiving for the table generator function at least first, second and third user specified data field inputs including user specified formulaic data description terms for accessing a non-cell source or a data cell range;
- using at least the first user specified data field input to create data repetitions over items in the first user specified data field input;
- receiving the user specified formula, including an algebraic operator applied to items in the second and third data field inputs for each data repetition;
- evaluating items in the second and third data field inputs in each data repetition by applying the user specified formula to generate repetition results; and
- outputting from the table generator function the repetition results and outputting adjacent thereto at least related labels from the first user specified data field.

19. The method of clause 18, further including receiving a specification of whether the evaluations output are to be listed vertically or horizontally in a rectangle of spreadsheet cells.

21. The method of clause 18, further including primarily ordering the repetition results by a default sorting of ascending or descending.

22. The method of clause 18, further including primarily ordering the repetition results loop equivalent function results by a user selected sort order.

23. The method of clause 18, wherein outputs are listed by user selection of an ordered set of one or more data repetition results and/or formula calculated value each with a selected sortation.

24. The method of clause 18, further including arranging labels and results to be output in a sequence responsive to a user specification.

25. The method of clause 18, further including applying constraints to the first and/or second user specified data fields to filter data evaluated by the user specified formula.

26. The method of clause 25, further including limiting output of the repetition results responsive to a user selected count of items to output.

27. The method of clause 18, further including applying constraints to the repetition results to filter the outputting.

28. The method of clause 18, further including evaluating more than one formula calculation for each repetition.

29. The method of clause 18, further including using at one or more data values not in the first, second or third user specified data inputs in the user specified formula.

30. The method of clause 18, wherein a designator can be employed to replace rewriting formulas used more than once in the function.

I claim:

1. A method of evaluating data in a spreadsheet using a table generator function that applies a user specified formula to user specified data fields, including:

- accessing from the spreadsheet the table generator function entered in a first spreadsheet cell, wherein the table generator function applies at least one user specified formula to generate a table of labeled results populated in a plurality of cells;
- receiving as arguments in a structured arguments list of the table generator function, which structured arguments list has a predetermined ordering of argument groups separated by delimiters and which arguments are grouped within the argument groups, at least first and second user specified data fields as inputs, the data field arguments including user specified formulaic data description terms for accessing a non-cell source or a data cell range;
- using at least the first user specified data field input to create loop equivalents over distinct values of the first user specified data field, wherein a loop equivalent groups the input based on two or more records or cell ranges that have matching values in the first user specified data field;
- receiving as a further argument in the arguments list the user specified formula, including at least one spreadsheet range function or array function;
- evaluating data in the second data field input by applying the user specified formula grouped by the distinct values in the loop equivalents to generate loop equivalent function results; and
- outputting from the table generator function the loop equivalent function results and outputting adjacent thereto at least related labels from the first user specified data field.

2. The method of claim 1, further including receiving a specification that the evaluations output are to be listed vertically in a rectangle of spreadsheet cells.

3. The method of claim 1, further including primarily ordering the loop equivalent function results by ordering the distinct values in the first user specified field based on specification of the table generator function entered in the first spreadsheet cell.

4. The method of claim 1, further including primarily ordering the loop equivalent function results by ordering values of the loop equivalent function results.

5. The method of claim 1, further including primarily ordering the loop equivalent function results by a default sorting of ascending or descending.

6. The method of claim 1, further including primarily ordering the loop equivalent function results by a user selected sort order.

7. The method of claim 1, further including receiving at least a third user specified data field input and using the third user specified data field input to create nested loop equivalents within the loop equivalents created responsive to the first user specified data field.

8. The method of claim 1, further including outputting from the table generator function total and/or subtotal formula calculations over the loop equivalent function results.

9. The method of claim 1, further including arranging fields output in a sequence responsive to a user specification.

10. The method of claim 9, wherein the fields are output in columns and the sequence is a sequence of columns.

11. The method of claim 1, further including limiting output of the loop equivalent function results responsive to a user selected count of items to output.

12. The method of claim 1, further including applying constraints to the first and/or second user specified data fields to filter data evaluated by the user specified formula.

13. The method of claim 1, further including applying constraints to the loop equivalent function results to filter the outputting.

14. The method of claim 1, wherein the user specified formula includes two or more spreadsheet range functions and/or array functions.

15. The method of claim 1, further including:

at least one of the user specified formulaic data description terms accepting a data selection parameter; and receiving a user specification of the data selection parameter to vary selection of data responsive to the at least one of the user specified formulaic data description terms.

16. The method in claim 1, further including using at one or more data values not in the first or second user specified data inputs in the user specified formula.

17. The method of claim 1, further including joining data values from different data sets, either different non-cell source data tables or different cell range data sets, for use in the user specified formula.

18. The method of claim 1, further including using a designator to replace rewriting formulas used more than once in the user formula function.

19. A non-transitory computer readable medium holding instructions that, when executed on hardware, configure the hardware to implement a method of evaluating data in a spreadsheet using a table generator function that applies a user specified formula to user specified data fields, including:

accessing from the spreadsheet the table generator function entered in a first spreadsheet cell, wherein the table generator function applies at least one user specified formula to generate a table of labeled results populated in a plurality of cells;

receiving as arguments in a structured arguments list of the table generator function, which structured arguments list has a predetermined ordering of argument groups separated by delimiters and which arguments are grouped within the argument groups, at least first and second user specified data fields as inputs, the data field arguments including user specified formulaic data description terms for accessing a non-cell source or a data cell range;

using at least the first user specified data field input to create loop equivalents over distinct values of the first user specified data field, wherein a loop equivalent groups the input based on two or more records or cell ranges that have matching values in the first user specified data field;

receiving as a further argument in the arguments list the user specified formula, including at least one spreadsheet range function or array function;

evaluating data in the second data field input by applying the user specified formula grouped by the distinct values in the loop equivalents to generate loop equivalent function results; and outputting from the table generator function the loop equivalent function results and outputting adjacent thereto at least related labels from the first user specified data field.

20. The non-transitory computer readable medium of claim 19 holding instructions that, when executed on hardware, configure the hardware to implement the method, further including primarily ordering the loop equivalent function results by a user selected sort order.

21. The non-transitory computer readable medium of claim 19 holding instructions that, when executed on hardware, configure the hardware to implement the method, further including receiving at least a third user specified data field input and using the third user specified data field input to create nested loop equivalents within the loop equivalents created responsive to the first user specified data field.

22. The non-transitory computer readable medium of claim 19 holding instructions that, when executed on hardware, configure the hardware to implement the method, wherein the user specified formula includes two or more spreadsheet range functions and/or array functions.

23. The non-transitory computer readable medium of claim 19 holding instructions that, when executed on hardware, configure the hardware to implement the method, further including using at one or more data values not in the first or second user specified data inputs in the user specified formula.

24. The method of claim 1, further including receiving a specification that the evaluations output are to be listed horizontally in a rectangle of spreadsheet cells.

* * * * *